United States Patent
Visbal et al.

(10) Patent No.: US 9,367,872 B1
(45) Date of Patent: Jun. 14, 2016

(54) SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES

(71) Applicant: Palantir Technologies Inc., Palo Alto, CA (US)

(72) Inventors: Alexander Visbal, New York, NY (US); James Thompson, San Francisco, CA (US); Marvin Sum, Sunnyvale, CA (US); Jason Ma, Mountain View, CA (US); Bing Jie Fu, Redwood City, CA (US); Ilya Nepomnyashchiy, Mountain View, CA (US); Devin Witherspoon, Palo Alto, CA (US); Vicktoria Lai, Palo Alto, CA (US); Steven Berler, Menlo Park, CA (US); Alexei Smaliy, Palo Alto, CA (US); Suchan Lee, Redwood City, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 14/579,752

(22) Filed: Dec. 22, 2014

(51) Int. Cl.
*G06Q 40/00* (2012.01)
*G06F 12/10* (2016.01)
(Continued)

(52) U.S. Cl.
CPC ............ *G06Q 40/00* (2013.01); *G06F 12/1036* (2013.01); *G06F 17/30716* (2013.01); *G06F 17/30991* (2013.01); *G06K 9/6218* (2013.01); *G06K 9/6253* (2013.01)

(58) Field of Classification Search
CPC .......... G06F 12/1036; G06F 17/30716; G06F 17/30991; G06K 9/6218; G06K 9/6253
See application file for complete search history.

(56) References Cited

U.S. PATENT DOCUMENTS

| | | | |
|---|---|---|---|
| 5,109,399 | A | 4/1992 | Thompson |
| 5,329,108 | A | 7/1994 | Lamoure |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Scott S Trotter
(74) *Attorney, Agent, or Firm* — Knobbe, Martens, Olson & Bear LLP

(57) ABSTRACT

Embodiments of the present disclosure relate to a data analysis system that may automatically generate memory-efficient clustered data structures, automatically analyze those clustered data structures, automatically tag and group those clustered data structures, and provide results of the automated analysis and grouping in an optimized way to an analyst. The automated analysis of the clustered data structures (also referred to herein as data clusters) may include an automated application of various criteria or rules so as to generate a tiled display of the groups of related data clusters such that the analyst may quickly and efficiently evaluate the groups of data clusters. In particular, the groups of data clusters may be dynamically re-grouped and/or filtered in an interactive user interface so as to enable an analyst to quickly navigate among information associated with various groups of data clusters and efficiently evaluate those data clusters in the context of, for example, a fraud investigation.

16 Claims, 38 Drawing Sheets

(51) Int. Cl.
  *G06F 17/30* (2006.01)
  *G06K 9/62* (2006.01)

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,775,675 B1 * | 8/2004 | Nwabueze et al. ........... 707/600 |
| 6,807,569 B1 | 10/2004 | Bhimani et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,546,245 B2 | 6/2009 | Surpin et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,067 B2 | 5/2010 | Surpin et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,046,362 B2 | 10/2011 | Bayliss |
| 8,082,172 B2 | 12/2011 | Chao et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,397,171 B2 | 3/2013 | Klassen et al. |
| 8,411,046 B2 | 4/2013 | Kruzensiki et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |

(56) References Cited

U.S. PATENT DOCUMENTS

| | | |
|---|---|---|
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,600,872 B1 | 12/2013 | Yan |
| 8,620,641 B2 | 12/2013 | Farnsworth et al. |
| 8,646,080 B2 | 2/2014 | Williamson et al. |
| 8,676,597 B2 | 3/2014 | Buehler et al. |
| 8,676,857 B1 | 3/2014 | Adams et al. |
| 8,689,108 B1 | 4/2014 | Duffield et al. |
| 8,707,185 B2 | 4/2014 | Robinson et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,756,224 B2 | 6/2014 | Dassa et al. |
| 8,781,169 B2 | 7/2014 | Jackson et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,799,812 B2 | 8/2014 | Parker |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,116,975 B2 | 8/2015 | Shankar et al. |
| 9,135,658 B2 | 9/2015 | Sprague et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0039948 A1 | 2/2003 | Donahue |
| 2003/0097330 A1 | 5/2003 | Hillmer et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0222928 A1 | 10/2005 | Steier et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0069912 A1 | 3/2006 | Zheng et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0294200 A1 | 12/2007 | Au |
| 2007/0294643 A1 | 12/2007 | Kyle |
| 2007/0294766 A1 | 12/2007 | Mir et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |

(56) References Cited

U.S. PATENT DOCUMENTS

| | | |
|---|---|---|
| 2008/0229422 A1 | 9/2008 | Hudis et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301643 A1 | 12/2008 | Appleton et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0103442 A1 | 4/2009 | Douville |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0328222 A1 | 12/2009 | Helman et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | Mcdougal et al. |
| 2011/0225198 A1 | 9/2011 | Edwards et al. |
| 2011/0231223 A1 | 9/2011 | Winters |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0110633 A1 | 5/2012 | An et al. |
| 2012/0117082 A1 | 5/2012 | Koperda et al. |
| 2012/0131512 A1 | 5/2012 | Takeuchi et al. |
| 2012/0137235 A1 | 5/2012 | TS et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215898 A1 | 8/2012 | Shah et al. |

(56) References Cited

U.S. PATENT DOCUMENTS

| | | |
|---|---|---|
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1* | 1/2013 | Healey et al. ............... 700/278 |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0019306 A1 | 1/2013 | Lagar-Cavilla et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0139268 A1 | 5/2013 | An et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0160120 A1 | 6/2013 | Malaviya et al. |
| 2013/0166550 A1* | 6/2013 | Buchmann et al. ............ 707/736 |
| 2013/0176321 A1 | 7/2013 | Mitchell et al. |
| 2013/0179420 A1 | 7/2013 | Park et al. |
| 2013/0211985 A1 | 8/2013 | Clark et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0019936 A1 | 1/2014 | Cohanoff |
| 2014/0032506 A1* | 1/2014 | Hoey et al. ................... 707/691 |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0059683 A1 | 2/2014 | Ashley |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149130 A1 | 5/2014 | Getchius |
| 2014/0149272 A1 | 5/2014 | Hirani et al. |
| 2014/0149436 A1* | 5/2014 | Bahrami et al. ............... 707/754 |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0227295 A1 | 8/2015 | Meiklejohn et al. |
| 2015/0235334 A1 | 8/2015 | Wang et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2016/0004764 A1 | 1/2016 | Chakerian et al. |

FOREIGN PATENT DOCUMENTS

| | | |
|---|---|---|
| DE | 10 2014 103 482 | 9/2014 |
| DE | 102014215621 | 2/2015 |
| EP | 1 191 463 | 3/2002 |
| EP | 1 672 527 | 6/2006 |
| EP | 2 551 799 | 1/2013 |
| EP | 2555153 | 2/2013 |
| EP | 2560134 | 2/2013 |
| EP | 2 778 977 | 9/2014 |
| EP | 2 778 983 | 9/2014 |
| EP | 2 779 082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |

(56) References Cited

FOREIGN PATENT DOCUMENTS

| | | |
|---|---|---|
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2963577 | 1/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 02/065353 | 8/2002 |
| WO | WO 2005/104736 | 11/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Alfred, Rayner "Summarizing Relational Data Using Semi-Supervised Genetic Algorithm-Based Clustering Techniques", Journal of Computer Science, 2010, vol. 6, No. 7, pp. 775-784.
Ananiev et al., "The New Modality API," http://web.archive.org/web/20061211011958/http://java.sun.com/developer/technicalArticles/J2SE/Desktop/javase6/modality/, Jan. 21, 2006, pp. 8.
Baker et al., "The Development of a Common Enumeration of Vulnerabilities and Exposures," Presented at the Second International Workshop on Recent Advances in Intrusion Detection, Sep. 7-9, 1999, pp. 35.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," Sharing and Collaborating on Documents, May 1, 2008, pp. 93-97, 106-113 & 120-121.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine http://www.directionsmag.com/articles/retail-trade-area-analysis-using-the-huff-model/123411, Jul. 2, 2005 in 10 pages.
FireEye, http://www.fireeye.com/ Printed Jun. 30, 2014 in 2 pages.
FireEye—Products and Solutions Overview, http://www.fireeye.com/products-and-solutions Printed Jun. 30, 2014 in 3 pages.
GIS-NET 3 Public—Department of Regional Planning. Planning & Zoning Information for Unincorporated La County. Retrieved Oct. 2, 2013 from http://gis.planning.lacounty.gov/GIS-NET3 Public/Viewer.html.
Goswami, Gautam, "Quite 'Writely' Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Elsevier Science, Sep. 2010, Ch. 4 & 10, pp. 53-67 & 143-164.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: An Open RDF Infrastructure for Shared WEB Annotations", Computer Networks, 2002, vol. 39, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Lee et al., "A Data Mining and CIDF Based Approach for Detecting Novel and Distributed Intrusions," Lecture Notes in Computer Science, vol. 1907 Nov. 11, 2000, pp. 49-65.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Palmas, et al., "An Edge-Bundling Layout for Interactive Parallel Coordinates," Proceedings of the 2014 IEEE Pacific Visualization Symposium, Mar. 2014, pp. 57-64.
Rouse, Margaret, "OLAP Cube," http://searchdatamanagement.techtarget.com/definition/OLAP-cube, Apr. 28, 2012, pp. 16.
Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.
Sigrist, et al., "Prosite, a Protein Domain Database for Functional Characterization and Annotation," Nucleic Acids Research, 2010, vol. 38, pp. D161-D166.

(56) References Cited

OTHER PUBLICATIONS

Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
VirusTotal—About, http://www.virustotal.com/en/about/ Printed Jun. 30, 2014 in 8 pages.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Official Communication in New Zealand Application No. 622513 dated Apr. 3, 2014.
Official Communication in European Application No. EP 14158861.6 dated Jun. 16, 2014.
Official Communication in New Zealand Application No. 622517 dated Apr. 3, 2014.
Official Communication in British Application No. GB1408025.3 dated Nov. 6, 2014.
Official Communication in New Zealand Application No. 624557 dated May 14, 2014.
Official Communication in New Zealand Application No. 628585 dated Aug. 26, 2014.
Official Communication in New Zealand Application No. 628495 dated Aug. 19, 2014.
Official Communication in New Zealand Application No. 628263 dated Aug. 12, 2014.
Official Communication in New Zealand Application No. 628161 dated Aug. 25, 2014.
European Search Report in Application No. 14159535.5, dated May 22, 2014.
Official Communication in Great Britain Application No. 1404457.2 dated Aug. 14, 2014.
Official Communication in New Zealand Application No. 622181 dated Mar. 24, 2014.
Official Communication in New Zealand Application No. 627962 dated Aug. 5, 2014.
Official Communication in New Zealand Application No. 628840 dated Aug. 28, 2014.
Official Communication in European Patent Application No. 14159464.8 dated Jul. 31, 2014.
U.S. Pat. No. 8,712,906, Sprague et al. (withdrawn).
"A Word About Banks and the Laundering of Drug Money," Aug. 18, 2012, http://www.golemxiv.co.uk/2012/08/a-word-about-banks-and-the-laundering-of-drug-money/.
About 80 Minutes, "Palantir in a Number of Parts—Part 6—Graph," Mar. 21, 2013, pp. 1-6.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Boyce, Jim, "Microsoft Outlook 2010 Inside Out," Aug. 1, 2010, retrieved from the internet https://capdtron.files.wordpress.com/2013/01/outlook-2010-inside_out.pdf.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Definition "Identify" downloaded Jan. 22, 2015, 1 page.
Definition "Overlay" downloaded Jan. 22, 2015, 1 page.
Gesher, Ari, "Palantir Screenshots in the Wild: Swing Sightings," The Palantir Blog, Sep. 11, 2007, pp. 1-12.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huang et al., "Systematic and Integrative Analysis of Large Gene Lists Using DAVID Bioinformatics Resources," Nature Protocols, 4.1, 2008, 44-57.
Li et al., "Interactive Multimodal Visual Search on Mobile Device," IEEE Transactions on Multimedia, vol. 15, No. 3, Apr. 1, 2013, pp. 594-607.
"Money Laundering Risks and E-Gaming: A European Overview and Assessment," 2009, http://www.cf.ac.uk/socsi/resources/Levi_Final_Money_Laundering_Risks_egaming.pdf.
Nierman, "Evaluating Structural Similarity in XML Documents," 2002, 6 pages.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palantir Technologies, "Palantir Labs—Timeline," Oct. 1, 2010, retrieved from the internet https://www.youtube.com/watch?v=JCgDW5bru9M.
Perdisci et al., "Behavioral Clustering of HTTP-Based Malware and Signature Generation Using Malicious Network Traces," USENIX, Mar. 18, 2010, pp. 1-14.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
Quest, "Toad for Oracle 11.6—Guide to Using Toad," Sep. 24, 2012, pp. 1-162.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
"Using Whois Based Geolocation and Google Maps API for Support Cybercrime Investigations," http://wseas.us/e-library/conferences/2013/Dubrovnik/TELECIRC/TELECIRC-32.pdf.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al., "Palantir Technologies VAST 2010 Challenge Text Records—Investigations into Arms Dealing," Oct. 29, 2010, pp. 1-10.
Yang et al., "HTML Page Analysis Based on Visual Cues," 2001, pp. 859-864.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 14/102,394 dated Aug. 25, 2014.

(56) References Cited

OTHER PUBLICATIONS

Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/264,445 dated May 14, 2015.
Notice of Allowance for U.S. Appl. No. 14/268,964 dated Dec. 3, 2014.
Notice of Allowance for U.S. Appl. No. 14/278,963 dated Sep. 2, 2015.
Notice of Allowance for U.S. Appl. No. 14/294,098 dated Dec. 29, 2014.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155846.7 dated Jul. 8, 2015.
Official Communication for European Patent Application No. 15156004.2 dated Aug. 24, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15180515.7 dated Dec. 14, 2015.
Official Communication for European Patent Application No. 15183721.8 dated Nov. 23, 2015.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012437 dated Sep. 18, 2015.
Official Communication for Netherlands Patent Application No. 2013306 dated Apr. 24, 2015.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.

(56) References Cited

OTHER PUBLICATIONS

Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/278,963 dated Jan. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/726,353 dated Sep. 10, 2015.
Official Communication for U.S. Appl. No. 14/813,749 dated Sep. 28, 2015.
Restriction Requirement for U.S. Appl. No. 13/839,026 dated Apr. 2, 2015.
Restriction Requirement for U.S. Appl. No. 14/857,071 dated Dec. 11, 2015.

\* cited by examiner

| | |
|---|---|
| Internal Phishing | • \<n\> Senders sent emails reported to Abuse with subjects similar to "\<most common subject\>"<br>• These email addresses sent \<k\> emails to the bank between \<TIME1\> and \<TIME2\><br>• There were \<x\> recipients; highest band was \<y\><br>• \<z\> domains were extracted, with \<m\> likely clickers identified |
| External Phishing | • \<n\> Senders sent emails reported to Abuse with subjects similar to "\<most common subject\>"<br>• This campaign consists of \<m\> emails submitted to external Abuse |
| Internal Threat Intel | • '\<Malware.exe\>' was uploaded and calls out to \<n\> URLs<br>• \<x\> hosts made connections to those exact URLs, with \<y\> more making connections to those domains/IPs<br>• \<z\>% of the proxy traffic was blocked, and the last connection made was on \<DATE1\><br>• Proxy categorized \<a\>% of the traffic as '\<Malicious/Botnet\>' |
| External Threat Intel | • Domain \<x\> was blacklisted by \<BLACKLIST1\> and \<y\> more lists<br>• \<n\> employees made \<m\> connections to this domain between \<HOUR1\> and \<HOUR2\>; Highest band was \<z\><br>• \<k\>% of proxy traffic was blocked, and \<l\>% was marked as malicious by Proxy |
| IDS<br>(Intrusion Detection System) | • \<n\> Outbound/Inbound IDS Reports To/From \<IPADDR\><br>• Registered to \<ORG\> based in \<COUNTRY\><br>• Triggered \<n\> reports across \<m\> hosts<br>• Reports span \<k\> hours, \<j\> minutes starting at \<TIME1\><br>• Most common signature was \<SIGNATURE\> |

FIG. 10C

ALERT

ACTIVITY SUMMARY FOR ACCT # 1075043.
Triggered by SYNTHETICS #116

- This bank account has transferred money to 0 other accounts.
- This cluster contains 13 transactions.
- The largest transaction is $9,897.61.
- The 2 online accounts in this cluster have been accessed from 29 computers.

LATEST ONLINE ACCOUNT LOGINS | LATEST TRANSACTIONS

| TIME | ACCESS ID | ONLINE ACCT ID | IP | LAT | LON |
|---|---|---|---|---|---|
| Tue Dec 06 11:22:23 2011 | 1397051504 | 1630461 | 7.15.141 | -68.437352 | -81.611388 |
| Thu Nov 24 12:08:05 2011 | 1421774430 | 1630461 | 100.154.147 | -122.050133 | -90.164725 |
| Wed Oct 19 00:03:16 2011 | 1416401309 | 1631127 | 61.155.152 | -122.997437 | -85.866253 |
| Thu Jul 14 15:02:05 2011 | 1413481846 | 1630461 | 58.29.45 | -122.375566 | -118.287579 |
| Mon Jul 11 02:54:01 2011 | 1418200277 | 1631127 | 59.219.3 | -73.9761 | -75.747941 |
| Tue Jun 21 06:45:34 2011 | 1423605117 | 1631127 | 247.247.7 | -85.306187 | -76.196199 |
| Sun May 29 03:44:28 2011 | 1414737006 | 1631127 | 55.241.55 | -74.117925 | -86.238806 |
| Wed Mar 30 03:53:09 2011 | 1419400315 | 1630461 | 139.153.108 | -117.240476 | -118.476568 |
| Sat Feb 05 00:39:45 2011 | 1410438744 | 1631127 | 152.233.56 | -139.755042 | -70.994332 |
| Wed Dec 01 10:43:17 2010 | 1408485934 | 1630461 | 1.82.243 | -93.621646 | -84.361529 |
| Thu Nov 11 08:22:35 2010 | 1406337133 | 1631127 | 53.26.110 | -122.093848 | -117.893858 |
| Wed Nov 03 10:24:07 2010 | 1401059576 | 1630461 | 183.56.173 | -82.496516 | -119.711565 |

SHOW LOGS (40)

FIG. 12

ALERT

ACTIVITY SUMMARY FOR ACCT # 1075043.
Triggered by SYNTHETICS #116

- This bank account has transferred money to 0 other accounts.
- This cluster contains 13 transactions.
- The largest transaction is $9,897.61.
- The 2 online accounts in this cluster have been accessed from 29 computers.

LATEST ONLINE ACCOUNT LOGINS    LATEST TRANSACTIONS —1212

| TIME | TRANSACTION ID | ACCOUNT NUMBER | AMOUNT | TYPE |
|---|---|---|---|---|
| Sun Dec 09 22:18:04 2012 | 1491012429 | 1075043 | ($7,918.83) | Deposit |
| Tue Oct 02 10:02:28 2012 | 1479779223 | 1045043 | ($2,148.71) | Withdrawl |
| Thu May 10 20:51:14 2012 | 1461910996 | 1075043 | $31.38 | Deposit |
| Thu Jul 28 04:54:22 2011 | 1459503811 | 1075043 | $3,341.75 | Withdrawl |
| Tue Nov 09 05:22:08 2010 | 1512210768 | 1075043 | $2,861.71 | Deposit |
| Thu Apr 15 20:03:13 2010 | 1520190023 | 1075043 | $4,806.38 | Deposit |
| Wed Sep 30 05:23:13 2009 | 1425476177 | 1075043 | $9,897.61 | Transfer |
| Thu Jul 10 08:04:45 2008 | 1498980757 | 1075043 | ($3,174.33) | Deposit |
| Sat Oct 21 22:13:40 2006 | 1449254621 | 1075043 | ($4,978.21) | Deposit |
| Tue Sep 03 08:03:13 2002 | 1477514971 | 1075043 | ($6,351.86) | Transfer |

SHOW LOGS (40)    1302

ALERT

ACTIVITY SUMMARY FOR ACCT # 1075043.
Triggered by SYNTHETICS #116

ALL SOURCES ▼ | 1969 DEC 31, 16:00:00 — 2014 APR 30, 21:22:49 | HIDE LOGS (49) ▼

| ADDRESS | CUSTOMER ID | STREET ADDRESS | CITY | STATE | ZIP | PHON |
|---|---|---|---|---|---|---|
| 1969 DEC 31, 16:00:00 | 1896665193 | 4921 Corbin Branch Road | Chattanooga | TN | 37421 | 926- |
| 1969 DEC 31, 16:00:00 | 1896665193 | 1724 Elk Avenue | Lansing | OH | 43324 | 430- |
| TRANSACTION | TRANSACTION ID | ACCOUNT NUMBER | AMOUNT | TYPE | | |
| 2001 FEB 15, 15:05:23 | 1430216189 | 1075043 | 4187.46 | Deposit | | |
| 2002 MAR 30, 12:36:33 | 1463652403 | 1075043 | -4502.98 | Withdrawl | | |
| 2002 SEP 03, 05:32:36 | 1452292037 | 1075043 | -6729.79 | Transfer | | |
| 2002 SEP 03, 08:03:13 | 1477514931 | 1075043 | -63513.86 | Transfer | | |
| ACCOUNT | ACCOUNT NUMBER | CUSTOMER ID | ACCOUNT TYPE | | | |
| 2003 MAR 05, 00:00:00 | 1075043 | 1896665193 | PeRoth IRA | | | |
| ONLINE ACCOUNT | CUSTOMER ID | ONLINE ACCOUNT ID | USERNAME | EMAIL | | |
| 2003 AUG 12, 00:00:00 | 1896665193 | 1630461731 | h4f6VkVbn33sofe | h4f6VkVbn33sofe@hotpepper.jp | | |
| CUSTOMER | CUSTOMER ID | FIRST NAME | LAST NAME | SSN | | |
| 2003 NOV 30, 00:00:00 | 1896665193 | GITA | SALTERS | 582670007 | | |

49 OF 49 LOGS SHOWN

FIG. 14

ALERT

ACTIVITY SUMMARY FOR ACCT # 1075043.
Triggered by SYNTHETICS #116

HIDE LOGS (13)

| TRANSACTION | TRANSACTION ID | ACCOUNT NUMBER | AMOUNT | TYPE |
|---|---|---|---|---|
| | | | | Deposit |
| | | | | Withdrawl   × |
| | | | | Enter new filter |
| 2001 FEB 15, 15:05:23 | 1430216189 | 1075043 | 4187.46 | Deposit |
| 2006 OCT 21, 22:13:40 | 1449254621 | 1075043 | -4978.21 | |
| 2009 SEP 30, 05:23:13 | 1425476177 | 1075043 | 9897.61 | Deposit |
| 2010 APR 15, 20:03:13 | 1528190023 | 1075043 | 4806.38 | Deposit |
| 2010 NOV 09, 05:22:08 | 1512210768 | 1075043 | 2861.71 | Deposit |
| 2012 MAY 10, 20:51:14 | 1461910996 | 1075043 | 31.38 | |
| 2012 DEC 09, 22:18:04 | 1491012429 | 1075043 | -7918.62 | |

8 OF 13 LOGS SHOWN

ALERT ITEMS

| | |
|---|---|
| All | 186 |
| Tax Fraud | 20 |
| Beaconing Malware | 15 |
| User-Agent | 12 |
| Trends | 5 |
| Internal Phishing | 35 |
| External Phishing | 40 |
| Internal Threats | 5 |
| External Threats | 10 |
| IDS | 17 |
| Synthetics | 12 |
| AML | 15 |

Inbox ▼ / 1904
Inbox
Archive

☐ !! Activity summary for Acct # 1074911    Synthetics
   1 hour ago

☐ !! Activity summary for Acct # 1078704    Synthetics
   2 hours ago

☐ !! Activity summary for Acct # 1077661    Synthetics
   5 hours ago

☐ !! Activity summary for Acct # 1075043    Synthetics
   5 hours ago

☐ !! Activity summary for Acct # 1075587    AML
   10 hours ago

☐ Activity summary for Acct # 1074328    AML
   1 hour ago

☐ Activity summary for Acct # 1074320    Synthetics
   2 hours ago

☐ Activity summary for Acct # 1077940    Synthetics
   1 day ago

☐ Activity summary for Acct # 1078779    AML
   1 day ago

☐ Activity summary for Acct # 1075896    AML
   2 days ago

SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Embodiments of the present disclosure generally relate to data item clustering.

In a fraud investigation an analyst may have to make decisions regarding selection of electronic data items within an electronic collection of data. Such a collection of data may include a large number of data items that may or may not be related to one another, and which may be stored in an electronic data store or memory. For example, such a collection of data may include hundreds of thousands, millions, tens of millions, hundreds of millions, or even billions of data items, and may consume significant storage and/or memory. Determination and selection of relevant data items within such a collection of data may be extremely difficult for the analyst. Further, processing of such a large collection of data (for example, as an analyst uses a computer to sift and/or search through huge numbers of data items) may be extremely inefficient and consume significant processing and/or memory resources.

In some instances related electronic data items may be clustered and stored in an electronic data store. Even when electronic data items are clustered, however, the electronic collection of data may include hundreds of thousands, millions, tens of millions, hundreds of millions, or even billions of clusters of data items. As with individual data items, determination and selection of relevant clusters of data items within such a collection of data may be extremely difficult for the analyst. Further, processing and presenting such clusters of data items in an efficient way to an analyst may be a very challenging task.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a data analysis system that may automatically generate memory-efficient clustered data structures, automatically analyze those clustered data structures, automatically tag and group those clustered data structures, and provide results of the automated analysis and grouping in an optimized way to an analyst. The automated analysis of the clustered data structures (also referred to herein as "data item clusters," "data clusters," or simply "clusters") may include an automated application of various criteria or rules so as to generate a tiled display of the groups of related data clusters such that the analyst may quickly and efficiently evaluate the groups of data clusters. In particular, the groups of data clusters (referred to herein as "dossiers") may be dynamically re-grouped and/or filtered in an interactive user interface so as to enable an analyst to quickly navigate among information associated with various dossiers and efficiently evaluate the groups of data clusters in the context of, for example, a fraud investigation. Embodiments of the present disclosure also relate to automated scoring of the groups of clustered data structures. The interactive user interface may be updated based on the scoring, directing the human analyst to more dossiers (for example, groups of data clusters more likely to be associated with fraud) in response to the analyst's inputs.

As described below, groups of data clusters may include one or more data items. A data item may include any data, information, or things, such as a person, a place, an organization, an account, a computer, an activity, and event, and/or the like. In an example application, a human analyst may be tasked with deciding whether an account data item represents a fraudulent bank account. However, an individual data item oftentimes includes insufficient information for the analyst to make such decisions. Rather, the analyst may make better decisions based upon a collection of related data items. For instance, two financial transactions may be related by an identical account identifier or two accounts belonging to one customer may be related by an identical customer identifier or other attribute (e.g., a shared phone number or address). Some currently available systems assist the analyst by identifying data items that are directly related to an initial data item. For example, the analyst could initiate an investigation with a single suspicious data item or "seed," such as a fraudulent credit card account. If the analyst examined this data item by itself, then the analyst would not observe any suspicious characteristics. However, the analyst could request a list of data items related to the seed by a shared attribute, such as a customer identifier. In doing so, the analyst could discover an additional data item, such as an additional credit card account, which relates to the original fraudulent account because of a shared customer identifier. The analyst could then mark the additional credit card account as potentially fraudulent, based upon the relationship of the shared customer identifier.

Although these currently available systems can be helpful in discovering related data items, they typically require the analyst to manually repeat the same series of searches for many investigations. Repeating the same investigation process consumes time and resources, such that there are oftentimes more investigations than can be performed. Thus, analysts typically prioritize investigations based upon the characteristics of the seeds. However, there may be insignificant differences between the seeds, so the analyst may not be able to determine the correct priority for investigations. For instance, the analyst could have to choose between two potential investigations based upon separate fraudulent credit card accounts. One investigation could reveal more potentially fraudulent credit card accounts than the other, and therefore could be more important to perform. Yet, the characteristics of the two original credit card accounts could be similar, so the analyst would not be able to choose the more important investigation. Without more information, prioritizing investigations, and evaluating data items, is difficult and error prone.

In contrast with these currently available systems, and as described above, according to various embodiments the data analysis system of the present disclosure automatically creates clusters of related data items, scores those clusters, tags and groups the clusters, and generates an interactive user interface in which, in response to inputs from the analyst, information related to the groups of clusters may be efficiently provided to the analyst. Accordingly, the analyst may be enabled to efficiently evaluate the groups of clusters.

Generation of the memory-efficient clustered data structures may be accomplished by automatic selection of an initial data item of interest (also referred to herein as a "seed"), adding of the initial data item to the memory-efficient clustered data structure (or, alternatively, designating the initial data item as the clustered data structure, or an initial iteration of the clustered data structure), and determining and adding one or more related data items to the cluster. In various embodiments, a generated cluster may include far fewer data items than the collection of data described above, and the data items included in the cluster may only include those data items that are relevant to a particular investigation (for example, a fraud investigation). Accordingly, in an embodiment, processing of the generated cluster may be highly efficient as compared to the collection of data described above. This may be because, for example, a given fraud investigation by an analyst (for example, as the analyst sifts and/or searches through data items of one or more grouped clusters) may only require storage in memory of a single set of grouped cluster data structures. Further, a number of data items in the group of clusters may be several orders of magnitude smaller than in the entire electronic collection of data described above because only data items related to each other are included in the clusters.

Additionally, the automated analysis and scoring of clusters (as mentioned above) may enable highly efficient evaluation of the various data clusters by a human analyst. For example, the interactive user interface is generated so as to enable an analyst to quickly view critical groups of data clusters (as determined by the automated scoring), and then in response to analyst inputs, view and interact with the generated information (including, for example, time-based charts and/or other information) associated with the clusters. In response to user inputs the user interface may be updated to display raw data associated with each of the generated groups of clusters if the analyst desires to dive deeper into data associated with a given group of clusters.

In various embodiments, seeds may be automatically selected/generated according to various seed determination strategies, and clusters of related data items may be generated based on those seeds and according to cluster generation strategies (also referred to herein as "cluster strategies"). Also, as mentioned above, the system may generate a score, multiple scores, and/or metascores for each generated cluster, and may optionally rank or prioritize the generated clusters based on the generated scores and/or metascores. High priority clusters may be of greater interest to an analyst as they may contain related data items that meet particular criteria related to the analyst's investigation. In an embodiment, the system may enable an analyst to advantageously start an investigation with a prioritized cluster, or group of clusters, including many related data items rather than a single randomly selected data item. Further, as described above, the cluster prioritization may enable the processing requirements of the analyst's investigation to be highly efficient as compared to processing of the huge collection of data described above. As mentioned above, this is because, for example, a given investigation by an analyst may only require storage in memory of a limited number of data items associated with a small number of clusters, and further, a number of data items in a cluster may be several orders of magnitude smaller than in the entire electronic collection of data described above because only data items related to each other are included in the cluster. Further, an analyst may not need to view many (or, alternatively, any) data items associated with a cluster to evaluate the cluster, but rather may evaluate the cluster based on the automatically generated cluster information.

In various embodiments, grouping of related data clusters enables an analyst to review the data in a logical way. For example, the data clusters may be tagged and grouped according to a person, a type of event, and/or the like. Accordingly, the analyst may be enabled to evaluate all data related to a person in the context of a particular investigation, further increasing the efficiency of the analyst. Additionally, the same data clusters may be dynamically grouped a re-grouped in different ways, and filtered based on various criteria, enabling the analyst to even more efficiently evaluate the various data items. Further, when a group of related data clusters is determined by the analyst to not be important, the analyst may quickly dismiss all data items of that group of clusters, rather than each data item separately.

In various embodiments, a single master instance of each data item is stored by the system. The master instance of each data item includes all metadata and other information associated with the data item, as well as a unique data item identifier. When generating clusters and groups of clusters, in some embodiments, the master instances of the data items are referenced by their data item identifiers rather than making copies of the data items in each cluster. This advantageously enables memory savings and the data items do not have to be copied multiple times. Additionally, any updates to a master data item may be rapidly propagated to all references of the data item in each cluster, thus reducing processing requirements.

According to an embodiment, a computer system is disclosed comprising: one or more computer readable storage devices configured to store: a plurality of computer executable instructions; a plurality of data cluster types, each data cluster type associated with a data clustering strategy and a plurality of data cluster tagging rules; and a plurality of data clusters, each data cluster associated with a data cluster type and previously generated according to the associated respective data clustering strategy, each data cluster further including one or more data items and associated metadata; and one or more hardware computer processors in communication with the one or more computer readable storage devices and configured to execute the plurality of computer executable instructions in order to cause the computer system to: for each particular data cluster of the plurality of data clusters: access the particular data cluster from the one or more computer readable storage devices; determine the data cluster type associated with the particular data cluster; and associate one or more tags with the particular data cluster based on the data cluster tagging rules associated with the determined data cluster type; generate user interface data for rendering an interactive user interface on a computing device, the interactive user interface including one or more selectable elements useable by a user for indicating a tag type; identify tags associated with each of the plurality of data clusters that have a particular tag type; generate one or more groups of data clusters, each of the one or more groups including one or more of the plurality of data clusters that have a common tag value associated with the identified tags; and update the user interface data such that the interactive user interface further includes one or more tiles, each tile associated with a particular group of the one or more groups.

According to an aspect, associating one or more tags with the particular data cluster comprises: determining one or more tag types associated with the data cluster type.

According to another aspect, associating one or more tags with the particular data cluster further comprises: analyzing the particular data cluster to identify one or more tag values to associated with at least one of the one or more tag types.

According to yet another aspect, associating one or more tags with the particular data cluster further comprises: associating a first tag with the particular data cluster, the first tag indicating the data cluster type associated with the particular data cluster.

According to another aspect, the one or more hardware computer processors are further configured to execute the plurality of computer executable instructions in order to cause the computer system to: receive an indication of the particular tag type via a user selection of one of the one or more selectable elements.

According to yet another aspect, the one or more hardware computer processors are further configured to execute the plurality of computer executable instructions in order to cause the computer system to: determine the one or more one or more selectable elements based on one or more tag types associated with a type of investigation to be performed by the user.

According to another aspect, the one or more hardware computer processors are further configured to execute the plurality of computer executable instructions in order to cause the computer system to: identify second tags associated with each of the plurality of data clusters that have a second particular tag type; generate second one or more groups of data clusters, each of the second one or more groups including one or more of the plurality of data clusters that have a common tag value associated with the identified second tags; and update the user interface data such that the interactive user interface includes second one or more tiles, each of the second one or more tiles associated with a particular group of the second one or more groups.

According to yet another aspect, the one or more hardware computer processors are further configured to execute the plurality of computer executable instructions in order to cause the computer system to: receive an second indication of the second particular tag type via a second user selection of a second one of the one or more selectable elements.

According to another aspect, the interactive user interface further includes one or more selectable filter criteria, wherein the one or more hardware computer processors are further configured to execute the plurality of computer executable instructions in order to cause the computer system to: filter the plurality of data clusters based on one or more filter criteria.

According to yet another aspect, the one or more hardware computer processors are further configured to execute the plurality of computer executable instructions in order to cause the computer system to: receive an indication of the one or more filter criteria via a user selection of at least one of the one or more selectable filter criteria.

According to another aspect, the one or more selectable filter criteria include at least one of a tag, a cluster type, or a state.

According to yet another aspect, filtering the plurality of data clusters comprises: determining a set of data clusters of the plurality of data clusters satisfying the one or more filter criteria, wherein the generating the one or more groups of data clusters is based on the determined set of data clusters.

According to yet another aspect, filter criteria of the one or more filter criteria of the same type are applied disjunctively when filtering the plurality of data clusters.

According to another aspect, filter criteria of the one or more filter criteria of different types are applied conjunctively when filtering the plurality of data clusters.

According to yet another aspect, each of the one or more tags includes indications of: a tag value associated with the particular group; and a number of data clusters in the particular group.

According to another aspect, each of the one or more tags further includes an indication of: a number of critical data clusters in the particular group.

According to yet another aspect, each of the one or more tags further includes an indication of: a time-based graph of data associated with the data clusters in the particular group.

According to another aspect, the one or more hardware computer processors are further configured to execute the plurality of computer executable instructions in order to cause the computer system to: receive a selection of one of the one or more tiles; and update the user interface data such that the interactive user interface includes: an indication of at least one cluster associated with the particular group associated with the one of the one or more tiles; and a time-based graph of data associated with the data clusters in the particular group.

According to yet another aspect, the interactive user interface further includes one or more selectable assignable states, wherein the one or more hardware computer processors are further configured to execute the plurality of computer executable instructions in order to cause the computer system to: receive an indication of one of the assignable states via a user selection of one of the one or more selectable assignable states; associate one or more groups of data clusters with the indicated one of the assignable states.

In various embodiments, computer-implemented methods are disclosed in which, under control of one or more hardware computing devices configured with specific computer executable instructions, one or more aspects of the above-described embodiments are implemented and/or performed.

In various embodiments, a non-transitory computer-readable storage medium storing software instructions is disclosed that, in response to execution by a computer system having one or more hardware processors, configure the computer system to perform operations comprising one or more aspects of the above-described embodiments.

Further, as described herein, a data analysis system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of data item clusters), automatic and dynamic execution of complex processes in response to the input delivery (for example, grouping and filtering of data item clusters), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of data items of various types. An analyst may be able to start an investigation from a group of clusters of related data items instead of an individual data item, which may reduce the amount of time and effort required to perform the investigation. The disclosed techniques may also, according to various embodiments, provide a prioritization of multiple clusters, and dynamic re-grouping of related clusters and cluster filtering. For example, the analyst may also be able to start the investigation from a high priority group of clusters, which may allow the analyst to focus on the most important investigations, and may quickly evaluate that group of clusters based on the efficient user interface generated by the system. In each case, the processing and memory requirements of such an investigation may be significantly reduced due to the creation and use of highly efficient cluster data structures of related data items.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

Cluster Analysis

Figure 10A:
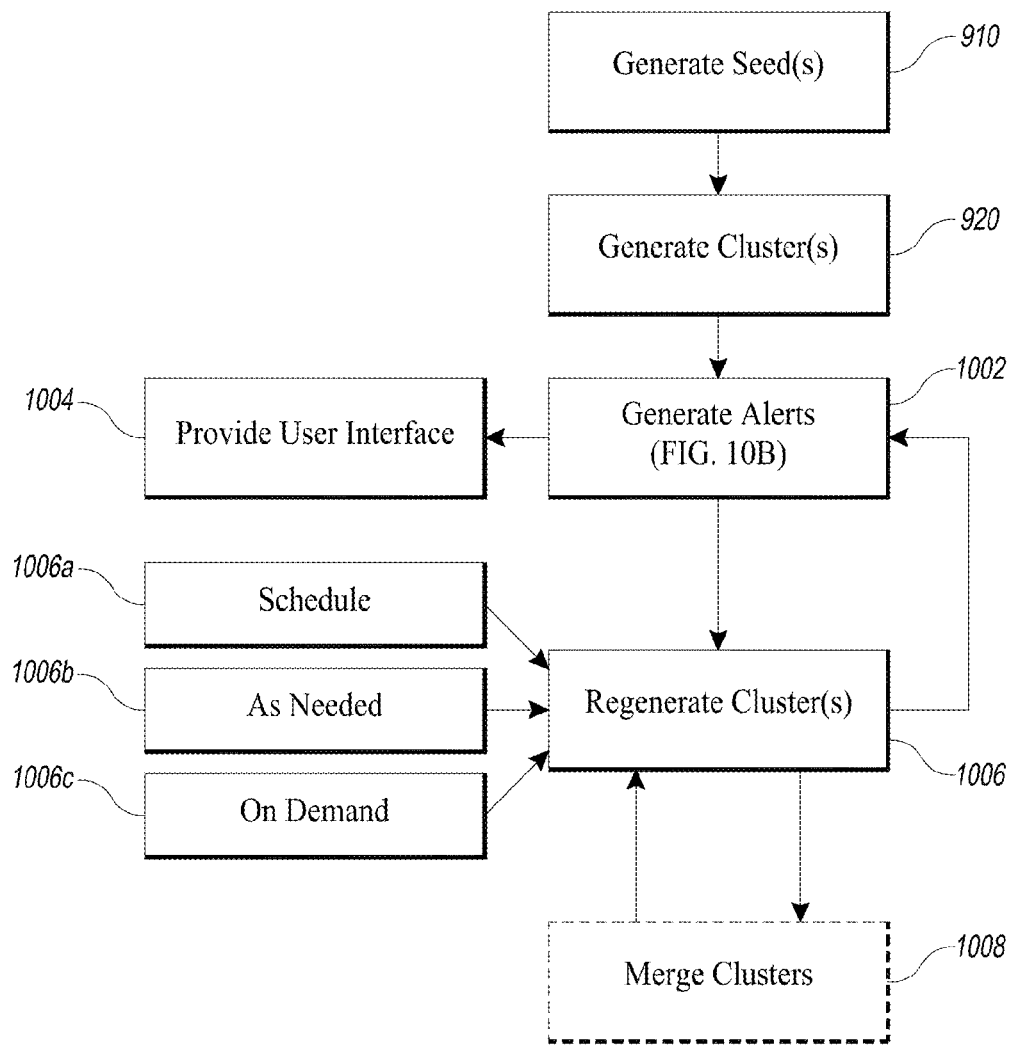

FIG. 10A is a flowchart for an example method of data cluster analysis, according to an embodiment of the present disclosure.

Figure 10B:
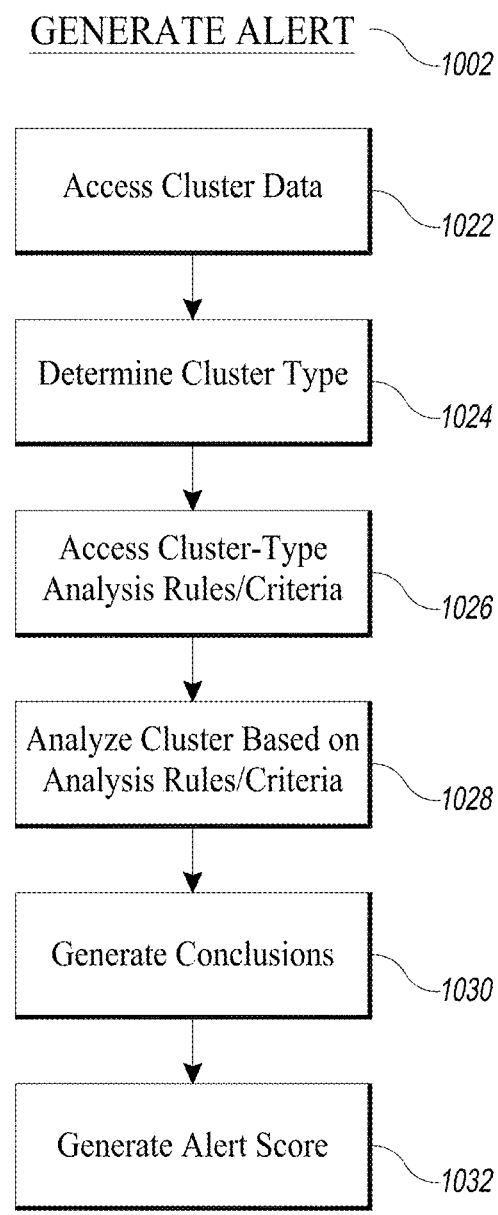

FIG. 10B is a flowchart of an example method of alert generation, according to an embodiment of the present disclosure.

FIG. 10C illustrates various example conclusions associated with various types of data clusters, according to various embodiments of the present disclosure.

FIGS. 11-20 illustrate example data cluster analysis user interfaces of the data analysis system, according to embodiments of the present disclosure.

Figure 21:
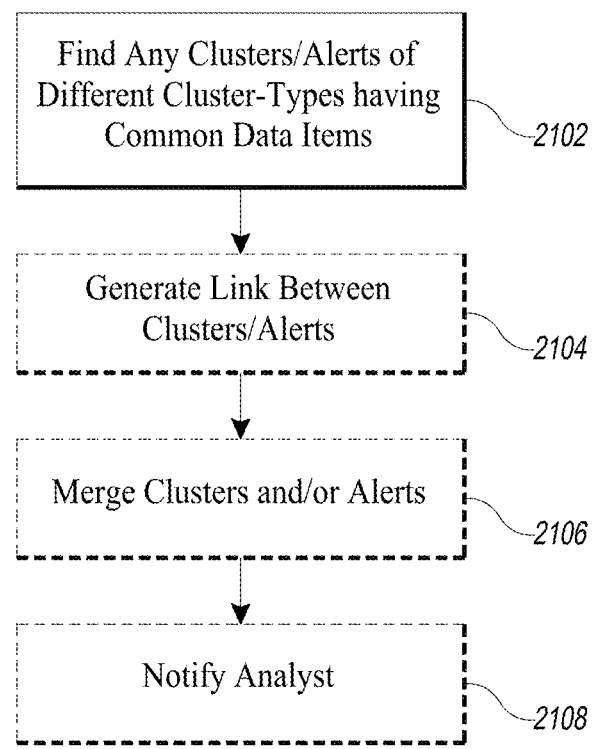

FIG. 21 is a flowchart of an example method of linking related alerts or data clusters, according to an embodiment of the present disclosure.

Figure 22:

FIG. 22 illustrates an example data cluster analysis user interface in which related alerts or data clusters are linked to one another, according to an embodiment of the present disclosure.

Figure 23:
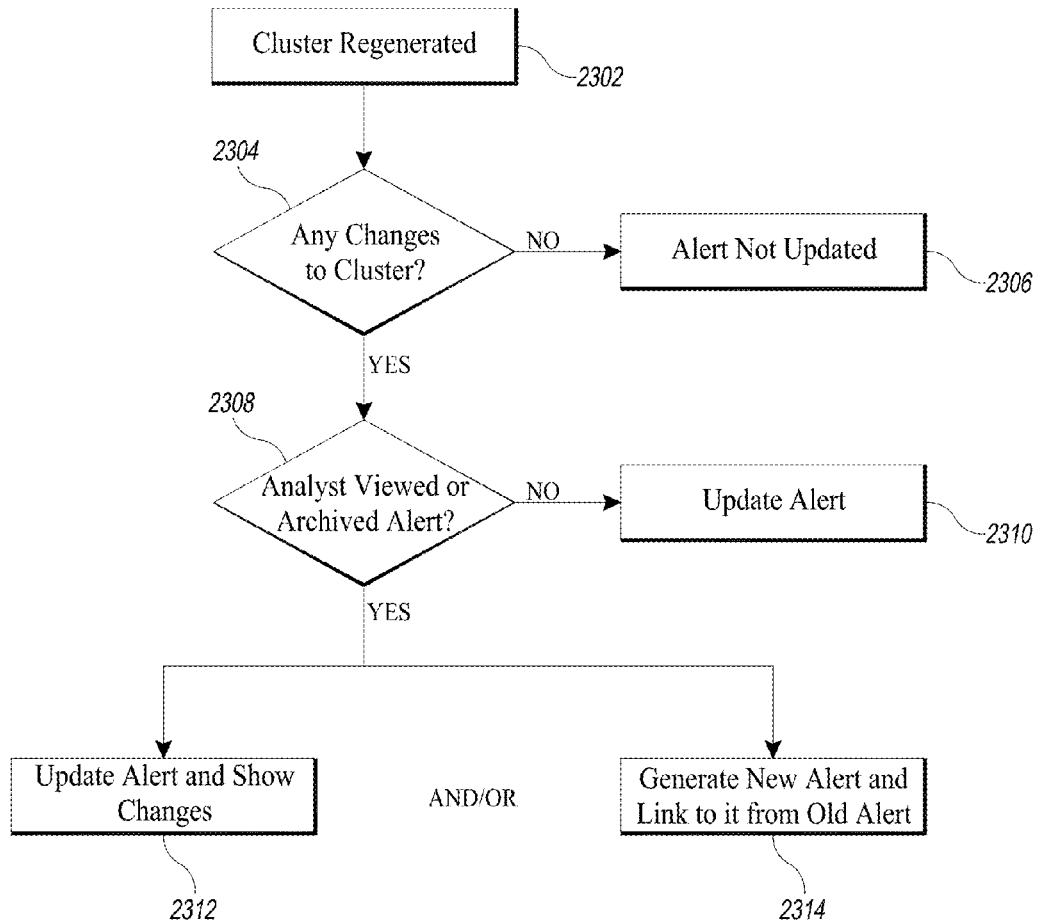

FIG. 23 is a flowchart of an example method of updating alerts in response to cluster regeneration, according to an embodiment of the present disclosure.

Cluster Tagging and Grouping

Figure 24:
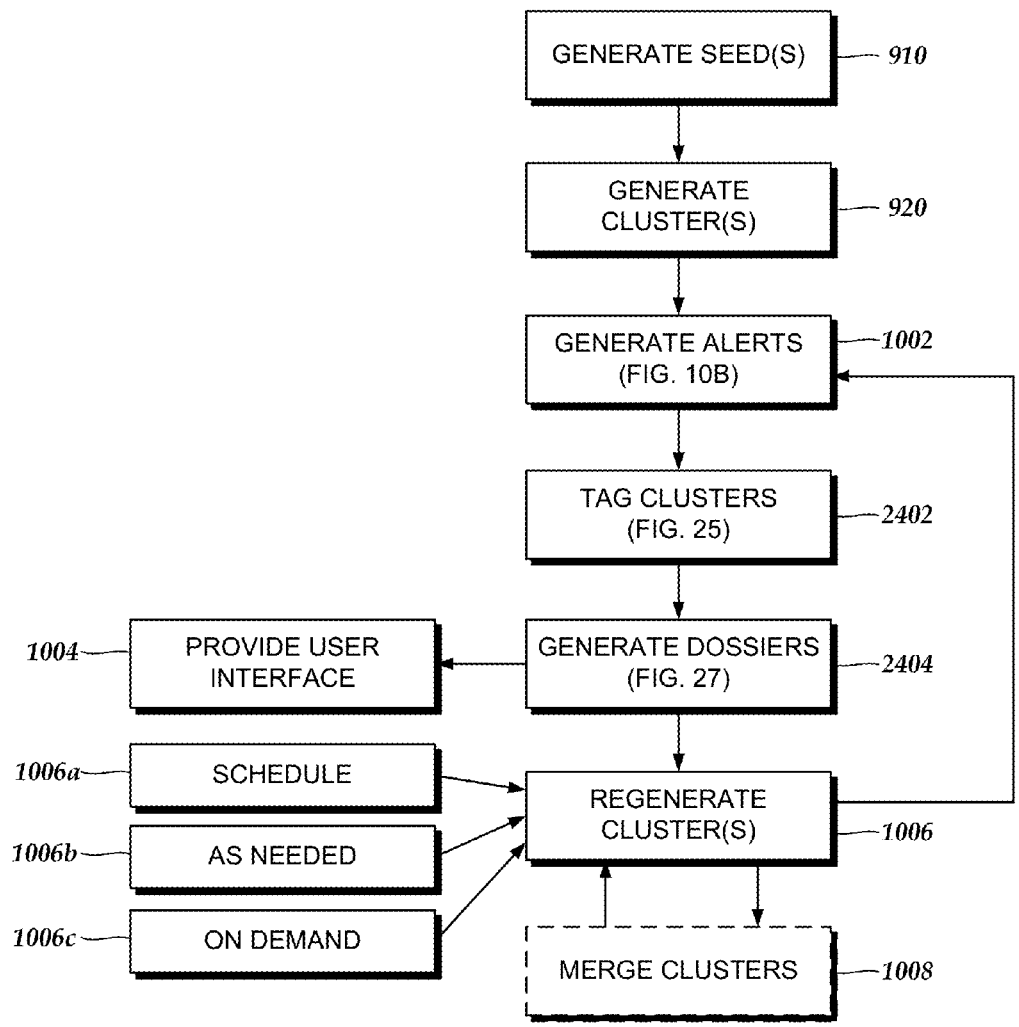

FIG. 24 is another flowchart of an example method of data cluster analysis, according to an embodiment of the present disclosure.

Figure 25:
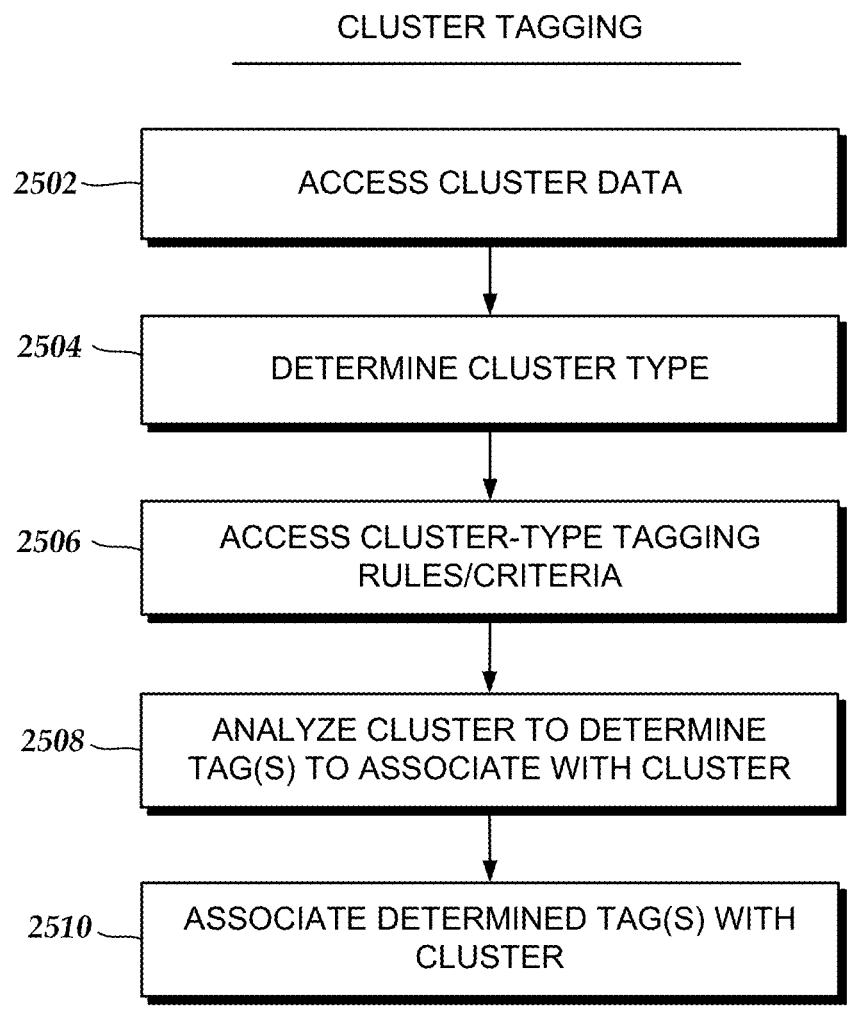

FIG. 25 is a flowchart of an example method of cluster tagging, according to an embodiment of the present disclosure.

Figure 26:
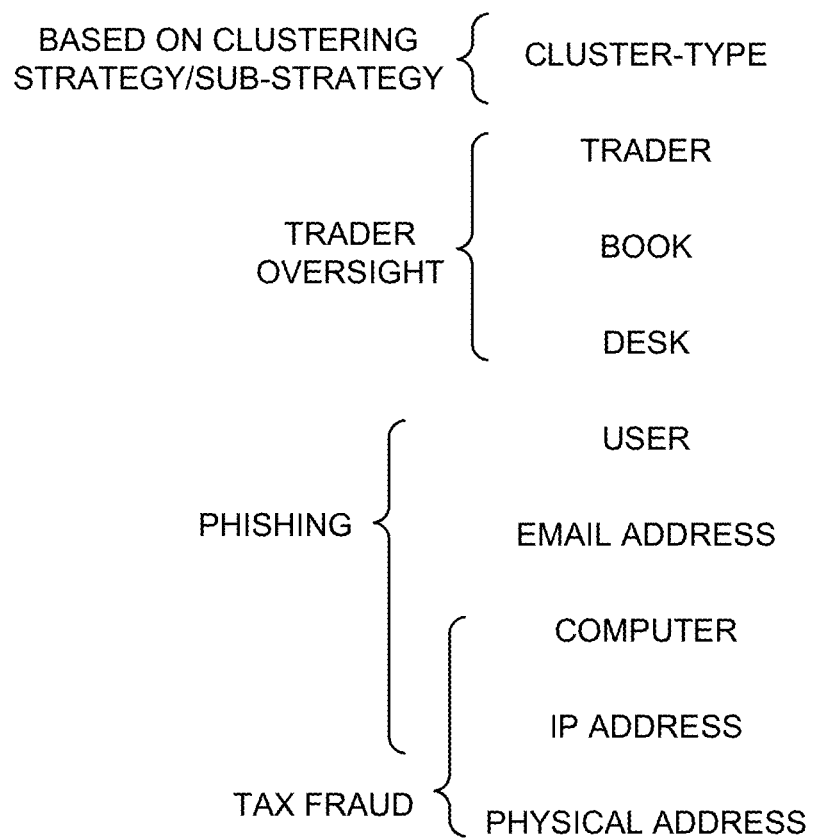

FIG. 26 shows examples of cluster tag types.

Figure 27:
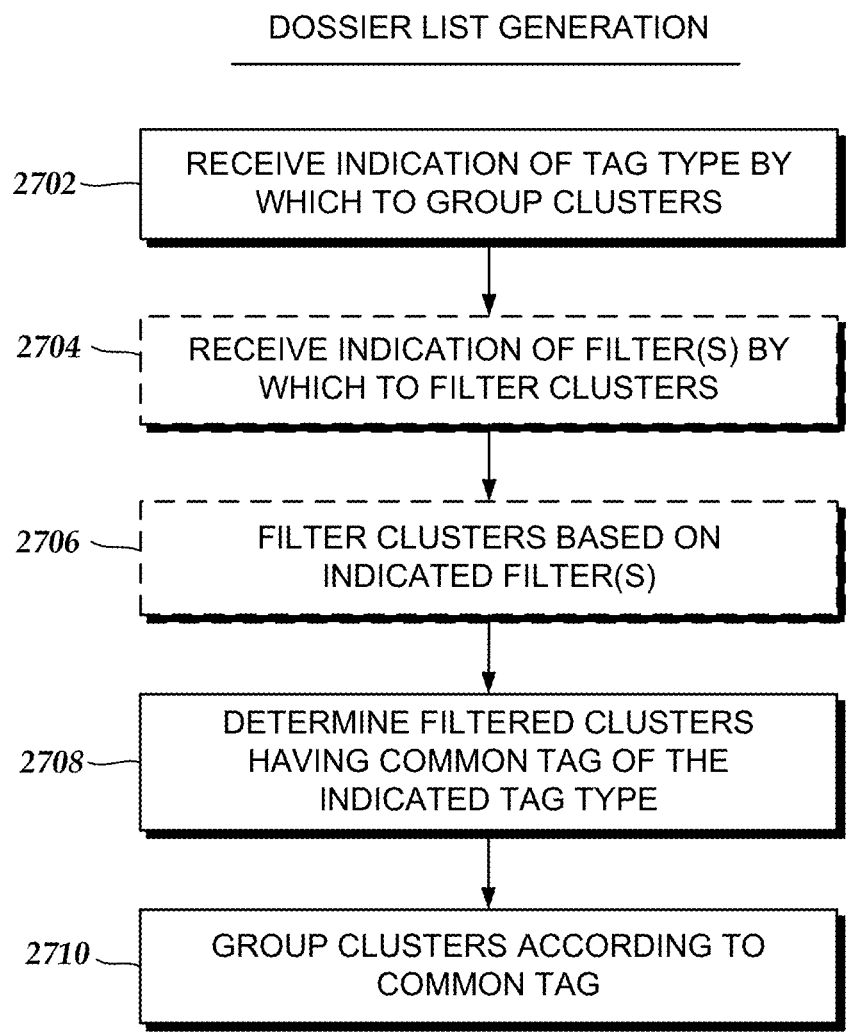

FIG. 27 is a flowchart of an example method of dossier list generation, according to an embodiment of the present disclosure.

FIGS. 28-34 illustrate example dossier analysis user interfaces of the data analysis system, according to embodiments of the present disclosure.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item," "data object," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Seed: One or more data items that may be used as a basis, or starting point, for generating a cluster. A seed may be generated, determined, and/or selected from one or more sets of data items according to a seed generation strategy. For example, seeds may be generated from data items accessed from various databases and data sources including, for example, databases maintained by financial institutions, government items, private items, public items, and/or publicly available data sources.

Cluster: A group or set of one or more related data items/objects/items. A cluster may be generated, determined, and/or selected from one or more sets of data items according to a cluster generation strategy. A cluster may further be generated, determined, and/or selected based on a seed. For example, a seed may comprise an initial data item of a cluster. Data items related to the seed may be determined and added to the cluster. Further, additional data items related to any clustered data item may also be added to the cluster iteratively as indicated by a cluster generation strategy. Data items may be related by any common and/or similar properties, metadata, types, relationships, and/or the like. Clusters may also be referred to herein as "clustered data structures," "data item clusters," and "data clusters."

Seed/Cluster Generation Strategy (also referred to herein as Seed/Cluster Generation Rule(s)): Seed and cluster generation strategies/rules indicate processes, methods, and/or strategies for generating seeds and generating clusters, respectively. For example, a seed generation strategy may indicate that data items having a particular property (for example, data items that are credit card accounts) are to be designated as seeds. In another example, a cluster generation strategy may indicate that data items having particular properties in common with (or similar to) a seed or other data item in a cluster are to be added to the cluster. Seed and/or cluster generation strategies may specify particular searches and/or rule matches to perform on one or more sets of data items. Execution of a seed and/or cluster generation strategy may produce layers of related data items. Additionally, a seed/cluster generation strategy/rule may include multiple strategies, sub-strategies, rules, and/or sub-rules.

Dossier: A group of clusters and/or a user interface for displaying information associated with a group of clusters. In various embodiments, as described below, clusters of data items may be grouped together according to similar tags applied to those clusters. For example, two clusters may both be tagged "trader 1." Accordingly, the two cluster may be grouped together and designated a "dossier" or "trader 1 dossier." A user interface displaying information associated with data items from the two grouped clusters may also be referred to as a "dossier" or a "dossier user interface."

Overview

This disclosure relates to a data analysis system (also referred to herein as the "system") in which memory-efficient clustered data structures (also referred to herein as "clusters") of related data items may be automatically generated and analyzed, tagged, grouped, and results may be provided for interaction from an analyst, for example. Generation of clusters may begin by automatic generation, determination, and/or selection of an initial data item of interest, called a "seed." As mentioned above, a data item may include any data, information, or things, such as a person, a place, an organization, an account, a computer, an activity, and event, and/or the like. Seeds may be automatically selected/generated according to various seed determination strategies, and clusters of related data items may be generated based on those seeds and according to cluster generation strategies (also referred to herein as "cluster strategies," "clustering strategies," and/or "cluster generation rules"). Seeds and related data items may be accessed from various databases and data sources including, for example, databases maintained by financial institutions, government entities, private entities, public entities, and/or publicly available data sources. Such databases and data sources may include a variety of information and data, such as, for example, personal information, financial information, tax-related information, computer network-related data, and/or computer-related activity data, among others. Further, the databases and data sources may include various relationships that link and/or associate data items with one another. Various data items and relationships may be stored across different systems controlled by different items and/or institutions. According to various embodiments, the data analysis system may bring together data from multiple data sources in order to build clusters.

The automated analysis of the clusters may include an automated tagging of the clusters based on a type of each cluster and data associated with the cluster, and grouping of clusters that are similarly tagged. Via a user interface of the system, an analyst may select criteria for grouping and re-grouping of clusters. Accordingly, the system enables dynamic grouping of clusters in various ways to make an investigation more efficient. Further, the system enables filtering of the clusters according to various criteria in response to the analyst's inputs, and dynamic and interactive updating of the user interfaces in response to the grouping and/or filtering. The automated analysis may also include generation of time-based charts showing information associated with the groups of data clusters.

The automated analysis of the clusters may further include an automated application of various criteria or rules so as to generate a compact, human-readable analysis of the data clusters. The human-readable analyses (also referred to herein as "summaries" or "conclusions") of the data clusters may be organized into an interactive user interface so as to enable an analyst to quickly navigate among information associated with various data clusters and efficiently evaluate those data clusters in the context of, for example, a fraud investigation. Embodiments of the present disclosure also disclose automated scoring of the clustered data structures by the data analysis system. The interactive user interface may be updated based on the scoring, directing the human analyst to more critical data clusters (for example, data clusters more likely to be associated with fraud) in response to the analyst's inputs.

In various embodiments, the data analysis system may enable an analyst (and/or other user) to efficiently perform analysis and investigations of various data clusters and related data items. For example, the system may enable an analyst to perform various financial and security investigations of data clusters of related data items. In such an investigation, the system may automatically create clusters of related data items, generate human-readable conclusions of the clusters, score those clusters, and generates an interactive user interface in which, in response to inputs from the analyst, information related to the clusters may be efficiently provided to the analyst. For example, a credit card account may be a seed that is linked by the system to various data items including, for example, customer identifiers and/or phone numbers associated with the credit card account. Further, the system may link, for example, various other credit card accounts related to the customer identifiers, to the seed credit card account.

Accordingly, in various embodiments, the system may automatically cluster of various layers of data items related to the seed credit card account. One or more rules or criteria may then automatically be applied to the cluster so as to generate one or more compact, human-readable analyses (also referred to herein as "summaries" or "conclusions") of the data clusters. The human-readable analyses may comprise phrases or sentences that provide highly relevant, and easily evaluated (by a human), information regarding the data in the cluster (for example, data items and metadata). For example, a conclusion in the current example may be "4 customer identifiers are associated with the current cluster," or "The 2 credit card accounts in the cluster have been used in 3 different countries." Such conclusions in an investigation may, in an embodiment, enable the analyst to determine a likelihood of fraudulent activity associated with the cluster. Further, the data items of the cluster may then be linked to possible fraudulent activity. For example, the seed credit card account and the additional credit card accounts may all be linked to the potentially fraudulent activity. As mentioned above, in such an investigation the analyst may efficiently determine likely fraud, as well as discover relationships between the additional credit card accounts and the seed credit card account through several layers of related data items. Such techniques, enabled by various embodiments of the data analysis system, may be particularly valuable for investigations in which relationships between data items may include several layers, and in which such relationships may be otherwise very difficult or impossible to manually identify.

In various embodiments, the data analysis system may automatically generate, or determine, seeds based on a seed generation strategy (also referred to as "seed generation rules"). For example, for a particular set of data items, the data analysis system may automatically generate, based on a seed generation strategy, seeds by designating particular data items (and/or groups of data items) as seeds. Examples of various seed generation strategies are described below.

Further, in various embodiments, the data analysis system may automatically discover data items related to a seed, and store the resulting relationships and related data items together in a "cluster" (or, alternatively, designating the seed as the initial cluster (or initial data item of the cluster) and adding the discovered data items of the cluster). A cluster generation strategy may specify particular searches to perform at each step of an investigation, or cluster generation, process. Such searches may produce layers of related data items to add to the cluster. Further, according to an embodiment, multiple clusters may be merged and/or collapsed into a single cluster when the multiple clusters share one or more common data items and/or properties. Thus, according to an embodiment, an analyst may start an investigation with the resulting cluster, rather than the seed alone. Starting with the cluster, and associated human-readable conclusions, the analyst may form opinions regarding the related data items, conduct further analysis of the related data items, and/or may query for additional related data items.

According to various embodiments, the data analysis system may further generate various "cluster scores." Cluster scores may include scores based on various characteristics and/or attributes associated with the cluster and/or the various data items of the cluster. In various embodiments, the data analysis system may also generate "cluster metascores" which may include, for example, an overall cluster score. Cluster metascores may, for example, be based on a combination of cluster scores of a cluster associated with a seed. In an embodiment, the system may further generate "alert scores." Alert scores may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below. Further, cluster scores may be based on one or more generated conclusions related to the cluster, and/or the conclusions may be generated based on cluster scores.

Further, in various embodiments, for a particular set of data items, multiple clusters may be generated by the data analysis system. For example, the data analysis system may generate multiple seeds according to a seed generation strategy, and then multiple clusters based on those seeds (and based on a cluster generation strategy). In such embodiments, the data analysis system may prioritize the multiple generated clusters based upon cluster scores and/or cluster metascores. In an embodiment, the data analysis system may provide a user interface including a display of human-readable conclusions of the clusters, cluster scores, cluster metascores, and/or various other cluster information. Such a user interface may be organized according to a prioritization of clusters. In various embodiments, cluster prioritization may assist an analyst in selecting particular clusters to investigate.

In various embodiments, the interactive user interface generated by the system may provide a list of clusters according to one or more alert scores (as mentioned above and described in detail below). Further, in response to an analyst selecting a cluster, information associated with the cluster may be provided to the analyst. For example, the analyst may be provided with a name of the cluster, a cluster strategy by which the cluster was generated, a list of generated conclusions, and/or one or more lists or tables of data related to the cluster. For example, the one or more lists or tables of data related to the cluster may be drawn from the data items of the cluster, and may be filtered by the analyst according to time and/or type of data. In an embodiment, various generated clusters in the interactive user interface may be organized according to clustering strategies whereby each of the clusters were generated. In an embodiment, a cluster type may be associated with each cluster, and may be determined according to the cluster strategy that generated the cluster.

As mentioned above, in various embodiments, a generated cluster may include far fewer data items than are included in a full source database and/or references to master instances of data items, and the data items included in the cluster may only include those data items that are relevant to a particular investigation (for example, a fraud investigation). Accordingly, in an embodiment, processing of the generated cluster may be highly efficient as compared to the collection of data described above. This may be because, for example, a given fraud investigation by an analyst (for example, as the analyst sifts and/or searches through data items of a cluster) may only require storage in memory of a single cluster data structure. Further, a number of data items in a cluster may be several orders of magnitude smaller than in the entire electronic collection of data described above because only data items related to each other are included in the cluster.

Additionally, the automated analysis and scoring of clusters (as mentioned above) may enable highly efficient evaluation of the various data clusters by a human analyst. For example, the interactive user interface us generated so as to enable an analyst to quickly view critical data clusters (as determined by the automated scoring), and then in response to analyst inputs, view and interact with the generated information (including, for example, the human-readable conclusions) associated with the clusters. In response to user inputs the user interface may be updated to display raw data associated with each of the generated clusters if the analyst desires to dive deeper into data associated with a given cluster.

In various embodiments, the data analysis system may be used in various data analysis applications. Such applications may include, for example, trader oversight, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. Examples of many of the above-mentioned data analysis applications, including methods and systems for identifying data items, generating data clusters, and analyzing/scoring clusters, are disclosed in the various related applications listed above and previously incorporated by reference herein.

As mentioned in reference to various features of the disclosure below, this application is related to U.S. patent application Ser. No. 14/139,628, now U.S. Pat. No. 9,171,334, titled "TAX DATA CLUSTERING," and filed Dec. 23, 2013; U.S. patent application Ser. No. 14/139,603 now U.S. Pat. No. 8,788,407, titled "MALWARE DATA CLUSTERING," and filed Dec. 23, 2013; U.S. patent application Ser. No. 14/139,713, now U.S. Pat. No. 9,165,299, titled "USER-AGENT DATA CLUSTERING," and filed Dec. 23, 2013; U.S. patent application Ser. No. 14/139,640, now U.S. Pat. No. 9,177,344, titled "TREND DATA CLUSTERING," and filed Dec. 23, 2013; U.S. patent application Ser. No. 14/251,485, titled "FRAUD DETECTION AND SCORING," and filed Apr. 11, 2014; U.S. patent application Ser. No. 14/278,963, now U.S. Pat. No. 9,230,280, titled "CLUSTERING DATA BASED ON INDICATIONS OF FINANCIAL MALFEASANCE," and filed May 15, 2014; U.S. patent application Ser. No. 14/473,552, now U.S. Pat. No. 9,202,249, titled "DATA ITEM CLUSTERING AND ANALYSIS," and filed Aug. 29, 2014; U.S. patent application Ser. No. 14/473,920, titled "EXTERNAL MALWARE DATA ITEM CLUSTERING AND ANALYSIS," and filed Aug. 29, 2014; and U.S. patent application Ser. No. 14/473,860, now U.S. Pat. No. 9,021,260, titled "MALWARE DATA ITEM ANALYSIS," and filed Aug. 29, 2014. The entire disclosure of each of the above items is hereby made part of this specification as if set forth fully herein and incorporated by reference for all purposes, for all that it contains.

In the following description, numerous specific details are set forth to provide a more thorough understanding of various embodiments of the present disclosure. However, it will be apparent to one of skill in the art that the systems and methods of the present disclosure may be practiced without one or more of these specific details.

Examples of Data Items, Properties, and Links

In various embodiments, different types of data items may have different property types. For example, a "Person" data item may have an "Eye Color" property type and an "Event" data item may have a "Date" property type. Each property as represented by data in a database may have a property type defined by an ontology used by the database. Further, data items may be instantiated in a database in accordance with a corresponding object definition for the particular data item in the ontology. For example, a specific monetary payment (for example, an item of type "event") of US$30.00 (for example, a property of type "currency" having a property value of "US$30.00") taking place on Mar. 27, 2009 (for example, a property of type "date" having a property value of "3/27/

2009") may be stored in the database as an event object with associated currency and date properties as defined within the ontology.

Data objects defined in an ontology may support property multiplicity. In particular, a data item may be allowed to have more than one property of the same property type. For example, a "Person" data object may have multiple "Address" properties or multiple "Name" properties.

A link represents a connection between two data items and may be through any of a relationship, an event, and/or matching properties. A link may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister may both have an "Address" property that indicates where they live. If the brother and the sister live in the same home, then their "Address" properties likely contain similar, if not identical property values. In one embodiment, a link between two data item may be established based on similar or matching properties (for example, property types and/or property values) of the data item. These are just some examples of the types of connections that may be represented by a link and other types of connections may be represented; embodiments are not limited to any particular types of connections between data items. For example, a document may contain references to two different items. For example, a document may contain a reference to a payment (one data item), and a person (a second data item). A link between these two data items may represent a connection between these two items through their co-occurrence within the same document.

Each data item may have multiple links with another data item to form a link set. For example, two "Person" data items representing a husband and a wife may be linked through a "Spouse Of" relationship, a matching "Address" property, and/or one or more matching "Event" properties (for example, a wedding). Each link, as represented by data in a database, may have a link type defined by the database ontology used by the database.

In various embodiments, the data analysis system may access various data items and associated properties from various databases and data sources. Such databases and data sources may include a variety of information and data, such as, for example, personal information (for example, names, addresses, phone numbers, personal identifiers, and the like), financial information (for example, financial account information, transaction information, balance information, and the like), tax-related information (for example, tax return data, and the like), computer network-related data (for example, network traffic information, IP (Internet Protocol) addresses, user account information, domain information, network connection information, and the like), and/or computer-related activity data (for example, computer events, user actions, and the like), among others.

Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

I. Example Data Analysis System

Figure 1:
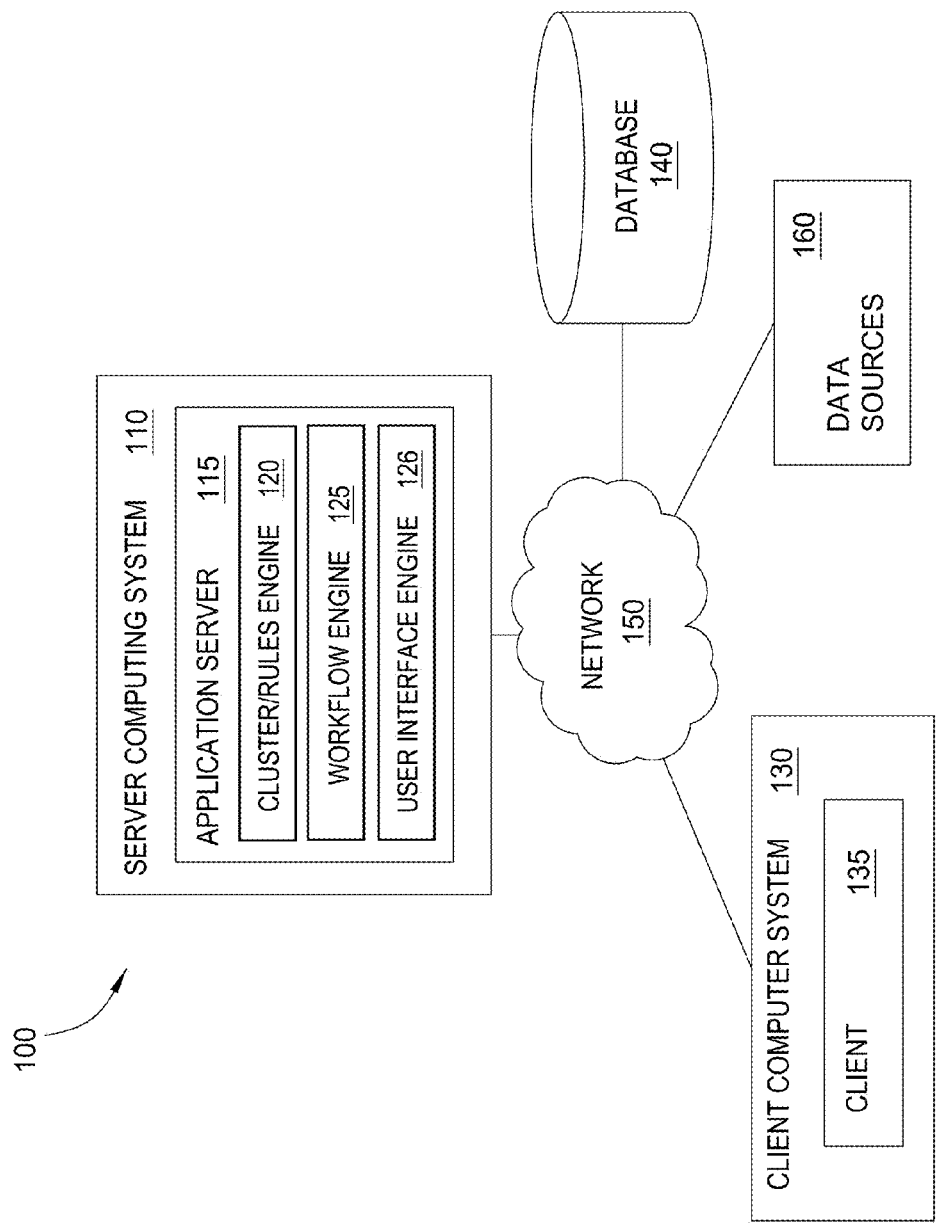
FIG. 1 is a block diagram illustrating an example data analysis system, according to an embodiment of the present disclosure.

FIG. 1 is a block diagram illustrating an example data analysis system 100, according to one embodiment. As shown in the embodiment of FIG. 1, the data analysis system 100 includes an application server 115 running on a server computing system 110, a client 135 running on a client computer system 130, and at least one database 140. Further, the client 135, application server 115, and database 140 may communicate over a network 150, for example, to access data sources 160.

The application server 115 may include a cluster engine (also referred to as a "rules engine") 120, a workflow engine 125, and a user interface engine 126. The cluster engine 120, a workflow engine 125, and user interface engine 126 may be software modules as described below in reference to FIG. 8. According to an embodiment, the cluster/rules engine 120 is configured to build one or more clusters of related data items according to a defined cluster generation strategy (including generating seeds according to seed generation strategies/rules), score clusters according to a scoring strategy, and/or analyze clusters including generating human-readable conclusions according to analysis rules/criteria. The cluster/rules engine 120 may read data from a variety of data sources 160 to generate seeds, generate clusters from seeds, score clusters, and analyze clusters. Once created, the resulting clusters may be stored on the server computing system 110 and/or on the database 140. The operations of the cluster/rules engine 120 are discussed in detail below.

As mentioned, in an embodiment, the cluster/rules engine 120 is configured to score the clusters, according to a defined scoring strategy. The score may indicate the importance of analyzing the cluster. For instance, the cluster/rules engine 120 may execute a scoring strategy that aggregates the account balances of credit card accounts within the cluster. Because, for example, a large aggregated total balance may indicate a large liability for a financial institution, a cluster with such a large total balance may be considered to have a higher score relative to other clusters with lower aggregated total balances (and, therefore, lower scores). Thus, a cluster with a higher score relative to a cluster with a lower score may be considered more important to analyze.

As described below, in an embodiment the cluster/rules engine 120 is configured to apply one or more analysis rules or criteria to the generated cluster to generate one or more human-readable conclusions (as mentioned above, also referred to herein as "summaries"). In various embodiments the one or more analysis rules/criteria may be based on one or more scoring strategies. Also, in various embodiments the scoring strategies may be based on one or more analysis rules/criteria. As described below, the cluster/rules engine 120 may generate an "alert score" for a given cluster. The alert score may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below.

In an embodiment, the user interface engine 126 generates various user interfaces of the data analysis system as described below. In one embodiment, the cluster engine 120, in conjunction with the user interface engine 126, organizes and presents the clusters and/or groups of clusters according to the assigned scores. The cluster engine 120 and the user interface engine 126 may present information associated with the clusters and/or interactive representations of the clusters within a user interface presented to the analyst, as described below. For example, the representations may provide visual indications (e.g., graphs or other visualizations) of the related data items within the clusters and/or groups of clusters. The cluster engine 120 and/or the user interface engine 126 may be configured and/or designed to generate user interface data useable for rendering the interactive user interfaces described herein, such as a web application and/or a dynamic web page displayed within the client 135. In various embodiments the user interface data may be transmitted to the client 135, and/or any other computing device, such that the example user interfaces are displayed to the analyst (and/or other users of the system). The cluster engine 120 and/or the user interface engine 126 may also allow an analyst to create tasks associated with the clusters. Example operations of the cluster engine 120 and/or the user interface engine 126 are discussed in detail below in conjunction with various figures. In one embodiment, the cluster engine 120 generates clusters automatically, for example, for subsequent review by analysts.

Analysts may also assign tasks to themselves or one another via a workflow user interface generated by the workflow engine 125 and/or the user interface engine 126, for example. The workflow engine 125 and/or the user interface engine 126 may consume scores generated by the cluster engine 120. For example, the workflow engine 125 and/or the user interface engine 126 may present an analyst with clusters generated, scored, and ordered by the cluster engine 120.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser (and/or other software program) accessing a web service and configured to render the user interfaces based on the user interface data.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given cluster In one embodiment, the data sources 160 provide data available to the cluster engine to create or generate seeds and/or to create or generate clusters from a seed or a set of seeds. Such data sources may include relational data sources, web services data, XML data, and the like. Further, such data sources may include a variety of information and data, for example, personal information, financial information, tax-related information, computer network-related data, and/or computer-related activity data, among others. For example, the data sources may be related to customer account records stored by a financial institution. In such a case, the data sources may include a credit card account data, bank account data, customer data, and transaction data. The data may include data attributes such as account numbers, account balances, phone numbers, addresses, and transaction amounts, and the like. Of course, data sources 160 is included to be representative of a variety of data available to the server computer system 110 over network 150, as well as locally available data sources.

The database 140 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 140 is shown as a distinct computing system, the database 140 may operate on the same server computing system 110 as the application server 115.

II. Example Cluster Generation

Figure 2:
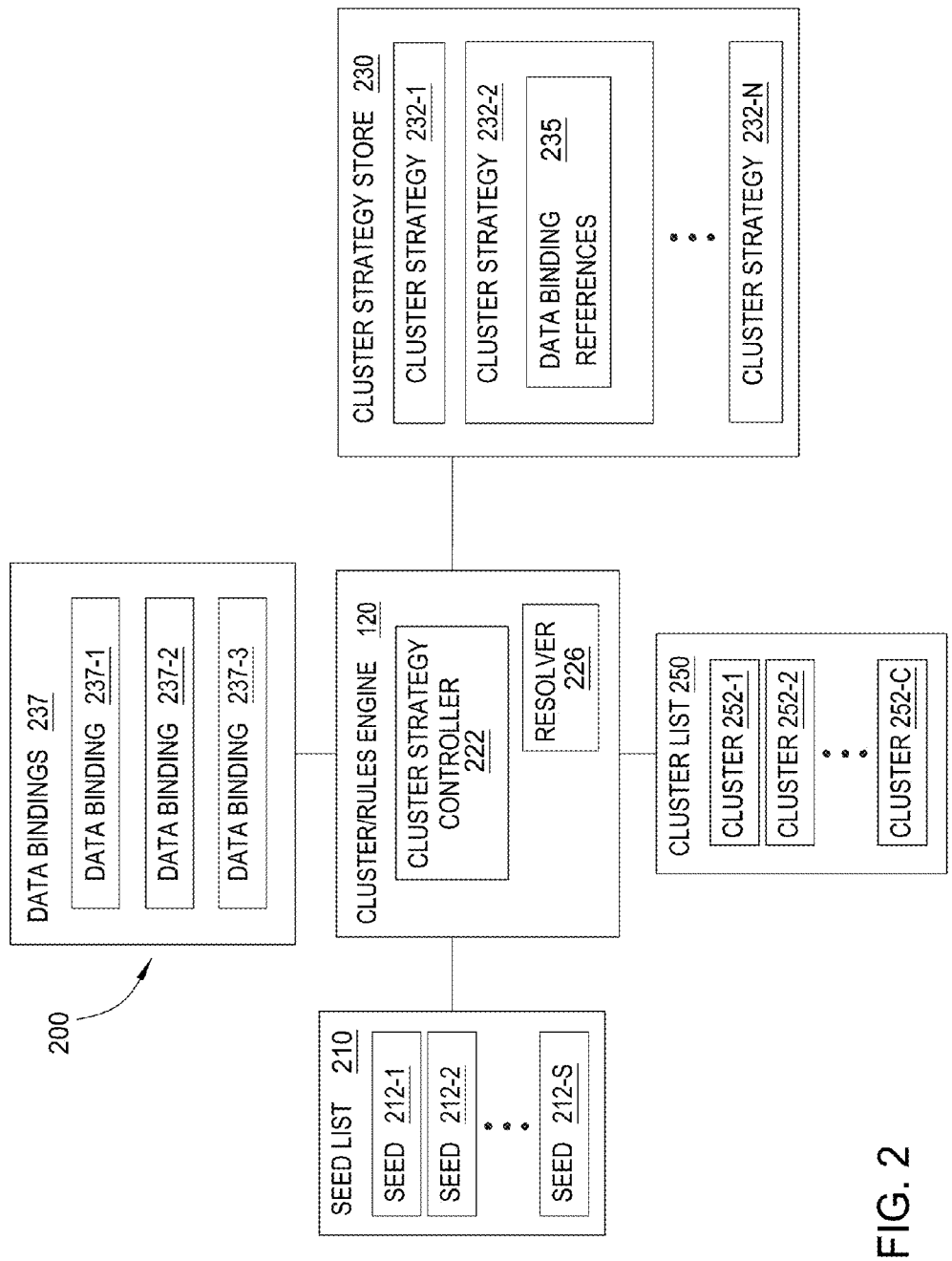
FIG. 2 is a block diagram illustrating an example generation of clusters by the data analysis system, according to an embodiment of the present disclosure.

FIG. 2 is a block diagram illustrating an example generation of clusters by data analysis system 200, according to an embodiment. As shown, in an embodiment the cluster engine 120 (FIG. 1) interacts with a seed list 210, a cluster list 250, a cluster strategy store 230, and data bindings 237. The seed list 210 may include seeds 212-1, 212-2 . . . 212-S, and the cluster list 250 may include clusters 252-1, 252-2 . . . 252-C. The cluster engine 120 may be configured as a software application, module, or thread that generates the clusters 252-1, 252-2 . . . 252-C from the seeds 212-1, 212-2 . . . 212-S.

Seeds 212 (including one, some, or all of seeds 212-1 through 212-S) may be generated by the cluster engine 120 according to various seed generation strategies/rules. Examples of seed generation are described below in reference to various example applications of the data analysis system. According to an embodiment, once generated, seeds 212 may be the starting point for generating a cluster 252. To generate a cluster, the cluster engine 120 may retrieve a given seed 212 from the seed list 210. The seed 212 may be a data item or group of data items within the database 140, such as a customer name, a customer social security number, an account number, and/or a customer telephone number.

The cluster engine 120 may generate the cluster 252 from the seed 212. In one embodiment, the cluster engine 120 generates the cluster 252 as a collection of data items and the relationships between the various data items. As noted above, the cluster strategy may execute data bindings in order to add each additional layer of data items to the cluster. For example, the cluster engine 120 may generate the cluster 252-1 from a seed credit card account. The cluster engine 120 may first add the credit card account to the cluster 252-1. The cluster engine 120 may then add customers related to the credit card account to the cluster 252-1. The cluster engine 120 may complete the cluster 252-1 by adding additional credit card accounts related to those customers. As the cluster engine 120 generates the cluster 252-1, the cluster engine 120 may store the cluster 252-1 within the cluster list 250. The cluster 252-1 may be stored as a graph data structure or other appropriate data structure.

The cluster list 250 may be a collection of tables in the database 140. In such a case, there may be a table for the data items of each cluster 252, such as those of example cluster 252-1 discussed above, a table for the relationships between the various data items, a table for the attributes of the data items, and a table for scores of the clusters. The cluster list 250 may include clusters 252 from multiple investigations. Note that the cluster engine 120 may store portions of clusters 252 in the cluster list 250 as the cluster engine 120 generates the clusters 252. Persons skilled in the art will recognize that many technically feasible techniques exist for creating and storing data structures that may be used to implement the systems and methods of the data analysis system.

The cluster strategy store 230 may include cluster strategies 232-1, 232-2 . . . 232-N. Each cluster strategy may include data binding references 235 to one or more data bindings 237. As noted, each data binding may be used to identify data that may grow a cluster (as determined by the given search strategy 232). For example, the cluster engine 120 may execute a cluster strategy 232-1 to generate the cluster 252-1. Specifically, the cluster engine 120 may execute the cluster strategy 232-1 in response to selection of that cluster strategy by an analyst. The analyst may submit a selection of one or more cluster strategies to perform on a seed or group of seeds to the cluster engine 120 through the client 135. Alternatively, the cluster engine 120 may automatically select one or more cluster strategies, such as based on user preferences or rules.

According to an embodiment, each cluster strategy 232 is configured so as to perform an investigation processes for generating a cluster 252. Again, for example, the cluster strategy 232-2 may include data binding references 235 to a collection of data bindings executed to add layer after layer of data to a cluster. The investigation process may include searches to retrieve data items related to a seed 212 that is selected for clustering using cluster strategy 232-2. For example, the cluster strategy 232-2 may start with a possibly fraudulent credit card account as the seed 212-2. The cluster strategy 232-2 may search for customers related to the credit card account, and then additional credit card accounts related to those customers. A different cluster strategy 232-3 may search for customers related to the credit card account, phone numbers related to the customers, additional customers related to the phone numbers, and additional credit card accounts related to the additional customers, for example.

In an embodiment, cluster strategies 232 include references to at least one data binding 237 (such as data bindings 237-1 through 237-3). The cluster engine 120 may execute a search protocol specified by the data binding 237 to retrieve data, and the data returned by a given data binding may form a layer within the cluster 252. For instance, the data binding 237 (and/or the search protocol of the data binding 237) may retrieve sets of customers related to an account by an account owner attribute. The data binding 237 (and/or the search protocol of the data binding 237) may retrieve the set of related data items from a data source. For instance, the data binding 237-1 may specify a database query to perform against a database. Likewise, the data binding 237-2 may define a connection and/or query to a remote relational database system and the data binding 237-3 may define a connection and/or query against a third-party web service. Once retrieved, the cluster strategy 232 may evaluate whether the returned data should be added to a cluster being grown from a given seed 212.

Multiple cluster strategies 232 may reference a given data binding 237. The analyst may update the data binding 237, but typically updates the data binding 237 only if the associated data source changes. A cluster strategy 232 may also include a given data binding 237 multiple times. For example, executing a data binding 237 using one seed 212 may generate additional seeds for that data binding 237 (and/or generate seeds for another data binding 237). More generally, different cluster strategies 232-1, 232-2 . . . 232-N may include different arrangements of various data bindings 237 to generate different types of clusters 252.

The cluster strategies 232 may specify that the cluster engine 120 use an attribute from the related data items retrieved with one data binding 237, as input to a subsequent data binding 237. The cluster engine 120 may use the subsequent data binding 237 to retrieve a subsequent layer of related date items for the cluster 252. For instance, a particular cluster strategy 232 may specify that the cluster engine 120 retrieve a set of credit card account data items with a first data binding 237-1. That cluster strategy 232 may also specify that the cluster engine 120 then use the account number attribute from credit card account data items as input to a subsequent data binding 237-2. The cluster strategy 232 may also specify filters for the cluster engine 120 to apply to the attributes before performing the subsequent data binding 237. For instance, if the first data binding 237-1 were to retrieve a set of credit card account data items that included both personal and business credit card accounts, then the cluster engine 120 could filter out the business credit card accounts before performing the subsequent data binding 237-2.

In operation, according to an embodiment, the cluster engine 120 generates a cluster 252-1 from a seed 212-1 by first retrieving a cluster strategy 232. Assuming the analyst selected a cluster strategy 232-2, the cluster engine 120 would retrieve the cluster strategy 232-2 from the cluster strategy store 230. The cluster engine 120 may then retrieve the seed 212-1 as input to the cluster strategy 232-2. The cluster engine 120 may execute the cluster strategy 232-2 by retrieving sets of data by executing data bindings 237 referenced by the cluster strategy 232-2. For example, the cluster strategy 232-2 may execute data bindings 237-1, 237-2, and 237-3. Accordingly, the cluster engine 120 may evaluate data returned by each data binding 237 to determine whether to use that data to grow the cluster 252-1. The cluster engine 120 may then use elements of the returned data as input to the next data binding 237. Of course, a variety of execution paths are possible for the data bindings 237. For example, assume one data binding 237 returned a set of phone numbers. In such a case, another data binding 237 may evaluate each phone number individually. As another example, one data binding 237 may use input parameters obtained by executing multiple, other data bindings 237. More generally, the cluster engine 120 may retrieve data for each data binding referenced by the cluster strategy 232-2. The cluster engine 120 may then store the complete cluster 252-1 in the cluster list 250.

As the cluster engine 120 generates the clusters 252-1, 252-2 . . . 252-C from seeds 212-1, 212-2 . . . 212-S, the cluster list 250 may include overlapping clusters 252. For example, two clusters 252-1 and 252-C may overlap if both clusters 252-1 and 252-C include a common data item. In an example, a larger cluster 252 formed by merging two smaller clusters 252-1 and 252-C may be a better investigation starting point than the smaller clusters 252-1 and 252-C individually. The larger cluster 252 may provide additional insight or relationships, which may not be available if the two clusters 252-1 and 252-C remain separate.

In an embodiment, the cluster engine 120 includes a resolver 226 that is configured to detect and merge two or more overlapping clusters 252 together. For example, the resolver 226 may compare the data items within a cluster 252-1 to the data items within each one of the other clusters 252-2 through 252-C. If the resolver 226 finds the same data item within the cluster 252-1 and a second cluster 252-C, then the resolver 226 may merge the two clusters 252-1 and 252-C into a single larger cluster 252. For example, the cluster 252-1 and cluster 252-C may both include the same customer. The resolver 226 may compare the data items of cluster 252-1 to the data items of cluster 252-C and detect the same customer in both clusters 252. Upon detecting the same customer in both clusters 252, the resolver 226 may merge the cluster 252-1 with cluster 252-C. The resolver 226 may test each pair of clusters 252 to identify overlapping clusters 252. Although the larger clusters 252 may be better investigation starting points, an analyst may want to understand how the resolver 226 formed the larger clusters 252. Accordingly, the resolver 226, may store a history of each merge.

In various embodiments, clusters may be merged based on various criteria and/or combinations of criteria include, for example, when the clusters include a minimum number of data items that are common among the clusters, when the clusters include a minimum number of data items that are common among the clusters and which data items are within a particular proximity in each cluster to a seed of the cluster, when a particular quantity of properties are common among data items of the clusters even when the data items themselves are not identical, and/or the like.

In an embodiment, cluster merging (for example, by resolver 226) may be optionally disabled for particular types of data items, and/or particular data items. For example, when a particular data item, or type of data item, is so common that it may be included in many different clusters (for example, an institutional item such as a bank), merging of cluster based on that common item (for example, the particular bank) or common type of item (for example, banks in general) may be disabled. In another embodiment, cluster may be merged only when they share two or more common data items and/or other properties. In an embodiment, when two clusters are determined to share a data item that this very common (such that they cluster may not be merged based on that item) the system may automatically determine whether the two clusters share one or more other data items and/or properties such that they may be merged. In various embodiments, cluster merging may be disabled based on other criteria. For example, cluster merging between two related clusters may be disabled when one or both of the two clusters reach a particular size (for example, include a particular number of data items).

After the cluster engine generates a group of clusters from a given collection of seeds (and after merging or resolving the cluster), the cluster engine 120 may score, rank, and/or otherwise order the clusters relative to a scoring strategy 442. In some embodiments, clusters are scored and provided to the analysis without resolving.

In one embodiment, the analysis system 100, and more specifically, the cluster engine 120, receives a request for cluster generation. In response to the request, a list of seeds may be generated, clusters may be generated based on those seeds, and the clusters may be ranked, ordered, and presented to analysts. In an embodiment, the cluster engine 120 may consume seeds generated by other systems. Alternatively, in other embodiments, cluster engine 120 may generate the seeds 212-1, 212-2 . . . 212-S. For instance, the cluster engine 120 may include a seed generation strategy (also referred to as a "lead generation strategy") that identifies data items, or groups of data items, as potential seeds 212. The seed generation (and/or lead generation) strategy may apply to a particular business type, such as credit cards, stock trading, or insurance claims, and may be run against a cluster data source 160 or an external source of information.

In an embodiment, the analysis system 100 may not include data bindings as described above. Rather, according to an embodiment, the analysis system 100 may include one or more interfaces and/or connections to various internal and/or external data stores of data items and/or other information (for example, data sources(s) 160. According to an embodiment, the system may include a generic interface and/or connection to various internal and/or external data stores of data items and/or other information. For example, the analysis system 100 may include a generic data interface through which the system may search, access, and/or filter various data item information during seed generation, cluster generation, and/or analysis of the clusters. The generic interface may include various aspects that enable searching, accessing, and/or filtering of data. For example, the generic interface may access various data sources that each have differing data formats. The generic interface may accordingly covert and/or filter the accessed data to a common format. Alternatively, the data sources may include functionality through which stored data may be searched and/or converted to a standard format automatically. In an embodiment, the generic interface may enable Federated search of multiple data stores of data item-related information. Accordingly, in various embodiments, the analysis system 100 may access various data sources for data item clustering and seed generation.

Additional details of the server computing system 110, the data sources 160, and other components of the data analysis system are described below in reference to FIG. 8.

Figure 3A:
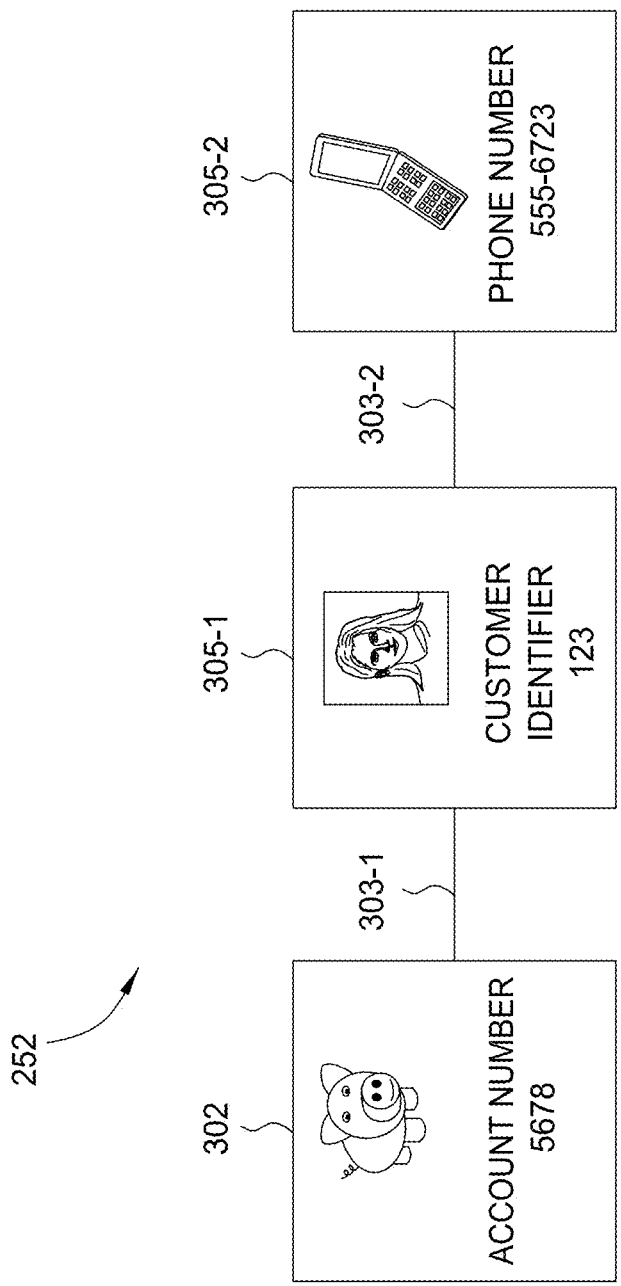
FIGS. 3A-3C illustrate an example growth of a cluster of related data items, according to an embodiment of the present disclosure.
Figure 3B:
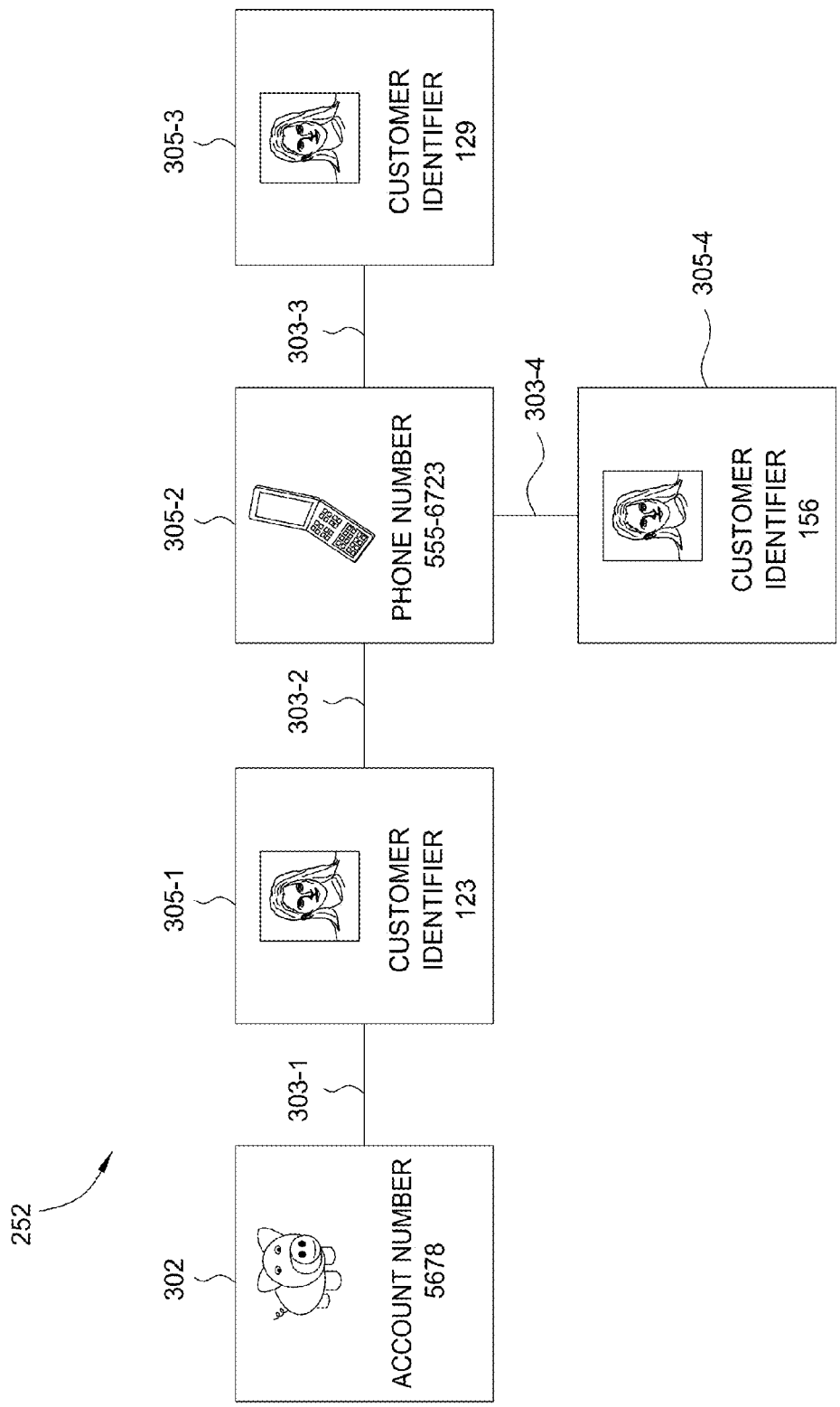
Figure 3C:
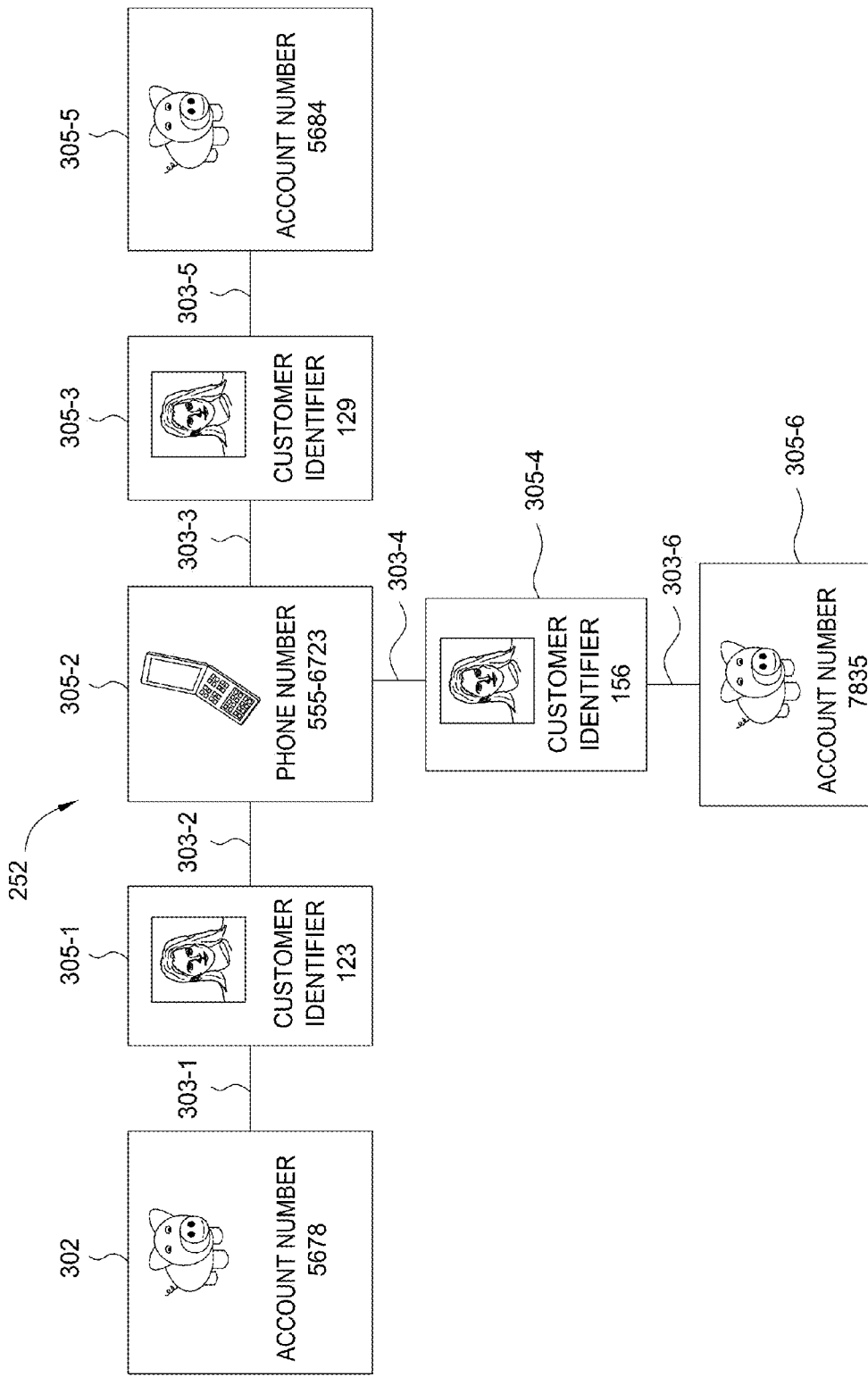

FIGS. 3A-3C illustrate an example growth of a cluster 252 of related data items, according to an embodiment. As shown in FIG. 3A, an example cluster 252 may include a seed item 302, links 303-1 and 303-2, and related data items 305-1 and 305-2. The cluster 252 may be based upon a seed 212 (for example, data item 302). The cluster engine 120 may build the cluster 252 by executing a cluster strategy 232 with the following searches:

Find seed owner
Find all phone numbers related to the seed owner
Find all customers related to the phone numbers
Find all accounts related to the customers
Find all new customers related to the new accounts In the example, assuming the seed 212 is fraudulent credit card account, the cluster engine 120 would add the credit card account to the cluster 252 as the seed item 302. The cluster engine 120 may then use the account owner attribute of the credit card account as input to a data binding 237. The cluster engine 120 may execute the search protocol of the data binding 237 to retrieve the customer data identifying the owner of the fraudulent credit card account. The cluster engine 120 would then add the customer data to the cluster 252 as the related data item 305-1. The cluster engine 120 would also add the account owner attribute as the link 303-1 that relates the account number to the customer data of the owner. The cluster engine 120 would execute the next search of the cluster strategy 232 by inputting the customer identifier attribute of the customer data into a data binding 237 to retrieve a phone data. The cluster engine 120 would then add the phone data as the related data item 305-2 and the customer identifier attribute as the link 303-2 between the customer data and the phone data. At this point in the investigation process, the cluster 252 would include the seed item 302, two links 303-1 and 303-2, and two related data items 305-1 and 305-2. That is, the cluster 252 would include the fraudulent credit card account, the customer data of the owner of the credit card, and the phone number of the owner. By carrying the investigation process further, the cluster engine 120 may reveal further related information, for example, additional customers and/or potentially fraudulent credit card accounts.

Turning to FIG. 3B, and continuing the example, the cluster engine 120 may continue executing the cluster strategy 232 by searching for additional account data items related to the phone number of the owner of the fraudulent credit card account. As discussed, the phone number may be stored as related data item 305-2. The cluster engine 120 would input the phone owner attribute of the phone number to a data binding 237. The cluster engine 120 would execute the search protocol of data binding 237 to retrieve the data of two additional customers, which the cluster engine 120 would store as related data items 305-3 and 305-4. The cluster engine 120 would add the phone owner attribute as the links 303-3 and 304-4 between the additional customers and the phone number.

Continuing the example, FIG. 3C shows the cluster 252 after the cluster engine 120 performs the last step of the example cluster strategy 232. For example, the cluster engine 120 would use the customer identifier attribute of the related data item 305-3 and 305-4 to retrieve and add additional account data items as the related data items 305-5 and 305-6. The cluster engine 120 would couple the related data items 305-5 and 305-6 to the related data items 305-3 and 305-4 with the customer identifier attributes stored as links 303-5 and 303-6. Thus, the cluster 252 would include six related data items 305 related by six links 303, in addition to the seed item 302.

In an embodiment, the analyst may identify and determine whether the additional data account items, stored as related data items 305-5 and 305-6, represent fraudulent credit card accounts more efficiently than if the analyst started an investigation with only the seed 302. As the foregoing example illustrates, according to various embodiments, the data analysis system may enable an analyst to advantageously start an investigation with a cluster including many related data items (such as the example cluster 252 with the seed item 302 and related data items 305) rather than a single data item.

In various embodiments, clusters may be generated automatically, on a schedule, on demand, and/or as needed, as described below.

III. Example Cluster Scoring/Ranking

Figure 4:
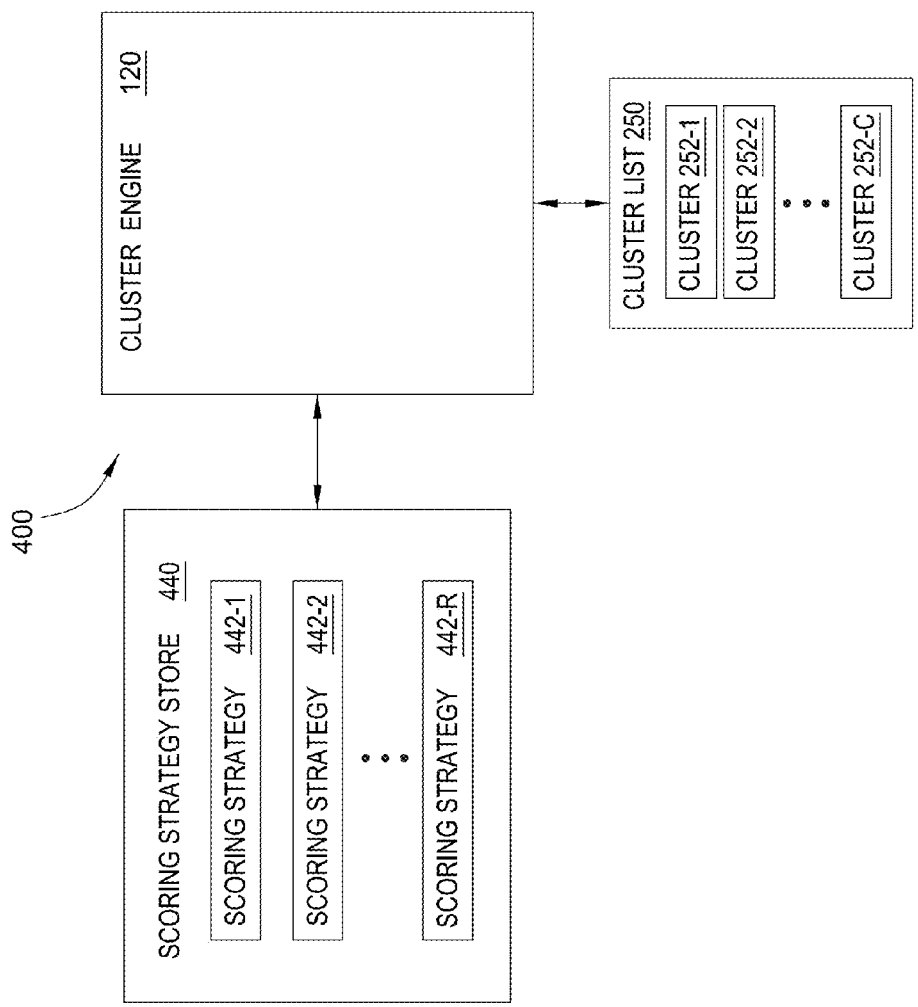
FIG. 4 illustrates an example ranking of clusters by the data analysis system, according to an embodiment of the present disclosure.

FIG. 4 illustrates an example ranking of clusters 252 by the data analysis system 100 shown in FIG. 1, according to an embodiment of the present disclosure. As shown, an example system 400 of FIG. 4 illustrates some of the same elements as shown in FIG. 1 and FIG. 2, including the cluster engine 120 in communication with the cluster list 250. In addition, FIG. 4 illustrates a scoring strategy store 440 in communication with the cluster engine 120. The scoring strategy store 440 includes scoring strategies 442-1, 442-2 . . . 442-R.

In an embodiment, the cluster engine 120 executes a scoring strategy 442 to score a cluster 252. For example, the cluster engine 120 may generate a cluster (for example, via a cluster strategy/data bindings) and attempt to resolve it with existing clusters. Thereafter, the cluster engine 120 may score the resulting cluster with any scoring strategies associated with a given cluster generation strategy. In an embodiment, the multiple scores may be generated for a given cluster. The multiple scores may be based on various aspects, metrics, or data associated with the cluster. In one embodiment, a cluster metascore may be generated based on a combination or aggregation of scores associated with a given cluster. Ordering for a group of clusters, (according to a given scoring strategy) may be performed on demand when requested by a client. Alternatively, the analyst may select a scoring strategy 442 through the client 135 and/or the analyst may include the selection within a script or configuration file. In another alternative, the data analysis system may automatically select a scoring strategy. In other embodiments, the cluster engine 120 may execute several scoring strategies 442 to determine a combined score for the cluster 252.

In an embodiment, a scoring strategy (such as scoring strategy 442) specifies an approach for scoring a cluster (such as cluster 252). A score may indicate a relative importance or significance of a given cluster. For example, the cluster engine 120 may execute a scoring strategy 442-1 to determine a score by counting the number of a particular data item type that are included within the cluster 252. Assume, for example, a data item corresponds with a credit account. In such a case, a cluster with a large number of accounts opened by a single individual (possibly within a short time) might correlate with a higher fraud risk. Of course, a cluster score may be related to a high risk of fraud based on the other data in the cluster, as appropriate for a given case. More generally, each scoring strategy 442 may be tailored based on the data in clusters created by a given cluster strategy 230 and a particular type of risk or fraud (and/or amounts at risk) of interest to an analyst.

According to an embodiment, the cluster engine 120 scores a cluster 252-1 by first retrieving a scoring strategy 442. For example, assume an analyst selects scoring strategy 442-1. In response, the cluster engine 120 may retrieve the scoring strategy 442-1. The cluster engine 120 may also retrieve the cluster 252-1 from the cluster list 250. After determining the score of the cluster 252-1, the cluster engine 120 may store the score with the cluster 252-1 in the cluster list 250.

The cluster engine 120 may score multiple clusters 252-1, 252-2 . . . 252-C in the cluster list 250. The cluster engine 120 may also rank the clusters 252-1, 252-2 . . . 252-C based upon the scores. For instance, the cluster engine 120 may rank the cluster 252-1, 252-2 . . . 252-C from highest score to lowest score. In various embodiment, cluster may be ranked according into multiple scores, combinations of scores, and/or metascores.

As mentioned above, the cluster/rules engine 120 may generate an "alert score" for the clusters. The alert score may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below.

IV. Example User Interface

Figure 5:
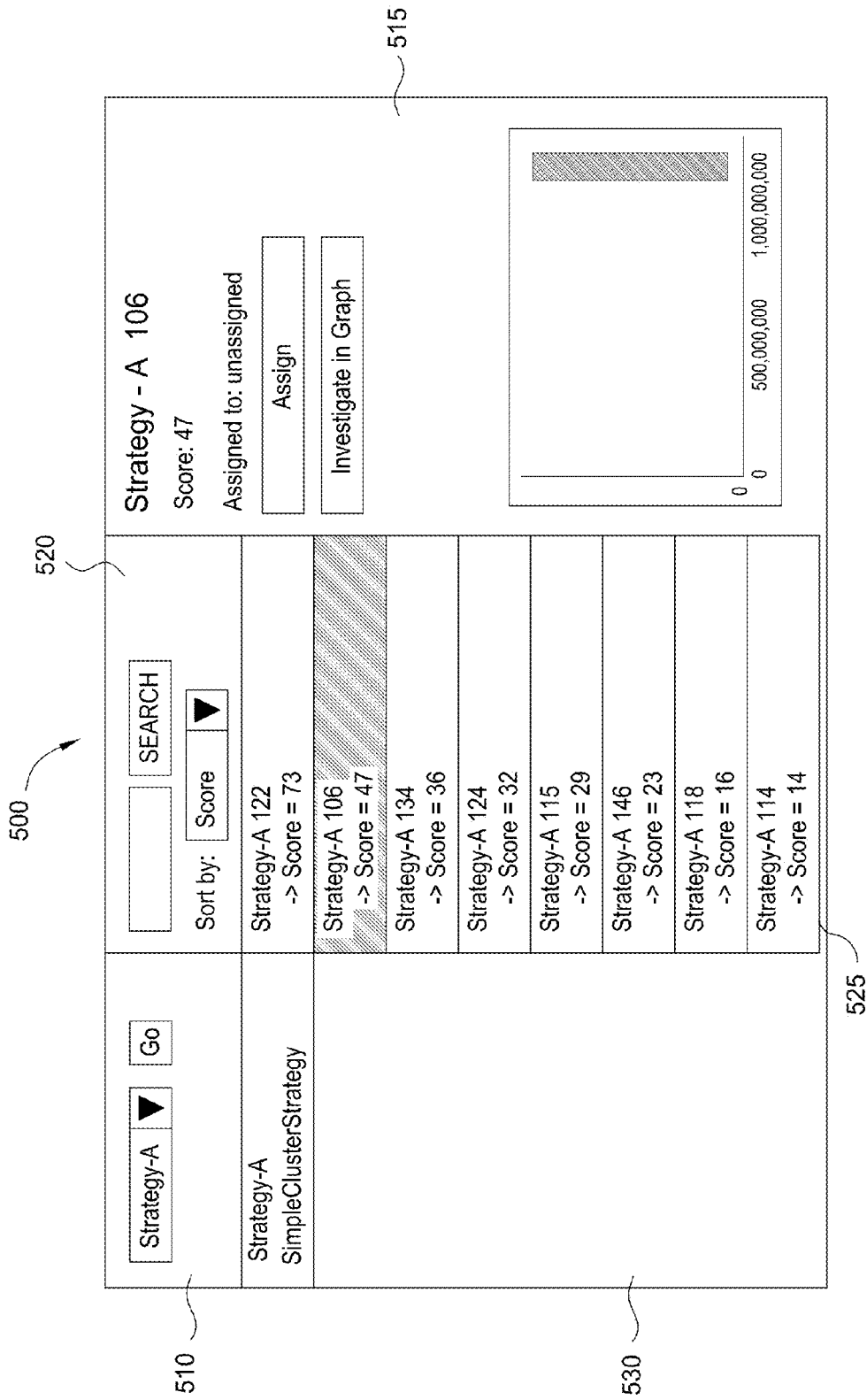
FIG. 5 illustrates an example cluster analysis user interface, according to an embodiment of the present disclosure.

FIG. 5 illustrates an example user interface 500, according to one embodiment. As described above, the cluster engine 120, the workflow engine 125, and/or the user interface engine 126 may be configured to present the user interface 500. As shown, the example user interface 500 includes a selection box 510, a cluster strategy box 530, a cluster summary list 525, a cluster search box 520, and a cluster review window 515. The user interface 500 may be generated as a web application or a dynamic web page displayed within the client 135.

In the example user interface 500 of FIG. 5, the selection box 510 may allow the analyst to select, for example, a seed generation strategy and/or a previously generated seed or seed list (for example, seed list 210). The analyst may select the items (for example, a seed generation strategy) by, for example, entering a name of a particular item into a dropdown box (and/or other interface element) in the selection box 510 (for example, the dropdown box showing a selected strategy "Strategy-A") and selecting a "Go" button (and/or other interface element). Alternatively, the analyst may select a particular item by, for example, expanding the dropdown box and selecting an item from the expanded dropdown box, which may list various seed generation strategies and/or seed lists, for example. In various examples, seed lists and/or seed generation strategies may be selected by the analyst that correspond to likely fraudulent financial accounts, credit card account originating at a particular bank branch, savings accounts with balances above a particular amount, and/or any of the other seed generation strategies described below in reference to the various applications of the system.

For example, when the analyst selects a particular seed generation strategy, the system may generate a seed list (for example, seed list 210) and then may generate clusters based on seeds of the seed list. The seed list and/or clusters may, in an embodiment, be generated in response to a selection of a particular seed generation strategy. The seed generation strategy may generate a seed list (for example, seed list 210) and/or clusters (for example, clusters 252-1, 252-2, . . . 252-C of the cluster list 250) from the database 140 and/or an external source of information (for example, a cluster data source 160). Alternatively, when the analyst selects a previously generated seed or seed list (for example, seed list 210), the system may retrieve data related to the selected seed list (for example, the seed items, clusters, and/or related clustered data items) from, for example, database 140 and/or an external source of information (for example, a cluster data source 160). In an embodiment, clusters may be generated in response to a selection of a previously generated seed list (or, alternatively, a previously generated seed). Alternatively, cluster may be been previously generated, and may be retrieved in response to selection of a previously generated seed list (or, alternatively, a previously generated seed). In an embodiment, the analyst may select a particular cluster of interest via the selection box 510.

Further, in the example user interface 500 the cluster strategy box 530 displays the cluster strategies 232 that the cluster engine 120 ran against the seed list 210. The cluster engine 120 may execute multiple cluster strategies 232 against the seed list 210, so there may be multiple cluster strategies 232 listed in the cluster strategy box 530. The analyst may click on the name of a given cluster strategy 232 in the cluster strategy box 530 to review the clusters 252 that the cluster strategy 232 generated.

In an embodiment, the user interface 500 displays information associated with the clusters 252 in the cluster summary list 525. For example, the information associated with the clusters may include characteristics of the clusters 252, such as identifiers, scores, and/or analysts assigned to analyze the clusters 252. The system may select the clusters 252 for display in the cluster summary list 525 according to those or other characteristics. For instance, the system may display the cluster information in the order of the scores of the clusters 252, where a summary of the highest scoring cluster 252 is displayed first.

The system (for example, cluster engine 120, the workflow engine 125, and/or the user interface engine 126) may control the order and selection of the cluster information within the cluster summary list 525 based upon an input from the analyst. The cluster search box 520 may include a search text box coupled to a search button and a pull-down control. The analyst may enter a characteristic of a cluster 252 in the search text box and then instruct the workflow engine 125 to search for and display clusters 252 that include the characteristic by pressing the search button. For example, the analyst may search for clusters with a particular score. The pull-down control may include a list of different characteristics of the clusters 252, such as score, size, assigned analyst, and/or date created. The analyst may select one of the characteristics to instruct the workflow engine 125 to present the information associated with the clusters 252 arranged by that characteristic.

In an embodiment, the system is also configured to present details of a given cluster 252 within the cluster review window 515. The system displays the details of the cluster 252, for example, the score, and/or average account balances within a cluster, when the analyst clicks a mouse pointer on the associated summary within the cluster summary list 525. The system may present details of the cluster 252, such as the name of an analyst assigned to analyze the cluster 252, a score of the cluster 252, and/or statistics or graphs generated from the cluster 252. These details may allow the analyst to determine whether to investigate the cluster 252 further. The cluster review window 515 may also include a button which may be clicked to investigate a cluster 252 within a graph, and an assign button for assigning a cluster to an analyst.

An analyst may click a mouse pointer on an "Investigate in Graph" button representing a cluster to investigate the cluster within an interactive graph. The interactive representation may be a visual graph of the cluster 252, where icons represent the items of the cluster 252 and lines between the icons represent the links between items of the cluster 252. For example, the workflow engine 125 may display the interactive graph of the cluster 252 similar to the representation of the cluster 252 in FIG. 3C. The interactive representation may allow the analyst to review the attributes of the related data items and/or perform queries for additional related data items.

In an embodiment, an administrative user may click a mouse pointer on an assign button to assign the associated cluster 252 to an analyst. The workflow engine 125 may also allow the administrative user to create tasks associated with the clusters 252, while the administrative user assigns the cluster 252. For example, the administrative user may create a task for searching within the three highest scoring clusters 252 for fraudulent credit card accounts. The system may display the cluster information in the cluster summary list 525 according to the names of the analysts assigned to the clusters 252. Likewise, the system may only display cluster information for the subset of the clusters 252 assigned to an analyst.

The interface shown in FIG. 5 is included to illustrate one example interface useful for navigating and reviewing clusters generated using the cluster engine 120 and the workflow engine 125. In other embodiments, other user interface constructs may be used to allow the analyst to select cluster strategies 232, scoring strategies 242, and/or seed generation strategies, initiate an investigation, and/or review and analyze the clusters 252. For example, the user interface engine 126 may display additional controls within the user interface 500 for controlling the cluster generation process and selecting seed generation strategies, cluster strategies 232, and/or scoring strategies 242. Also, the user interface 500 may be displayed without the selection box 510 or the options to select a seed generation strategy. In addition, although the workflow engine 125 may generate the user interface 500, in various embodiments the user interface 500 may be generated by a software application distinct from the workflow engine 125. Further, in various embodiments, the cluster review window 515 may be configured to display a preview of the cluster 252 and/or additional statistics generated from the cluster 252. As such, an interactive representation of the cluster 252 may be presented in an additional user interface and/or the cluster 252 may be exported to another software application for review by the analyst.

In an alternative embodiment, and as described below in reference to the various figures, various other user interfaces may be generated by the system.

V. Example Operations

Figure 6:
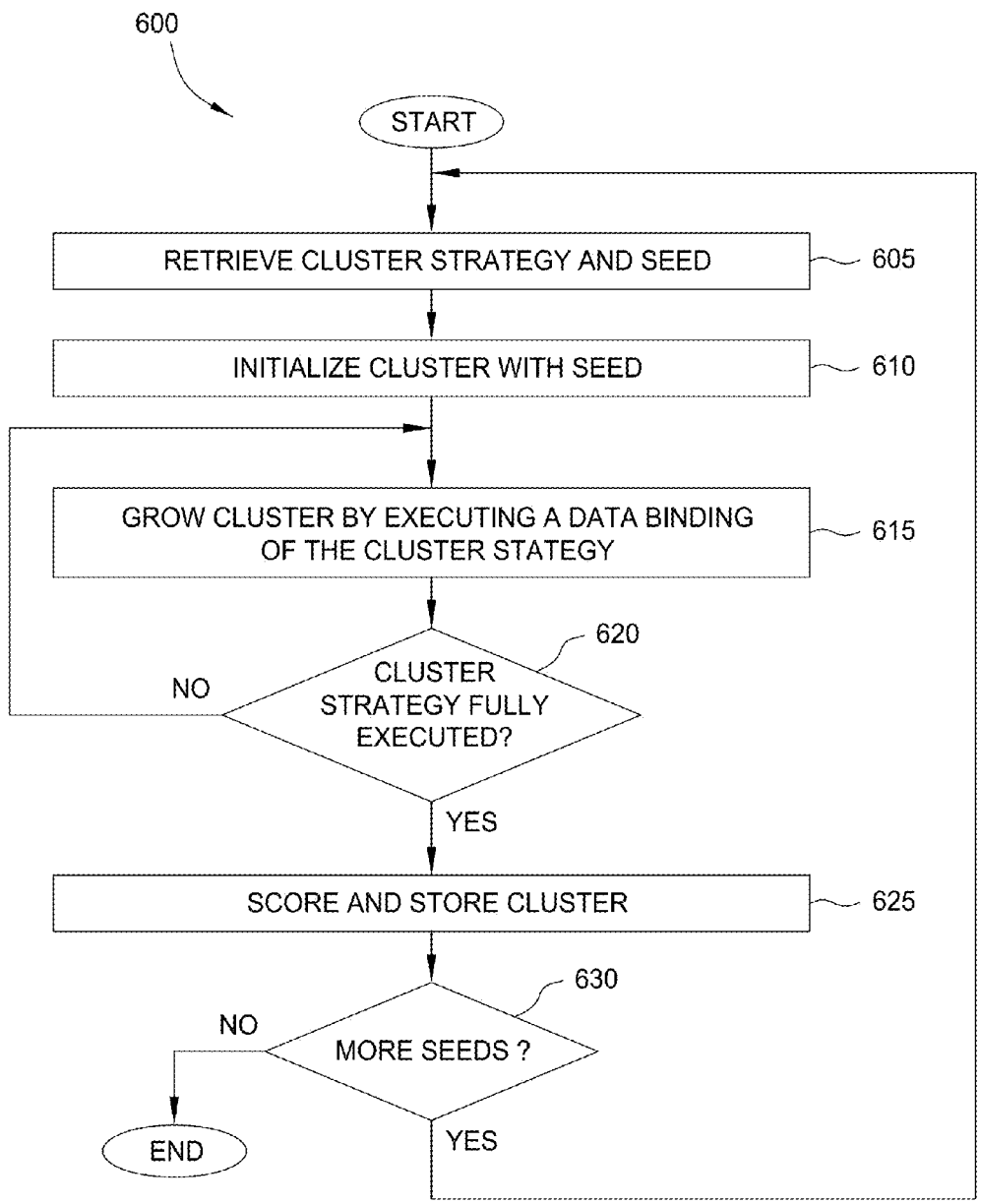
FIG. 6 is a flowchart of an example method of generating clusters, according to an embodiment of the present disclosure.

FIG. 6 is a flowchart of an example method of generating clusters, according to an embodiment. Although the method is described in conjunction with the systems of FIGS. 1 and 2, persons skilled in the art will understand that any system configured to perform the method, in any order, is within the scope of this disclosure. Further, the method 600 may be performed in conjunction with method 700 for scoring a cluster, described below, and the various other methods described below including analyzing a cluster.

As shown, example cluster generation method 600 begins at block 605, where the cluster engine 120 retrieves a cluster strategy (e.g., cluster strategy 232-2) and a seed 212. Once a cluster strategy is selected, the cluster engine 120 may identify a list of seeds from which to build clusters using the selected cluster strategy. At block 610, the cluster engine 120 initializes a cluster 252 with one of the seeds in the list. The cluster 252 may be stored as a graph data structure. The cluster engine 120 may initialize the graph data structure and then add the seed 212-1 to the graph data structure as the first data item.

At block 615, the cluster engine 120 may grow the cluster 252 by executing the search protocol of a data binding 237 from the cluster strategy 232-2. The cluster strategy 232-2 may include a series of data bindings 237 that the cluster engine 120 executes to retrieve related data items. A given data binding 237 may include queries to execute against a cluster data source 160 using the seed as an input parameter. For example, if the seed 212-1 is an account number, then the data binding 237 may retrieve the data identifying the owner of the account with the account number. After retrieving this information, the cluster engine 120 may add the customer data item to the cluster as a related data item and the account owner attribute as the link between the seed 212-1 and the related data item. After retrieving the related data items, the cluster engine 120 may add them to the cluster 252.

At block 620, the cluster engine 120 determines if the cluster strategy 232-2 is fully executed. If not the method 600 returns to block 615 to execute additional data bindings for a given seed. Alternatively, as described above, the cluster engine 120 may grow the cluster by searching for, accessing, and/or filtering various data items through, for example, a generic interface to various internal and/or external data sources. Further, in an embodiment, the cluster engine 120 may determine whether the cluster being generated is to be merged with another cluster, as described above. Once the cluster strategy is executed for that seed, the cluster engine 120 may determine and assign a score (or, alternatively, multiple scores) to that cluster (relative 11a specified scoring strategy). After generating clusters for a group of seeds, such clusters may be ordered or ranked based on the relative scores. Doing so may allow an analyst to rapidly identify and evaluate clusters determined to represent, for example, a high risk of fraud.

At block 625, the cluster engine 120 may store the cluster 252 in cluster list 250. As mentioned above, the cluster list 250 may be a collection of tables within a relational database, where a table may include the seed and related data items of the cluster 252 and another table may include links between the related data items of the cluster 252.

At block 630, the cluster engine 120 determines if there are more seeds 212 to analyze in the seed list 210. If so, the method 600 returns to block 605 to generate another cluster from the next seed. Otherwise, the method 600 ends. Note, while method 600 describes a single cluster being generated, one of skill in the art will recognize that multiple instances of the cluster generation process illustrated by method 600 may be performed in parallel.

Figure 7:
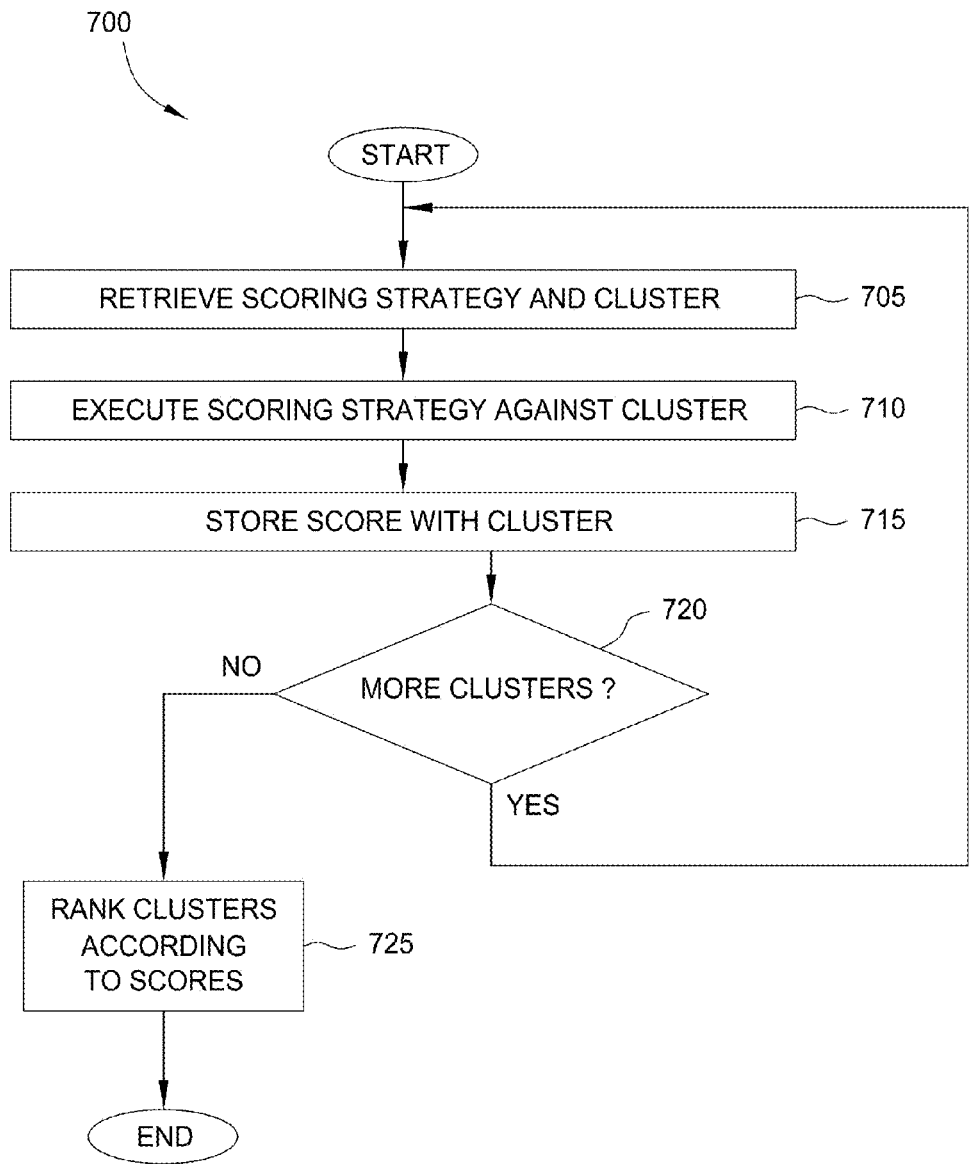
FIG. 7 is a flowchart of an example method of scoring clusters, according to an embodiment of the present disclosure.

FIG. 7 is a flowchart of an example method of scoring clusters, according to an embodiment. Although the method is described in conjunction with the systems of FIGS. 1 and 4, persons skilled in the art will understand that any system configured to perform the method steps, in any order, is within the scope of the present invention.

As shown, the example cluster scoring method 700 begins at block 705, where the cluster engine 120 retrieves a scoring strategy 442 and a cluster 252 (for example, a cluster just created using the method 600 of FIG. 6). In other cases, the cluster engine 120 may retrieve the scoring strategy 442 associated with a stored cluster. Other alternatives include an analyst selecting a scoring strategy 442 through the client 135, the cluster engine 120 via the cluster analysis UI 500, a script, or a configuration file. The cluster engine 120 may retrieve the selected scoring strategy 442 from the scoring strategy store 440, and the cluster 252 from the cluster list 250.

At block 710, the cluster engine 120 executes the scoring strategy 442 against the cluster 252. The scoring strategy 442 may specify characteristics of the related data items within the cluster 252 to aggregate. The cluster engine 120 may execute the scoring strategy 442 by aggregating the specified characteristics together to determine a score. For instance, the cluster engine 120 may aggregate account balances of related data items that are account data items. In such a case, a total amount of dollars (and/or average dollars or any other aggregated, averaged, or normal attribute of the cluster) included within the balances of the account data items of the cluster 252 may be the score of the cluster 252.

At block 715, the cluster engine 120 may store the score with the cluster 252 in the cluster list 250. At step 720, the cluster engine 120 determines if there are more clusters 252 to score. For example, in one embodiment, a set of clusters may be re-scored using an updated scoring strategy. In other cases, the cluster engine may score each cluster when it is created from a seed (based on a given cluster generation and corresponding scoring strategy). If more clusters remain to be scored (and/or re-scored), the method 700 returns to block 705.

At block 725, the cluster engine 120 may rank the clusters 252 according to the scores of the clusters 252. For example, after re-scoring a set of clusters (or, alternatively, after scoring a group of clusters generated from a set of seeds), the cluster engine 125 may rank the clusters 252 from highest score to lowest score. The ranking may be used to order a display of information associated with the clusters 252 presented to the analyst. The analyst may rely upon the ranking and scores to determine which clusters 252 to analyze first. The ranking and sorting may generally be performed on-demand when an analyst is looking for a cluster to investigate. Thus, the ranking need not happen at the same time as scoring. Further, the clusters may be scored (and later ranked) using different raking strategies.

In various embodiments, multiple scores for each cluster may be determined according to methods similar to the example method 700. Accordingly, clusters may be ranked according to any of multiple scores. Additionally, in various embodiments, multiple scores may be combined and/or aggregated into a metascore that may be used to rank the clusters. Various example score and metascore determinations are described below in reference to FIGS. 100, 110, 12C, and 13C.

VI. Example Implementation Mechanisms/Systems

Figure 8:
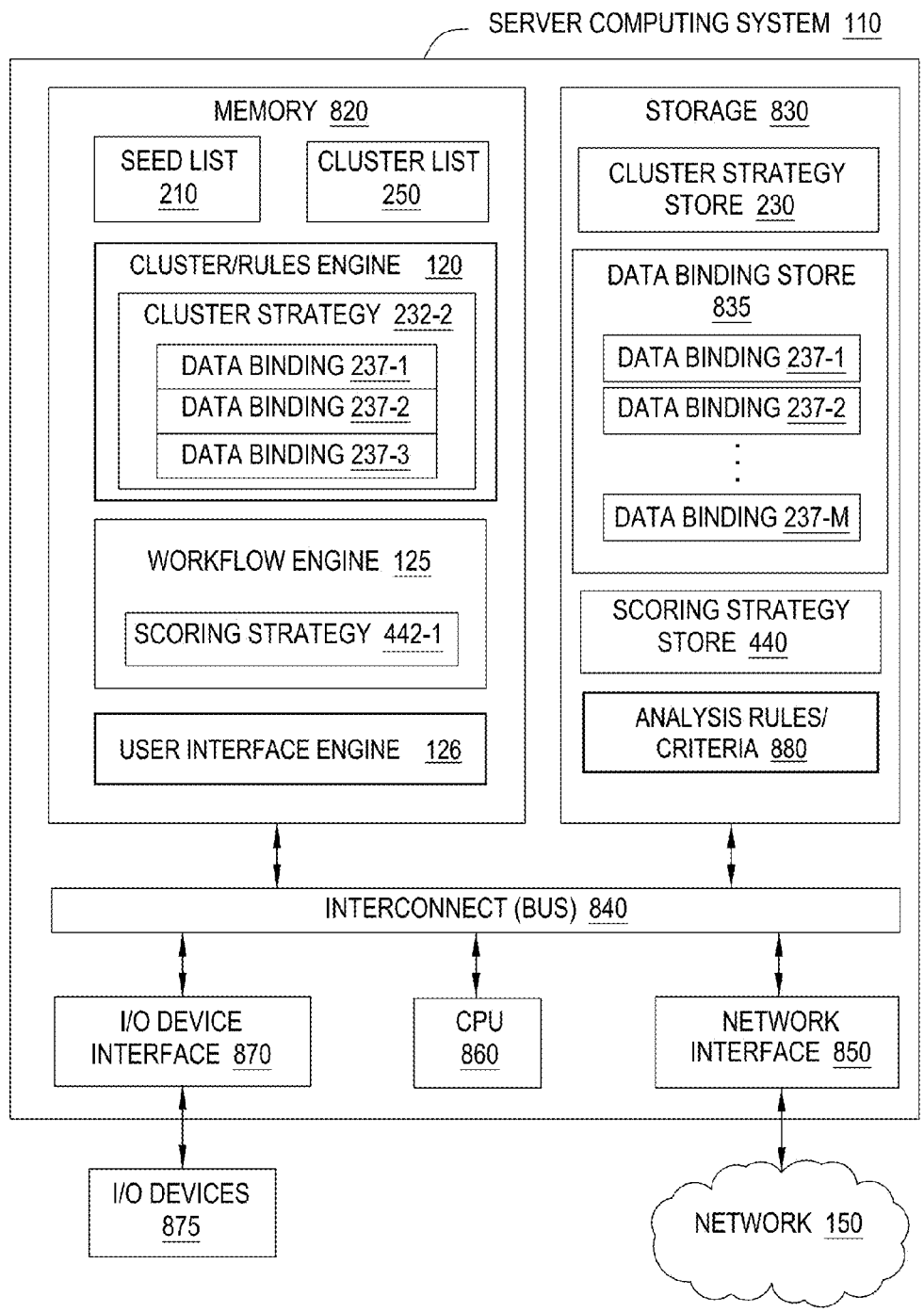
FIG. 8 illustrates components of an illustrative server computing system, according to an embodiment of the present disclosure.

FIG. 8 illustrates components of an illustrative server computing system 110, according to an embodiment. The server computing system 110 may comprise one or more computing devices that may perform a variety of tasks to implement the various operations of the data analysis system. As shown, the server computing system 110 may include, one or more central processing unit (CPU) 860, a network interface 850, a memory 820, and a storage 830, each connected to an interconnect (bus) 840. The server computing system 110 may also include an I/O device interface 870 connecting I/O devices 875 (for example, keyboard, display, mouse, and/or other input/output devices) to the computing system 110. Further, in context of this disclosure, the computing elements shown in server computing system 110 may correspond to a physical computing system (for example, a system in a data center, a computer server, a desktop computer, a laptop computer, and/or the like) and/or may be a virtual computing instance executing within a hosted computing environment.

The CPU 860 may retrieve and execute programming instructions stored in memory 820, as well as store and retrieve application data residing in memory 820. The bus 840 may be used to transmit programming instructions and application data between the CPU 860, I/O device interface 870, storage 830, network interface 850, and memory 820. Note that the CPU 860 is included to be representative of, for example, a single CPU, multiple CPUs, a single CPU having multiple processing cores, a CPU with an associate memory management unit, and the like.

The memory 820 is included to be representative of, for example, a random access memory (RAM), cache and/or other dynamic storage devices for storing information and instructions to be executed by CPU 860. Memory 820 also may be used for storing temporary variables or other intermediate information during execution of instructions to be executed by CPU 860. Such instructions, when stored in storage media accessible to CPU 860, render server computing system 110 into a special-purpose machine that is customized to perform the operations specified in the instructions.

The storage 830 may be a disk drive storage device, a read only memory (ROM), or other static, non-transitory, and/or computer-readable storage device or medium coupled to bus 840 for storing static information and instructions for CPU 860. Although shown as a single unit, the storage 830 may be a combination of fixed and/or removable storage devices, such as fixed disc drives, removable memory cards, and/or optical storage, network attached storage (NAS), and/or a storage area-network (SAN).

Programming instructions, such as the cluster engine 120, the workflow engine 125, and/or the user interface engine 126, may be stored in the memory 820 and/or storage 830 in various software modules, The modules may be stored in a mass storage device (such as storage 830) as executable software codes that are executed by the server computing system 110. These and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Illustratively, according to an embodiment, the memory 820 stores a seed list 210, a cluster engine 120, a cluster list 250, a workflow engine 125, and a user interface engine 126 (as described with reference to the various figures above). The cluster engine 120 may include a cluster strategy 232-2. The particular cluster strategy 232-2 may include data bindings 237-1, 237-2, and 237-3, with which the cluster engine 120 may access the cluster data source 160. The workflow engine 125 may include a scoring strategy 442-1.

Illustratively, according to an embodiment, the storage 830 includes a cluster strategy store 230, data bindings store 835, a scoring strategy store 440, and one or more cluster analysis rules or criteria 880. As described above, the cluster strategy store 230 may include a collection of different cluster strategies 232, such as cluster strategy 232-2. For example, the cluster strategy store 230 may be a directory that includes the cluster strategies 232-1, 232-2 . . . 232-N as distinct modules. The scoring strategy store 440 may include a collection of different scoring strategies 442, such as scoring strategy 442-2, and may also be a directory of distinct modules. The data binding store 835 may include data bindings 237-1, 237-2 . . . 237-M, which may also be stored as distinct modules within a directory.

Although shown in memory 820, the seed list 210, cluster engine 120, cluster list 250, workflow engine 125, and the user interface engine 126, may be stored in memory 820, storage 830, and/or split between memory 820 and storage 830. Likewise, copies of the cluster strategy 232-2, data binding 237-1, 237-2, and 237-3, and scoring strategy 442-2 may be stored in memory 820, storage 830, and/or split between memory 820 and storage 830.

The network 150 may be any wired network, wireless network, or combination thereof. In addition, the network 150 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

As described above in reference to FIG. 1, the server computing system 110 may be in communication with one or more data sources 160. Communication between the server computing system 110 and the data sources 160 may be via the network 150 and/or direct. In an embodiment, an optional data aggregator/formatter device and/or system may aggregate various data from multiple data sources and/or may format the data such that it may be received by the server computing system 110 in a standardized and/or readable format. For example, when multiple data sources contain and/or provide data in various formats, the data aggregator/formatter may convert all the data into a similar format. Accordingly, in an embodiment the system may receive and/or access data from, or via, a device or system such as the data aggregator/formatter.

As described above, in various embodiments the system may be accessible by an analyst (and/or other operator or user) through a web-based viewer, such as a web browser. In this embodiment, the user interface may be generated by the server computing system 110 and transmitted to the web browser of the analyst. Alternatively, data necessary for generating the user interface may be provided by the server computing system 110 to the browser, where the user interface may be generated. The analyst/user may then interact with the user interface through the web-browser. In an embodiment, the user interface of the data analysis system may be accessible through a dedicated software application. In an embodiment, the client computing device 130 may be a mobile computing device, and the user interface of the data analysis system may be accessible through such a mobile computing device (for example, a smartphone and/or tablet). In this embodiment, the server computing system 110 may generate and transmit a user interface to the mobile computing device. Alternatively, the mobile computing device may include modules for generating the user interface, and the server computing system 110 may provide user interaction data to the mobile computing device. In an embodiment, the server computing system 110 comprises a mobile computing device. Additionally, in various embodiments any of the components and/or functionality described above with reference to the server computing system 110 (including, for example, memory, storage, CPU, network interface, I/O device interface, and the like), and/or similar or corresponding components and/or functionality, may be included in the client computing device 130.

According to various embodiments, the data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing devices of the data analysis system may generally be controlled and/or coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. The modules or computing device functionality described herein are preferably implemented as software modules, but may be represented in hardware devices. Generally, the modules described herein refer to software modules that may be combined with other modules or divided into sub-modules despite their physical organization or storage.

Server computing system 110 may implement various of the techniques and methods described herein using customized hard-wired logic, one or more ASICs or FPGAs, firmware and/or program logic which, in combination with various software modules, causes the server computing system 110 to be a special-purpose machine. According to one embodiment, the techniques herein are performed by server computing system 110 in response to CPU 860 executing one or more sequences of one or more modules and/or instructions contained in memory 820. Such instructions may be read into memory 820 from another storage medium, such as storage 830. Execution of the sequences of instructions contained in memory 820 may cause CPU 840 to perform the processes and methods described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage 830. Volatile media includes dynamic memory, such as memory 820. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 840. Transmission media may also take the form of acoustic or light waves, such as those generated during radio-wave and infra-red data communications.

Various forms of media may be involved in carrying one or more sequences of one or more instructions to CPU 860 for execution. For example, the instructions may initially be carried on a magnetic disk or solid state drive of a remote computer. The remote computer may load the instructions and/or modules into its dynamic memory and send the instructions over a telephone or cable line using a modem. A modem local to server computing system 820 may receive the data on the telephone/cable line and use a converter device including the appropriate circuitry to place the data on bus 840. Bus 840 carries the data to memory 820, from which CPU 860 retrieves and executes the instructions. The instructions received by memory 820 may optionally be stored on storage 830 either before or after execution by CPU 860.

VII. Additional Example Applications

While financial fraud using credit card accounts is used as a primary reference example in the discussion above, the techniques described herein may be adapted for use with a variety of data sets and in various applications. Such applications may include, for example, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. For example, information from data logs of online systems may be evaluated as seeds to improve cyber security. In such a case, a seed may be a suspicious IP address, a compromised user account, and the like. From the seeds, log data, DHCP logs, IP blacklists, packet captures, webapp logs, and other server and database logs may be used to create clusters of activity related to the suspicions seeds. Other examples include data quality analysis used to cluster transactions processed through a computer system (whether financial or otherwise). A number of examples of such applications are described in detail below in reference the various figures.

VIII. Example Generalized Method of the Data Analysis System

Figure 9:
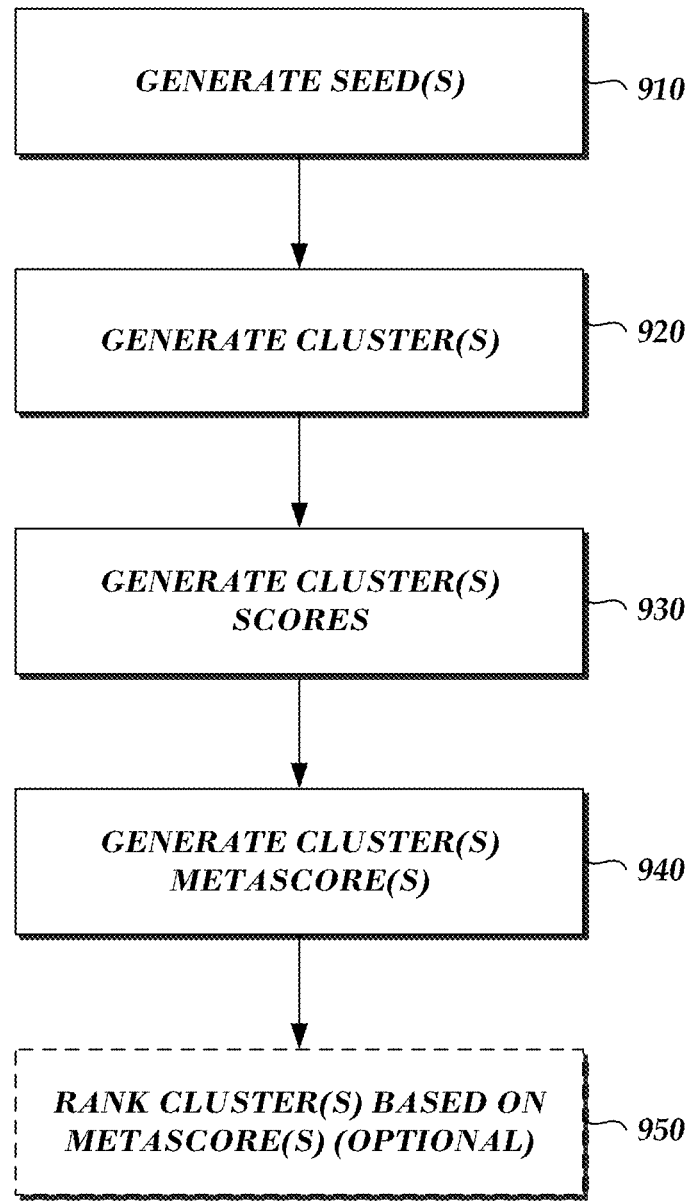
FIG. 9 is a flowchart of an example generalized method of the data analysis system, according to an embodiment of the present disclosure.

FIG. 9 is a flowchart of an example generalized method of the data analysis system, according to an embodiment of the present disclosure. In various embodiments, fewer blocks or additional blocks may be included in the process of FIG. 9, or various blocks may be performed in an order different from that shown in the figure. Further, one or more blocks in the figure may be performed by various components of the data analysis system, for example, server computing system 110 (described above in reference to FIG. 8).

As described above, and as shown in the embodiment of FIG. 9, the data analysis system may generate a seed or multiple seeds (block 910), may generate clusters based on those seed(s) (block 920), may generate a score or multiple scores for each generated cluster (block 930), may generate a metascore for each generated cluster (block 940), and may optionally rank the generated clusters based on the generated metascores (block 950). In various embodiments, the data analysis system may or may not generate multiple scores for each cluster, may or may not generate metascores for each cluster, and/or may or may not rank the clusters. In an embodiment, the system may rank clusters based on one or more scores that are not metascores.

Further, as described above, the seeds may include one or multiple data items, and may be generated based on seed generation strategies and/or rules. Similarly, the clusters may include one or multiple data items related to a seed, including the seed, and may be generated based on cluster generation strategies and/or rules (including data bindings and/or searching and filtering are performed through, for example, a generic interface to various data sources). Scores and metascores may be determined based on attributes, characteristics, and/or properties associated with data items that make up a given cluster.

Example applications of the data analysis system, including methods and systems for identifying data items, generating data clusters, and analyzing/scoring clusters, are disclosed in the various related applications listed above and previously incorporated by reference herein.

IX. Cluster Analysis and Example Analysis User Interfaces

FIGS. 10A-10C and 11-22, described below, illustrate methods and user interfaces of the data analysis system, according to various embodiments, in which data clusters are automatically generated, analyzed, and presented to an analyst such that the analyst may quickly and efficiently evaluate the clusters. In particular, as described below the data analysis system may apply one or more analysis criteria or rules to the data clusters so as to generate human-readable "conclusions" (as described above, also referred to herein as "summaries"). The conclusions may be displayed in an analysis user interface through which the analyst may evaluate the clusters and/or access more detailed data related to the cluster. In an embodiment, a cluster type may be associated with each cluster, and may be determined according to the cluster strategy that generated the cluster. Further, the system may generate "alert scores" for the clusters which may be used to prioritize clusters displayed to the analyst.

The various methods and user interfaces described below in reference to FIGS. 10A-10C and 11-22 may be implemented by various aspects of the data analysis system (for example, the server computing system 110 and/or another suitable computing system) as described above. For example, clustering may be accomplished according to seed generation and clustering strategies and rules as implemented by, for example, the cluster/rules engine 120; cluster analysis may be accomplished according to analysis rules/criteria 880 as implemented by, for example, the cluster/rules engine 120; cluster scoring (for example, generation of alert scores) may be accomplished according to scoring strategies as implemented by, for example, the cluster/rules engine 120; and user interface may be generated and/or presented to the analyst by, for example, the user interface engine 126; among other aspects.

Additionally, in the methods described in reference to the flowcharts of FIGS. 10A-10B and 21 below, in various embodiments, fewer blocks or additional blocks may be included in the example methods depicted, or various blocks may be performed in an order different from that shown in the figures. Further, in various embodiments, one or more blocks in the figures may be performed by various components of the data analysis system, for example, server computing system 110 (described above in reference to FIG. 8) and/or another suitable computing system.

a. Example Method of Cluster Analysis

FIG. 10A is a flowchart for an example method of data cluster analysis, according to an embodiment of the present disclosure. In FIG. 10A, blocks 910 and 920 of the flowchart proceed generally as described in reference to the flowchart of FIG. 9. For example, at block 910 seeds are generated according to one or more seed generation strategies. Examples of seed generation strategies are described in the various related applications listed above and previously incorporated by reference herein. Examples include identifying tax returns that are potentially fraudulent, identifying communications that are potentially associated with beaconing malware, and/or identifying emails potentially associated with phishing campaigns, among others. Further, at block 920 clusters are generated based on the one or more generated seeds and according to the one or more cluster generation strategies. Examples of cluster generation strategies (as mentioned above, also referred to herein as "cluster strategies," "clustering strategies," and/or "cluster generation rules") are described in the various related applications listed above and previously incorporated by reference herein. Examples include strategies for financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection, among others.

A cluster of data items generated according to a given clustering strategy (and its associated seed generation strategy or strategies) may be understood as having a "cluster type" (also referred to as a "data cluster type") corresponding to that clustering strategy. For example, a particular clustering strategy may be referred to as "Tax Fraud," because the clustering strategy relates to identifying clusters of data items related to potential tax fraud. A cluster of data items generated according to that clustering strategy may therefore have a "cluster type" of "Tax Fraud." In another example, a cluster generated by an "Internal Phishing" clustering strategy (and its associated seed generation strategy or strategies) has a cluster type of "Internal Phishing."

At block 1002 of, the system generates "alerts" for each of the clusters. An "alert" includes various types of information related to the cluster that may be useful to an analyst in evaluating the importance or criticality of the cluster in the context of a particular investigation. Generating an alert may include applying various cluster analysis rules or criteria to analyze the cluster and so as to generate human-readable cluster conclusions, as mentioned above. Generating an alert may further include generating an alert score for the cluster. Details regarding generation of alerts are described below in reference to FIG. 10B.

At block 1004 of FIG. 10A, a cluster analysis user interface is provided to the user (for example, an analyst). FIGS. 11-20 and 22, described below, include examples of cluster analysis user interfaces of the data analysis system. As described below, a user interface may include a listing of alerts, each alert corresponding to a particular generated and analyzed cluster. The alerts may be organized and grouped according to cluster types. Further, the analyst may view a user interface including detailed information related to each alert, including the human-readable conclusions, the alert scores, and various detailed data related to the clusters. For example, in a given alert the analyst may be provided with a name of the cluster, a cluster strategy by which the cluster was generated (also referred to as the cluster type), a list of generated conclusions, and/or one or more lists and/or tables of data related to the cluster. The one or more lists and/or tables of data related to the cluster may be drawn from the data items of the cluster, and may be filtered by the analyst according to time and/or type of data.

At block 1006, the system regenerates previously generated clusters. In various implementations the data items from which seeds are selected/generated and from which clusters are generated may change after a cluster is generated. In the example of tax fraud detection, additional tax return data items may be received, or additional phone number data items may be received that relate to a person in a previously generated cluster. Such information may have been included in a cluster if it had been available at the time the cluster was created. Accordingly, the system may regenerate clusters so as to include the data items and/or other information that has become available since the last time the cluster was generated. After, or in response to, a cluster being regenerated, the system reanalyzes the cluster and may, in an embodiment, generate an alert for the regenerated and reanalyzed cluster (as indicated by the arrow back to block 1002). In another embodiment, as described below in reference FIG. 21, when a given cluster is regenerated, a previously generated alert for that cluster may be updated or, alternatively, a new alert may be generated including a link to the previously generated alert.

In an embodiment, as shown at block 1006a, clusters may be regenerated on a schedule. For example, the system may be configured to regenerate clusters after a particular number of seconds, minutes, hours, or days, or at particular times every hour or day. In another embodiment, as shown at block 1006b, clusters may be regenerated as needed, such as in response to the system detecting one or more changes in data items and automatically executing a cluster regeneration process. For example, the system may be configured to automatically regenerate clusters when it detects that new data items (and/or other information) are received by the system, new data items (and/or other information) related to a cluster (and/or potentially related to a cluster) are received by the system, new data items (and/or other information) connected to a cluster or a data item in a cluster is received by the system, an analyst logs into the system, and/or an analyst views a cluster. In another embodiment, as shown at block 1006c, clusters may be regenerated on demand. For example, clusters may be regenerated when requested by an analyst (via, for example, a user interface of the system).

In any of the embodiments of blocks 1006a, 1006b, and 1006c, all clusters may be regenerated or portions of clusters may be regenerated, in any combination. For example, clusters associated with a particular clustering strategy may be generated on a particular schedule, while clusters associated with a different clustering strategy may be generated on a different schedule (and/or as needed and/or on demand). In another example, individual clusters may be regenerated, or other relationships among clusters may be used to determine which clusters are to be regenerated at a given time.

At optional block 1008, clusters are merged as described above. For example, if a regenerated cluster includes a data item also included in a different cluster, the regenerated cluster and the different cluster may optionally be merged. In the embodiment of FIG. 10A, only clusters generated according to the same clustering strategy (for example, having the same cluster type) may be merged. In this embodiment, alerts generated for clusters having different cluster types may be linked even if the clusters are not merged, as described below in reference to FIGS. 21 and 22. In alternative embodiments, clusters generated according to different clustering strategies (for example, having different cluster types) may be merged.

b. Example Method of Alert Generation

FIG. 10B is a flowchart of an example method of alert generation for a particular data cluster, according to an embodiment of the present disclosure. At block 1022, the system accesses data, including data items and related metadata and other information, of the data cluster. As described below, this accessed cluster data is analyzed to generate the human-readable conclusions, the alert scores, and may be included and organized in the user interface of the alert. At block 1024, the system determines the cluster type of the data cluster. As mentioned above, a data cluster generated according to a given clustering strategy (and its associated seed generation strategy or strategies) may be understood as having a "cluster type" (also referred to as a "data cluster type") corresponding to that clustering strategy.

At block 1026, having determined the cluster type of the data cluster, the system accesses one or more cluster analysis rules or criteria associated with that cluster type. As various data clusters may be generated according to different clustering strategies, and each of the clustering strategies may be associated with differing types of investigations, the analysis rules or criteria used to analyze the clusters vary according to the cluster types and their respective associated types of investigations.

At block 1028, the system analyzes the data cluster based on the accessed analysis rules/criteria. The cluster data is then evaluated by the system (for example, by the cluster/rules engine 120) according to the analysis rules/criteria. Many examples of cluster analysis according to various clustering strategies are described in the various related applications listed above and previously incorporated by reference herein. In the various examples, analysis of clusters may be described in the context of cluster scoring (for example, generating of clusters scores and/or metascores). For example, in U.S. patent application Ser. No. 14/139,628, cluster data is scored and/or analyzed in various contexts including, among others:

Tax Fraud Detection, in which clusters are analyzed to determine a number of known fraudulent returns in a cluster, a number of first-time filers in the cluster, and/or a mismatch between reported incomes in the cluster, among others.

Beaconing Malware Detection, in which clusters are analyzed to determine a number of known bad domains in a cluster, an average request size in the cluster, and/or a number of requests blocked by a proxy in the cluster, among others.

Additional examples are described in U.S. patent application Ser. No. 14/473,920, filed Aug. 29, 2014, and titled "External Malware Data Item Clustering And Analysis," in which cluster data is scored and/or analyzed in various contexts including:

Internal and External Phishing, in which clusters are analyzed to determine a most common email subject of emails in the cluster, numbers of emails in the cluster sent within particular time periods, and/or number of recipients of emails in the cluster, among others.

Internal and External Threat Intel, in which clusters are analyzed to determine a number of URLs in the cluster referenced by an analyzed malware data item, a percentage of traffic in the cluster categorized as likely malicious, and/or a highest organizationally hierarchical position of a person in the cluster associated with a malicious connection, among others.

IDS (Intrusion Detection System), in which clusters are analyzed to determine a time spanned by alert notices in the cluster and/or a number of alert notices associated with particular IP addresses, among others.

Yet another example is described in U.S. patent application Ser. No. 14/278,963, filed Apr. 5, 2014, and titled "Clustering Data Based On Indications Of Financial Malfeasance," in which cluster data is scored and/or analyzed to detect bad activity by traders (generally referred to herein as "trader oversight").

i. "Conclusions"

At block 1030 of FIG. 10B, the system generates one or more conclusions for the analyzed data cluster based on the cluster analysis. As described above, the generated conclusions (also referred to herein as summaries) comprise compact, human-readable phrases or sentences that provide highly relevant, and easily evaluated (by a human analyst), information regarding the data in the cluster (for example, data items and metadata). The conclusions may be useful to an analyst in evaluating the importance or criticality of the cluster in the context of a particular investigation. As with the analysis rules/criteria described above, each cluster type may be related to a set of conclusions appropriate to the type of investigation associated with the cluster type. FIG. 10C illustrates various example templates for conclusions (also referred to herein as "conclusion templates") associated with various types of data clusters, according to an embodiment. For example, five cluster types (which are each associated with various seed generation, clustering, and scoring strategies) are included in the example embodiment of FIG. 100: Internal Phishing, External Phishing, Internal Threat Intel, External Threat Intel, and IDS (short for Intrusion Detection System). Each of the example cluster types is associated with one or more conclusion templates, as shown in the right column of the table of FIG. 10C. The conclusion templates include fields (indicated by the symbols < and >) into which cluster information, obtained as a result of the cluster analysis, is inserted when the conclusion is generated.

For example, in reference to the embodiment of FIG. 10C, for the cluster type "External Phishing," a conclusion template is "This campaign consists of <m> emails submitted to external Abuse," where <m> indicates a field to be filled in by the system based on the cluster analysis, and "external Abuse" may refer to an email address or box. In generating this conclusion, the system accesses the relevant set of conclusions (for example, conclusions associated with the type of the cluster analyzed) and inserts relevant cluster analysis data into each of the conclusions (for example, "This campaign consists of 25 emails submitted to external Abuse"). In another example, for the cluster type "External Threat Intel," a conclusion template is "<k>% of proxy traffic was blocked, and <l>% was marked as malicious by Proxy," where <k> and <l> indicate fields to be filled in by the system based on the cluster analysis. In generating this conclusion, the system accesses the relevant set of conclusions (for example, conclusions associated with the type of the cluster analyzed) and inserts relevant cluster analysis data into each of the conclusion templates (for example, "10% of proxy traffic was blocked, and 7% was marked as malicious by Proxy").

In an embodiment, conclusion templates, such as those listed in the table of FIG. 10C, may be manually generated by humans based on a determination of information likely to be helpful to an analyst in evaluating alerts/clusters. The manually generated conclusion templates associated with respective cluster types may then be automatically accessed by the system (e.g., after automatically determining which conclusion templates are applicable), relevant data may be inserted into any indicated fields, and conclusions may then be automatically generated based on the selected conclusion template(s) and presented on a user interface (as described below). In another embodiment, the system may automatically use heuristics to generate conclusion templates that may then be presented by the system. In this example, the system may determine, over time, information most useful to analysts, and thereby generate conclusion templates and conclusions based on that useful information.

In an embodiment, a predefined group of conclusions may be associated with each cluster type. In this embodiment, all conclusions in the relevant group may be generated and presented in the user interface for each respective alert. In another embodiment, various conclusions may be associated with each cluster type, and the system may determine particular conclusions, based on the cluster analysis, to generate and present in the user interface. In this embodiment, the system may select particular conclusions based on a likelihood that the particular conclusions will be helpful to the analyst in evaluating the cluster. For example, when a cluster does not have any data items (and/or other information) of a particular type that are enumerated (and/or otherwise evaluated) in a particular conclusion, that particular conclusion may not be displayed to the analyst. Alternatively, the system may indicate to the analyst that the particular conclusion is not applicable to the cluster.

In an embodiment, conclusions may be unique to each cluster type. In another embodiment, conclusions may be applicable to multiple cluster types.

In an embodiment, a conclusion may not express an opinion, but may only provide factual information. For example, "Less than 1 MB of data was exchanged with the following URL: http://example.com." In another embodiment, a conclusion may express an opinion if a judgment threshold is provided (for example, some factual basis for the opinion), but not otherwise. For example, an appropriate conclusion may be "Only a small amount of data, 0.7 MB, was exchanged with the following URL: http://example.com," while an inappropriate conclusion may be "Only a small amount of data was exchanged with the following URL: http://example.com." In various embodiments, conclusions generated by the system provide factual and/or opinion information to the analyst in the context of a particular investigation and/or cluster/alert type.

In an embodiment, each conclusion is limited to a particular number of words, for example, 10, 15, or some other number. In an embodiment, each user interface associated with an alert (as described below) displays between one and some other number of conclusions, for example, 2, 3, 4, 5, among others.

ii. "Alert Score"

Turning again to the embodiment shown in FIG. 10B, at block 1032, the system generates an alert score for the analyzed data cluster based on the cluster analysis. As described above, the alert score may be the same as, similar to, and/or based on any of the scores, metascores, and/or conclusions described herein. An alert score may provide an initial indication to an analyst of a likelihood that a cluster/alert is important or critical in the context of a particular investigation (for example, a degree of correlation between characteristics of the cluster/alert and the analysis rules/criteria). As described below, the alert score is represented in the analysis user interface by an indicator, icon, color, and/or the like. An analyst may sort alerts/clusters based on the alert scores so as to enable an efficient investigation of more important alerts/clusters first.

In an embodiment, the alert score may be a metascore, and may be one of multiple values. For example, the alert score may be one of three values corresponding to, for example, a high alert, a medium alert, or a low alert. In other embodiments, the alert score may be partitioned into more or fewer values. Examples of various scores and metascores associated with various cluster strategies are described in the various related applications listed above and previously incorporated by reference herein. For example, in U.S. patent application Ser. No. 14/139,628, example cluster metascores are described in the contexts of tax fraud detection, beaconing malware detection, malware user-agent detection, and activity trend detection.

As mentioned above, in an embodiment, the alert score may be binned into one of three bins corresponding to a high alert, a medium alert, or a low alert. Each alert level may be associated with an indicator, icon, color, and/or the like. For example, a high alert may be associated with red (and/or another color), a medium alert may be associated with orange (and/or another color), and a low alert may be associated grey (and/or another color).

In an embodiment, the cluster alert score is determined based on and conveys both a determined importance/criticality (for example, a metascore comprising scores showing a high number of data items may indicate likely fraud) and a confidence level in the determined importance/criticality. For example:

A high alert may be indicated when:
an importance metascore is above a particular threshold (for example, greater than 60%, or some other percent or number), AND a confidence level is above a particular threshold (for example, greater than 70%, or some other percent or number).

A medium alert may be indicated when:
an importance metascore is below a particular threshold (for example, less than 60%, or some other percent or number), AND a confidence level is above a particular threshold (for example, greater than 70%, or some other percent or number), OR
an importance metascore is above a particular threshold (for example, greater than 60%, or some other percent or number), AND a confidence level is below a particular threshold (for example, less than 30%, or some other percent or number).

A low alert may be indicated when:
either an importance metascore is below a particular threshold (for example, less than 60%, or some other percent or number), OR a confidence level is below a particular threshold (for example, less than 30%, or some other percent or number).

In other embodiments, other criteria may be used to determine alert levels to provide to the end user, possibly based on additional or fewer parameters than discussed above. In some examples, alerts are associated with ranges of importance metascores and/or confidence levels, rather than only a minimum or maximum level of particular scores as in the examples above.

In an embodiment, a confidence level may be determined based on a false positive rate. The false positive rate may be based on, for example, historical information indicating how frequently other clusters having similar fraud indicators (for example, indicators used in the determination of the importance metascore) have been determined, after human analysis, to be critical or not consistent with the importance metascore. The false positive rate may also (or alternatively) be based on, for example, information provided from third-parties, such as blacklists that include a likelihood that any item on the blacklist is a false positive.

As mentioned above, in an embodiment the alert score may be based on one or more cluster scores and/or the analysis rules/criteria. In this embodiment, a high alert score may indicate a high degree of correlation between characteristics (for example, data and metadata) of the cluster and the analysis rules/criteria (that may, for example, indicate a likelihood of fraud, among other indications). Similarly, a low alert score may indicate a high degree of correlation between characteristics of the cluster and the analysis rules/criteria.

c. Example Analysis User Interfaces

FIGS. 11-20 illustrate example data cluster analysis user interfaces of the data analysis system, according to embodiments of the present disclosure. In various embodiments, aspects of the user interfaces may be rearranged from what is shown and described below, and/or particular aspects may or may not be included. However, the embodiments described below in reference to FIGS. 11-20 provides example analysis user interfaces of the system.

Figure 11:
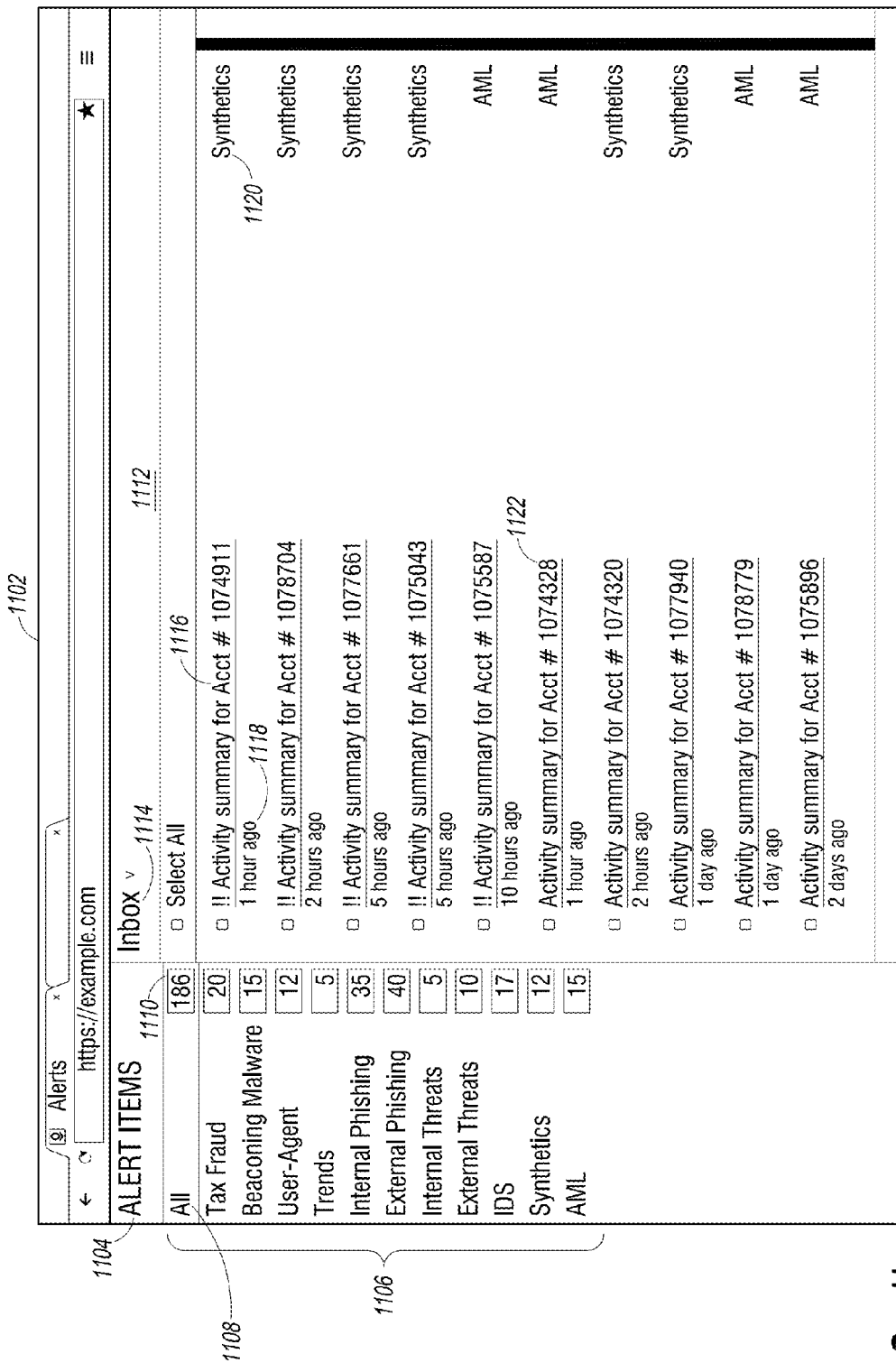

FIG. 11 illustrates a user interface 1102 of the system in which various indicators of alerts associated with various types of clusters are displayed, according to an embodiment. The user interface 1102 includes a panel 1104 including a listing of various cluster types 1106 (which are each associated with respective clustering strategies). Selection of one of the cluster types 1106 results in a display of indications of associated alerts in the panel 1112. In FIG. 11, selection of "All" 1108 causes display of a combined list of indicators associated with all types of clusters in the panel 1112. Indicator 1110 shows a number of alerts among all the cluster types. In the panel 1112, at 1114 it is indicated that the present view is the "Inbox." The Inbox includes indications of alerts that have not yet been "Archived" by the analyst (as described below). Alternatively, the Inbox may show indications of alerts that have not yet been viewed by the analyst.

At 1116 an indication of an alert is shown. As discussed above, each listed alert corresponds to a particular data item cluster that has been generated, analyzed, and scored. Various details related to the alert are displayed including an alert title (for example, "!! Activity summary for Acct#1074911"), an indication of a time 1118 when the event associated with the alert occurred (for example, "1 hour ago"), and an indication of the cluster type 1120 (for example, "SYNTHETICS"). The alert title may be a single, human-readable summary phrase or sentence, and may be generated similar to the generation of conclusions described above, and/or may be (or include) one of the conclusions described above. In the example shown, the alert 1116 is related to identification of fraudulent bank accounts, and the alert title indicates the number of the primary bank account associated with the cluster. Additionally, the "!!" symbol shown at the beginning of the alert title provides an indication of the alert score of the alert. In the example shown, a "!!" indicated a medium risk level, a "!!!" indicates a high risk level, and no symbol indicates a low risk level. In other embodiments the alert level of an alert may be indicated by an icon and/or coloring of the alert indicator, among other indications. The analyst may select any of the listed alert indicators to view additional detail related to the selected alert. In an embodiment, the list of alert indicators may automatically be sorted according to one or more criteria, for example, the alert score. In an embodiment, the analysis may choose to sort the list of alert indicators as desired. In an embodiment, the time 1118 may be a time when the alert was generated, rather than the time the event associated with the alert occurred. In another embodiment, the time 1118 may include both the time the alert was generated and the time the event associated with the alert occurred.

FIG. 12 illustrates a user interface 1202 of the system in which a particular selected alert is displayed, according to an embodiment. The upper portion 1203 of the user interface may be colored to correspond to the alert score, as described above. At 1204 the alert title is displayed. A unique icon 1205 associated with the cluster types may be displayed. At 1206, an indication of the cluster type is given, as well as a unique identifier of the alert (for example, "#116," which may be useful for further investigation, note taking, and/or sharing by the analyst). At 1208 various conclusions (generated as described above) associated with the cluster are displayed. For example, in the cluster represented by the alert shown, the conclusions indicate that there have been no money transfers to other accounts, there are 13 transactions, the largest transaction is $9,897.61, and 2 online accounts have been accessed by 29 computers. Such information may be helpful to an analyst in evaluating whether or not the alert includes accounts associated with fraudulent identities (also referred to as synthetic identities).

Selectable buttons 1210 and 1212 (and/or other user interface elements) are displayed by which the analyst may access detailed cluster data. For example, the analyst may select "Latest Online Account Logins" button 1210 to view a listing of most recent account login data panel 1214. Similarly, the analyst may select "Latest Transactions" 1212 to view a listing of transaction data in the panel 1214. Additional buttons or controls may be included in the display such that the analyst may view other data related to the cluster. As shown, the data displayed in the panel 1214 may be organized in a table including columns and rows. Data displayed may be drawn from various data items and/or other information included in the cluster. The particular buttons (such as buttons 1210 and 1212) displayed in the alert may be defined by the clustering strategy and/or another set of rules related to the cluster type. FIG. 13 shows the same alert as shown in FIG. 12, however the latest transactions button 1212 has been selected by the analyst, such that the information in panel 1214 is updated to show a listing of most recent transactions. In an embodiment, information shown in the panel 1214 may be automatically sorted chronologically from most recent event. Further the analyst may select the button 1302 to view further additional cluster data.

In other embodiments, the user interface may include links (for example, via buttons or other user interface elements) to relevant cluster information internal to an organization using the data analysis system, external to the organization, and/or other types information.

FIG. 14 illustrates a user interface 1402 of the system that is displayed when the show logs button 1302 (of FIG. 13) is selected, according to an embodiment. The user interface includes various cluster data and information 1404 organized in a table, a dropdown list of data types or sources 1406, a time filter 1408, and the button 1302 that may be selected to go back to the alert display of FIG. 12 or 13. The cluster data and information 1404 may be drawn from various data items and/or other information included in the cluster. The table shown is a stacked table, meaning that multiple differing types of data are displayed in the table, and the types of data displayed in a given column or row of the table may change within the given column or row. For example, as the dropdown 1406 indicates that all data types are displayed, the top portion of the table, as indicated by the left-most column, includes Address data items, the next portion of the table (below the top portion) includes Transaction data items, the next portion of the table includes Account data items, the next portion of the table includes Online Account data items, and the bottom portion of the table includes Customer data items. The analyst or other user may scroll down the table to view additional table entries, and/or may scroll horizontally to view additional columns of the table. In various embodiments the table may or may not be sorted by default in a chronological order, and the columns may or may not be arranged such that the first column for each data type is a timestamp. In an embodiment, information displayed in the table is raw data drawn from entries associated with data items of the cluster.

Figure 15:

FIG. 15 illustrates the same user interface as shown in FIG. 14, but shows various changes made by the analyst, according to an embodiment. For example, the analyst has selected the dropdown box 1406 to view the various types of data that may be selected. Further, the analyst has moved a starting-time indicator 1502 on the time filter 1408. Moving the starting-time indicator 1502 causes the data displayed in the table to be filtered to include only data that was produced and/or relates to items or events that occurred within a time span indicated by the starting-time indicator 1502 and an ending-time indicator 1504.

Figure 16:
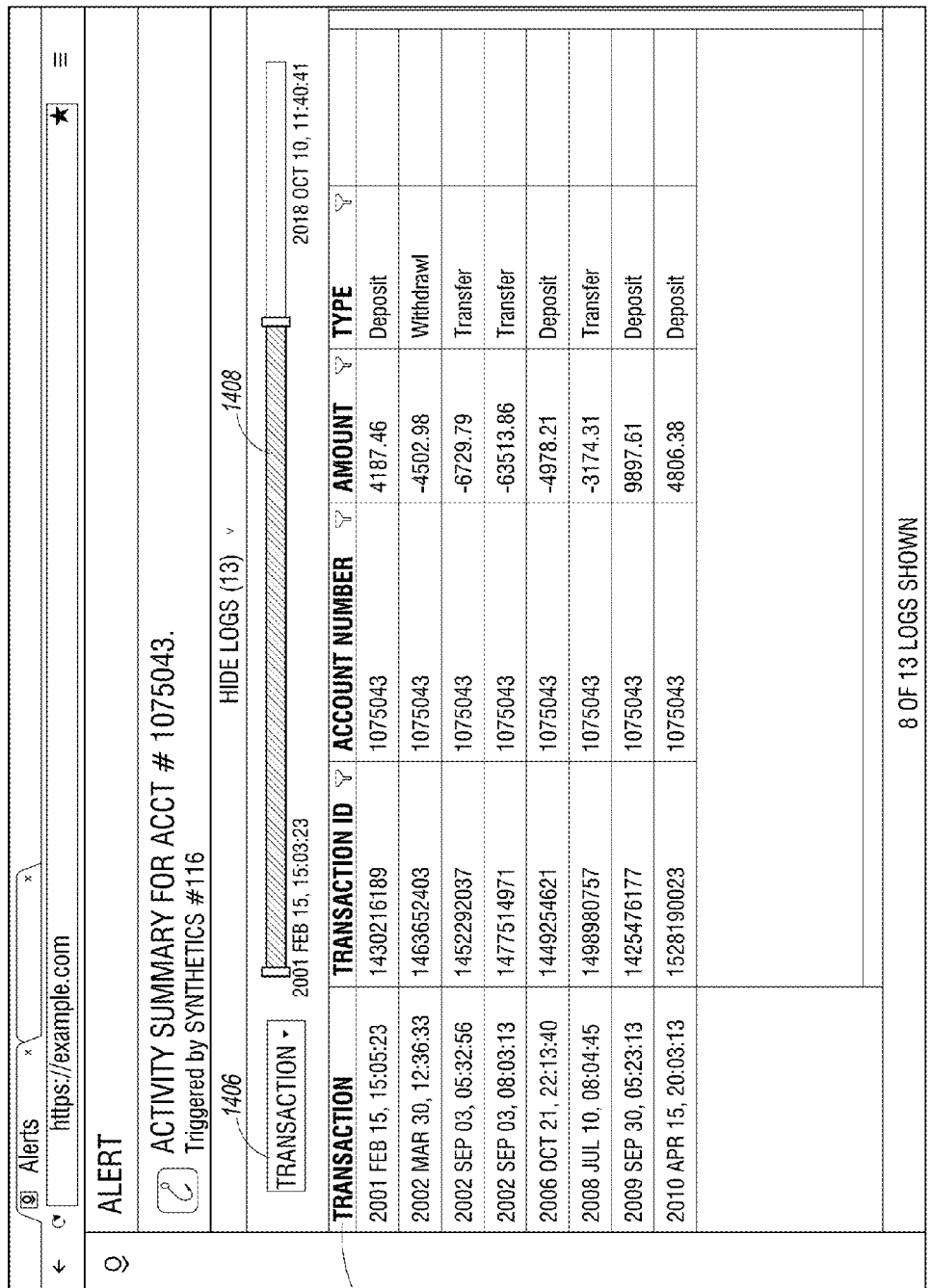

FIG. 16 illustrates the same user interface as shown in FIG. 14, but shows various changes made by the analyst. For example, the analyst has selected to view only Transaction data items via the dropdown box 1406. Further, the analyst has adjusted the time filter 1408 to filter that data items for a different particular time span. Accordingly, the table 1602 only displayed Transaction information related to the specified time span.

FIG. 17 illustrates the same user interface as shown in FIG. 14, but shows that the analyst may further filter the data displayed in the table by values in any of the columns. For example, a Type dropdown menu 1702 may be used by the analyst to specify particular types of transactions that are to be displayed in the table, such that other types of transactions are not displayed. The analyst may specify multiple types by selection and/or text input, and may selectively remove types that are selected.

Figure 18:
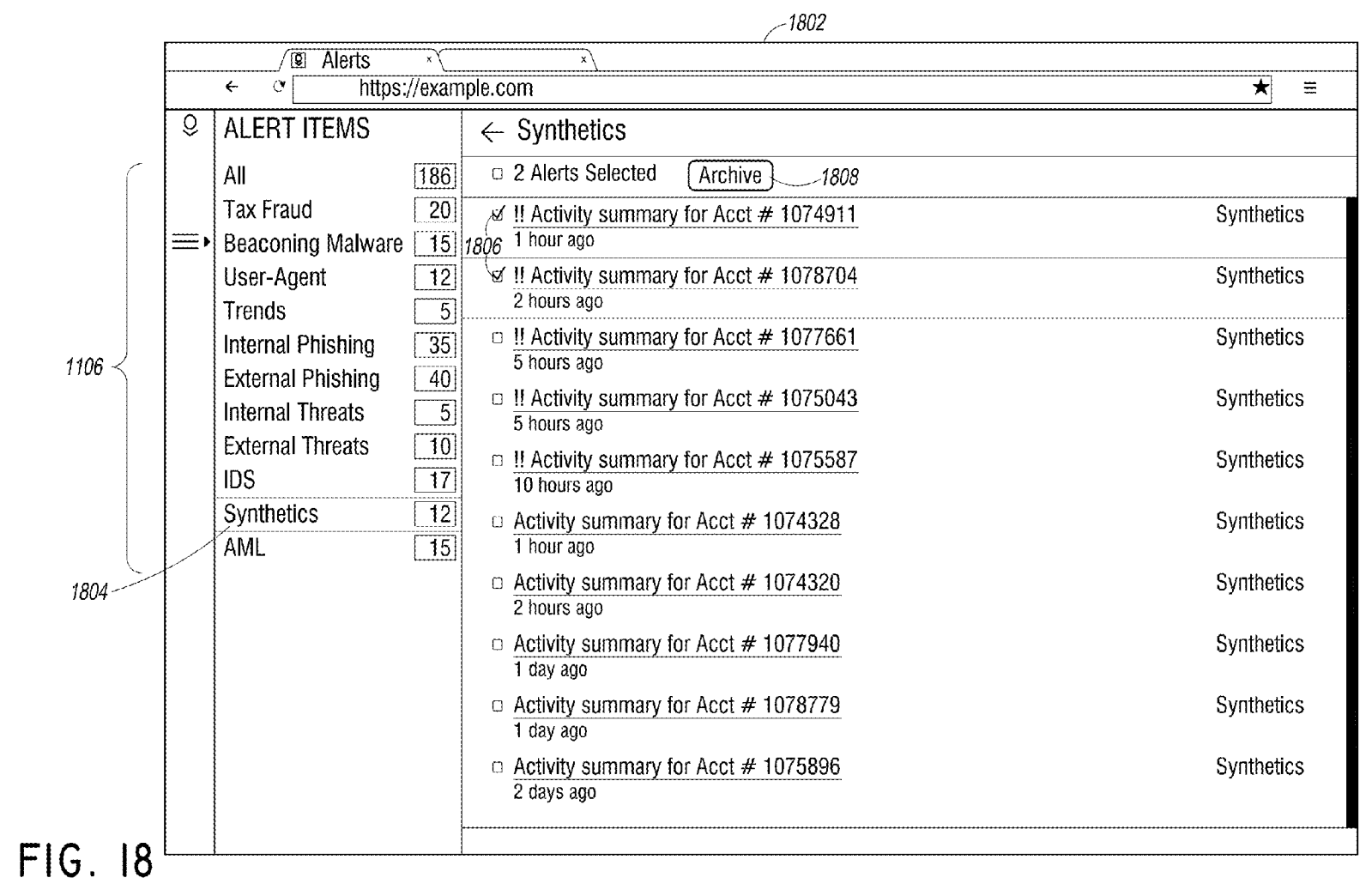

FIG. 18 illustrates a user interface 1802 similar to the user interface of FIG. 11, according to an embodiment. In the user interface of FIG. 18, at 1804 the user has selected to view only indications of alerts of the type "Synthetics." Additionally, FIG. 18 illustrates that the analyst may select multiple indications of alerts, as shown at 1806, such that multiple alerts may be "archived" simultaneously by selection of the archive button 1808. Archiving alerts causes the alerts to be removed from the "Inbox" display. As shown in user interface 1902 of FIG. 19, the analyst may select to view "archived" alerts via the dropdown box 1904. Archived alerts are displayed in a list similar to the list of alerts provided in the Inbox. In an embodiment, archiving of alerts enables an analyst to indicate that they have reviewed a particular alert. The analyst may move the alert from the archive back to the inbox. Further, in other embodiments, alerts may be moved to additional categories (default and/or user defined), for example, a "Starred" category may be available. Archived alerts may automatically be moved back into the inbox when new data items are added to a cluster associated with an archived alert, such as when the cluster is regenerated, for example.

Figure 20:
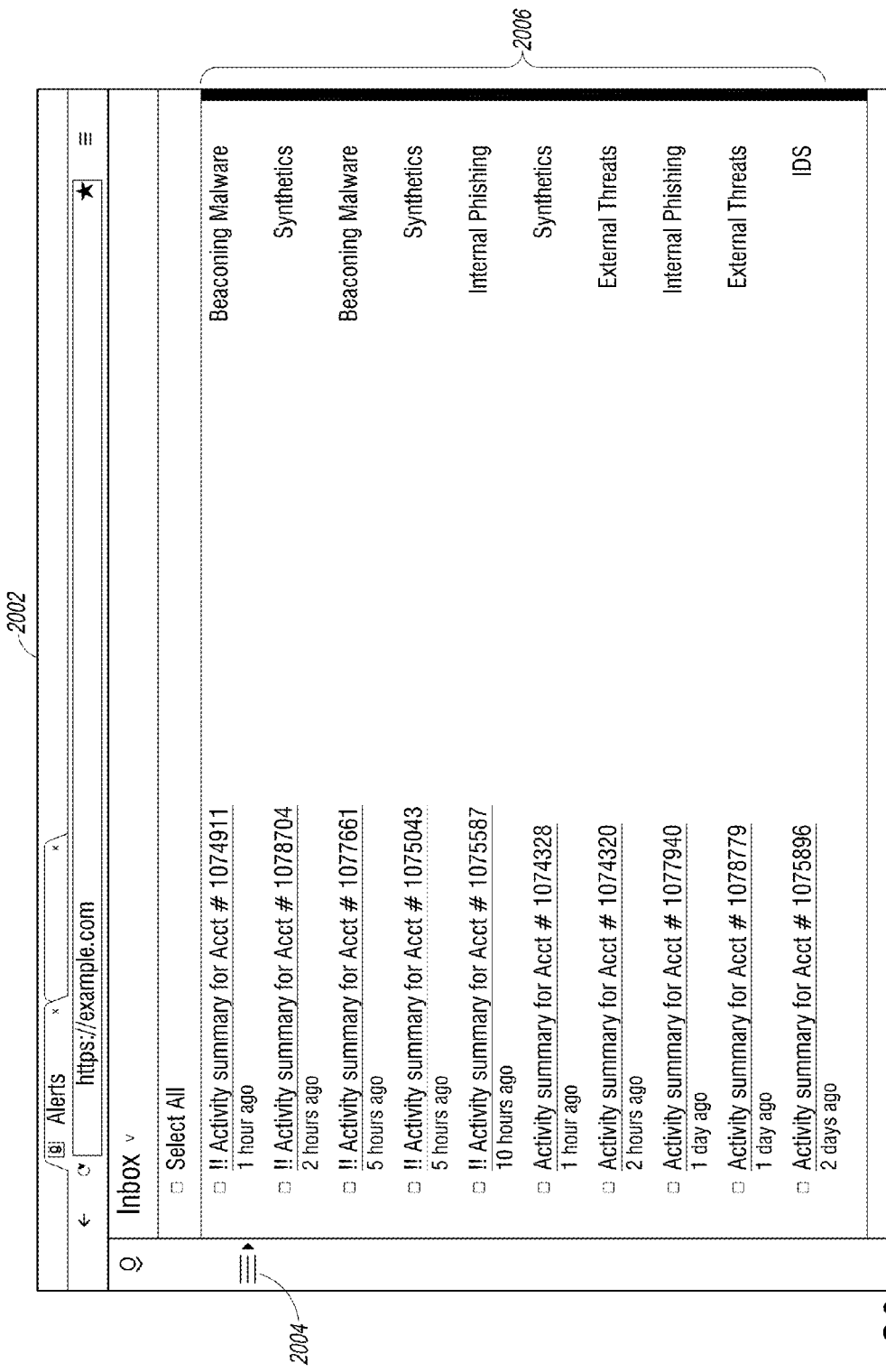

FIG. 20 illustrates a user interface 2002, similar to the user interface of FIG. 11, in which the left panel 1104 has been collapsed (as indicated by 2004) to provide a more streamlined display for the analyst, according to an embodiment.

In an embodiment, the alert user interface, for example the user interface of FIG. 12, may include user interface elements (such as buttons) selectable by the analyst to cause the system to archive an alert, categorize an alert, change an alert level, and/or share an alert with other analysts. In an embodiment, the alert user interface may include a button to add the cluster data items of a graph, as described in various related applications listed above and previously incorporated by reference herein. Further, the system may enable an analyst viewing a graph of data items to go to alerts representing clusters in which that data item is included.

In an embodiment, the analysis user interface, for example the user interface of FIG. 11, may include further details related to each of the indicated alerts. For example, the user interface of FIG. 11 may include conclusions associated with each of the listed alert indications. Providing data to the analyst in this way may enable the analyst to efficiently evaluate clusters without necessarily viewing the alert user interface.

In an embodiment, the analysis user interface, for example the user interface of FIG. 11, may include, in the list of indications of alerts, indications of events of interest to the analyst but generated by other processed. For example, the list may include indications of notices generated by third-party software (for example, a virus scanner).

d. Linking of Related Alerts/Clusters

FIG. 21 is a flowchart of an example method of linking related alerts or data clusters, according to an embodiment of the present disclosure. As described above, when clusters are regenerated, if two clusters of the same type have common data items, the two cluster of the same type may then be merged. However, when two clusters having different cluster types include common data items, they are not generally merged. In order to notify the analyst that two data clusters of different types have common data items, the example method of FIG. 21 may be executed by the system. Such a notification may advantageously enable an analyst, for example, to find additional connections in the context of an investigation. For example, the analyst may discover that an item of malware associated with a malware cluster is hosted at a website that is linked to by phishing emails in a phishing cluster.

In the example method of FIG. 21, at block 2102, the system finds or determines clusters of different cluster types (for example, that were generated according to different clustering strategies) that have common data items (and/or other information). At optional block 2104, a link between the related clusters/alerts may be generated. FIG. 22 illustrates an example data cluster analysis user interface 2202 in which related alerts or data clusters are linked to one another, according to an embodiment of the present disclosure. As shown, at 2404 links from the current alert/cluster to two other related alerts/clusters is provided. The analyst may then select one of the links (for example, either "Cluster ABC" or "Cluster XYZ") to view the alert pertaining to that cluster. In an embodiment, an indication of the common data items among the clusters is provided in the user interface.

Turning again to the example method of FIG. 21, at optional block 2106 the clusters/alerts may be merged. For example, rather than simply linking among related alerts (as in FIG. 22), the system may combine the alerts into a single alert user interface.

Further, in the example method of FIG. 21, at optional block 2108, the analyst may be notified when two clusters/alerts are linked or related. For example, the analyst may be notified via a popup message displaying in the analysis user interface, via an email or other message, and/or via any other appropriate communications method.

e. Regenerated Clusters/Alerts

In an embodiment, when a cluster is regenerated, as described above with reference to block 1006 of FIG. 10A, an alert may be updated, the analyst may be notified, and/or a new alert may be generated. FIG. 23 is a flowchart of an example method of updating alerts in response to cluster regeneration, according to an embodiment of the present disclosure. At block 2302 of the example method shown, a cluster has been regenerated. At block 2304, the system determines whether any changes have been made to the cluster (for example, any new data items added to the cluster). If not, then at block 2306 the alert corresponding to the cluster is not updated and the method ends. If so, then at block 2308 the system determines whether the analyst has viewed and/or archived the alert corresponding to the cluster. If not, then at block 2310 the alert is updated such that the cluster analysis is rerun, and the alert data (for example, the conclusions) is regenerated, on the new cluster including the new data items. In this block, as the analyst has not previously interacted with the alert, no notifications regarding changes to the alert/cluster are provided. If the analyst has viewed and/or archived the alert, then at blocks 2312 and 2314 the alert may be updated, changes to the alert may be shown in the alert user interface, and/or a new alert may be generated and links between the new and old alerts may be generated and provided in the alert user interfaces. For example, if the analyst was to select an old alert that had been superseded due to cluster regeneration, the system may automatically forward the analyst to the new alert and display a message such as "You have been redirected to the most recent version of this alert. Return to alert 277." Selection of "Return to alert 277" may cause the old alert to be displayed, where a message may be included such as "There is a more recent version of this alert," (which may link to the new alert).

In an embodiment, when regenerated clusters of a same cluster type are merged, alerts corresponding to those previous two clusters may be merged and updates may be displayed, and/or a new alert may be generated (and linked to from the old alerts) as described above.

In an embodiment, the system may provide a data feed including timely updates (including analysis information) on any changes to any previously generated clusters, and/or any newly generated clusters.

X. Cluster Tagging and Grouping

FIGS. 24-34, described below, illustrate methods and user interfaces of the data analysis system, according to various embodiments, in which data clusters are automatically tagged, grouped, analyzed, and presented to an analyst such that the analyst may quickly and efficiently evaluate the groups of clusters. In particular, as described below the data analysis system may apply one or more tagging criteria or rules to the data clusters so as to tag clusters of data items and then group the data clusters according to similar tags. A data cluster may be tagged with multiple tags. Groups of similarly tagged clusters may be presented analyzed and displayed in an analysis user interface through which the analyst may evaluate the groups of clusters and/or access more detailed data related to the cluster. The analyst may dynamically view clusters grouped according to different tags and/or tag types. In an embodiment, the cluster type associated with each cluster may be used as a factor to determine cluster tags and/or tag types, and may be determined according to the cluster strategy by which the cluster was generated. The analyst may filter the groups of clusters based on various criteria, and various analysis techniques may be applied to the groups of clusters and presented in the analysis user interface. As mentioned above, the term "dossier" is used herein to refer to a group of clusters (for example, clusters grouped according to similar tags) and/or the analysis user interface displaying information associated with a group of clusters.

The various methods and user interfaces described below in reference to FIGS. 24-34 may be implemented by various aspects of the data analysis system (for example, the server computing system 110 and/or another suitable computing system) as described above. For example, clusters may be tagged by, for example, the cluster/rules engine 120; analysis of cluster groups (also referred to herein as dossiers) may be accomplished according to analysis rules/criteria 880 as implemented by, for example, the cluster/rules engine 120; and user interfaces may be generated and/or presented to the analyst by, for example, the user interface engine 126; among other aspects.

Additionally, in the methods described in reference to the flowcharts of FIGS. 25-26 and 28 below, in various embodiments, fewer blocks or additional blocks may be included in the example methods depicted, or various blocks may be performed in an order different from that shown in the figures. Further, in various embodiments, one or more blocks in the figures may be performed by various components of the data analysis system, for example, server computing system 110 (described above in reference to FIG. 8) and/or another suitable computing system.

a. Example Method of Cluster Tagging, Analysis, and Grouping

FIG. 24 is a flowchart of an example method of data cluster tagging, analysis, and grouping, according to an embodiment of the present disclosure. In FIG. 24, block 910, 920, 1002, 1004, 1006, 1006a, 1006b, 1006c, and 1008 of the flowchart proceed generally as described in reference to the flowchart of FIG. 10A above.

For example, at block 910 seeds are generated according to one or more seed generation strategies. Examples of seed generation strategies are described in the various related applications listed above and previously incorporated by reference herein. Examples include identifying emails or chats related to bad behavior by traders, identifying tax returns that are potentially fraudulent, identifying communications that are potentially associated with beaconing malware, and/or identifying emails potentially associated with phishing campaigns, among others. Further, at block 920 clusters are generated based on the one or more generated seeds and according to the one or more cluster generation strategies. Examples of cluster generation are described in the various related applications listed above and previously incorporated by reference herein. Examples include strategies for trader oversight, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection, among others.

At block 1002, the system generates "alerts" for each of the clusters, as described above in references to FIGS. 10A and 10B. In particular, each alert includes various types of information related to the cluster that may be useful to an analyst in evaluating the importance or criticality of the cluster in the context of a particular investigation. Generating an alert may include applying various cluster analysis rules or criteria to analyze the cluster and so as to generate human-readable cluster conclusions, as mentioned above. Generating an alert may further include generating an alert score for the cluster. In an embodiment, the system may not generate human-readable cluster conclusion.

At block 2402, clusters are tagged with one or more tags related to the cluster and/or the clustering strategy. Tagging a cluster may include determining a type of the cluster, determining types of tags associated with the type of cluster, and determining tag values based on an analysis of the cluster. Details regarding cluster tagging are described below in reference to FIGS. 25-26.

At block 2404, clusters are grouped (a process that is also referred to herein as generating dossiers) according to similar tags. For example, two clusters both tagged with "trader 1" may be grouped into a single dossier. Details regarding cluster grouping are described below in reference to FIG. 27.

At block 1004, a dossier analysis user interface is provided to the user (for example, an analyst). The dossier analysis user interface is generated similar to the cluster analysis user interface described above in reference to FIG. 10A. However, the dossier analysis user interfaces provided in reference to FIG. 25 include information associated with groups of clusters (dossiers), rather than individual clusters. In various embodiments the analyst may select criteria upon which clusters may be grouped and displayed in the user interface.

For example, in the context of investigations of trader oversight, the analyst may select to group clusters according to trader, book, desk, and/or any other type of tag associated with the clusters. In another example, in the context of cyber security (for example, malware and/or phishing detection) the analyst may select to group clusters according to person, employee, email address, computer, and/or the like. In another example, in the context of pharmaceuticals the analyst may select to group clusters according to machines (for example, alerts may be generated when there is an error on a manufacturing machine).

In an embodiment, clusters may be grouped according to cluster type and/or alert type. Advantageously, according to various embodiments, the analyst may dynamically and interactively change cluster groupings to efficiently investigate large quantities of related data items. Examples of dossier analysis user interfaces are described in further detail below in reference to FIGS. 28-34.

At blocks 1006, 1006a, 1006b, and 1006c, the system regenerates previously generated clusters as described above in reference to FIG. 10A. Advantageously, clusters are automatically tagged, and groups of clusters are automatically and efficiently generated, as clusters are regenerated based on new data items received by the system.

Additionally, at block 1008 clusters are optionally merged as described above in reference to FIG. 10A. However, in an embodiment, while clusters may be merged as described above, clusters may not be merged based on similar tags. Rather, clusters with similar (or the same) tags are maintained as separate clusters. Advantageously, not merging clusters based on tags enable rapid and efficient re-tagging of clusters as the clusters change, and tagging of clusters with multiple tags of one or more types of tags.

b. Example Method of Cluster Tagging

FIG. 25 is a flowchart of an example method of cluster tagging, according to an embodiment of the present disclosure. At block 2502, the system access data, including data items and related metadata and other information, of the data cluster. At block 2504, the system determines the cluster type of the data cluster. As mentioned above, a data cluster generated according to a given clustering strategy (and its associated seed generation strategy or strategies) may be understood as having a "cluster type" (also referred to as a "data cluster type") corresponding to that clustering strategy.

At block 2506, having determined the cluster type of the data cluster, the system accesses one or more cluster tagging rules or criteria associated with that cluster type. As various data clusters may be generated according to different clustering strategies, and each of the clustering strategies may be associated with differing types of investigations, the tagging rules or criteria used to analyze the clusters vary according to the cluster types and their respective associated types of investigations.

At block 2508, the system analyzes the data cluster based on the accessed tagging rules/criteria. The cluster data is then evaluated by the system (for example, by the cluster/rules engine 120) according to the tagging rules/criteria. Evaluation of the cluster for tagging proceeds similar to the process of cluster analysis for alert generation as described above, and may vary according to a context of the investigation. Tags are determined based on data items, and associated metadata, in the cluster. Further, clusters may be tagged based on the cluster type and/or one or more items of information related to the previously generated alerts. For example, a cluster may be tagged according to an alert score associated with the cluster, and/or one or more reasons for the alert score. In an embodiment, cluster tags include both a tag type and a tag value, as described below in reference to FIG. 27. At block 2510, the determined tags are associated with the cluster.

FIG. 26 shows examples of cluster tag types. As shown, various tag types may be associated with one or more cluster types (or clustering strategies). Additionally, a value may be associated with each tag type based on the analysis of the cluster, as described above and below. For example, in the context of trader oversight, clusters may be tagged based on trader, book, and/or desk. In the context of phishing detection, clusters may be tagged based on user, email address, computer, and/or IP address. In the context of tax fraud detection, clusters may be tagged based on computer, IP address, and/or physical address. These tag types are given as examples, and any other tags and/or tag types may be applied to clusters in various contexts.

Values associated with each tag type may be determined based on the analysis of the cluster, as described above. For example, in the context of trader oversight, a given cluster may include data items representing two identified traders: trader 1 and trader 2. Accordingly, the cluster would be tagged as follows: "trader: trader 1" and "trader: trader 2". Additionally, the cluster may indicate trades associated with trading book 10, and that the traders are associated with desk 23. Accordingly, the cluster would also be tagged as follows: "book: book 10" and "desk: desk 23".

As also shown in FIG. 26 and described above, a cluster may be tagged according to a cluster type (clustering strategy), a clustering sub-strategy, an alert type, and alert score, and/or the like. For example, a cluster may be tagged according to its type such as "Internal Phishing", "Trader Oversight", "Tax Fraud Detection", and/or the like. Further, in various embodiments, various clustering strategies may be associated with one another, and/or a clustering strategy may include one or more sub-strategies and/or alert criteria. Such aspects may also be used as a basis for tagging a cluster. For example, the clustering strategy "trader oversight" may be related to one or more other clustering strategies and/or sub-strategies that also cluster data items to detect bad behavior by traders, such as strategies to detect out-of-hours trades and/or deviations in orders (for example, deviations in actual traders from client orders). Clusters may also be tagged according to such sub-strategies. Additionally, clusters may be tagged according to alert types and/or alert scores.

In various embodiments, a given tag type may be applied to a cluster multiple times, or not at all, based on the cluster analysis.

In an embodiment, a cluster tag may comprise an item of metadata associated with the cluster, and stored in a data store along with the data items and/or the cluster data.

c. Example Method of Cluster Grouping/Dossier List Generation

FIG. 27 is a flowchart of an example method of dossier list generation, according to an embodiment of the present disclosure. As described above, the system groups clusters according to tags associated with the clusters to generate dossiers. Dossiers are displayed in dossier analysis user interfaces of the system to enable an analyst to efficiently and rapidly analyze large quantities of related data items. Clusters may be dynamically grouped and re-grouped, filtered, and/or otherwise analyzed via the dossier analysis user interfaces.

At block 2702, the system receives an indication of a tag type by which to group the clusters. For example, and as described in references to FIGS. 28-34 below, the analyst may select to group clusters according to one or more tags types, such as trader, book, user, computer, IP address, or the like.

At optional block 2704, the system receives an indication of one or more filters to apply to the clusters. For example, the analyst may select to filter the clusters according to one or more other tag types and/or tag values, data items of the groups of clusters, and/or various other criteria. At optional block 2706, the system filters the clusters according to the indicated filters.

At blocks 2708 and 2710, the optionally filtered clusters are grouped according to the indicated tag type. Clusters having a same value of the tag type are grouped together. For example, if the clusters are grouped by "trader", two clusters both tagged with "trader: trader 1" will be grouped together. In another example, if the clusters are grouped by "cluster strategy", two clusters both tagged with "cluster strategy: out-of-hours trades" will be grouped together. In some embodiments, clusters having similar tag values may be grouped together. For example, the system may employ a fuzzy matching algorithm to determine tag values that are sufficiently close to each other that the respective associated clusters may be grouped together (to account for, for example, typos and/or other errors in the tags).

As described below, the system automatically and dynamically updates the cluster groupings in response to user inputs. For example, in response to any changes to the indicated tag type, or filters to apply to the clusters, the system may automatically re-filter and/or re-group the clusters and update a user interface.

d. Example Dossier User Interfaces

FIGS. 28-34 illustrate example dossier analysis user interfaces of the data analysis system, according to embodiments of the present disclosure. In various embodiments, aspects of the user interfaces may be rearranged from what is shown and described below, and/or particular aspects may or may not be included. However, the embodiments described below in reference to FIGS. 28-34 provide example dossier analysis user interfaces of the system.

Figure 28:
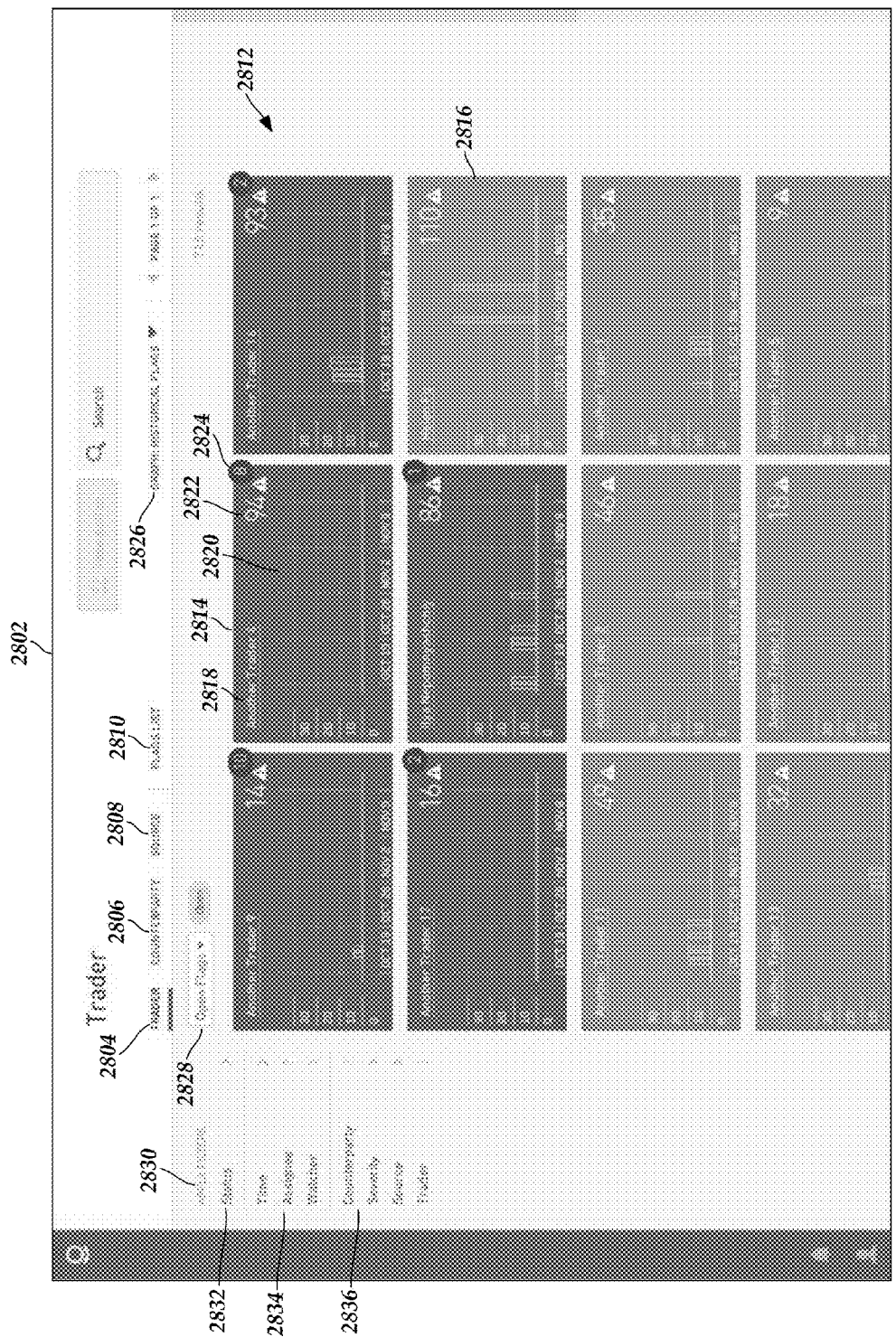

FIG. 28 illustrates a user interface 2802 of the system in which various dossiers, or groups of clusters, are interactively displayed to the user. The user interface 2802 includes a display portion 2812 with multiple user-selectable colored tiles (for example, tiles 2814 and 2816), each tile representing a dossier (or group of clusters). The user interface 2802 also includes various user controls for causing the system to re-group the clusters, filter the clusters, apply statuses to the dossiers, and/or the like. While the user interface 2802 is configured for display of dossiers related to trader oversight, the user interface 2802 may be configured for any other application, as described above.

The user interface 2802 includes user-selectable controls 2804, 2806, and 2808 for grouping the clusters according to different tag types. For example, the user has selected 2804, "trader", as the tag type upon which to group the clusters. Accordingly, the system has grouped the clusters according to values associated with trader tags on each of the clusters. Each of the tiles of display portion 2812 therefore represents a dossier associated with each particular trader. For example, tile 2816 represents a dossier associated with trader "Helen Fu". Tile 2814, on the other hand, represents a dossier associated with trader "Another Trader 4". Each dossier includes all grouped clusters, and associated data items and alerts, associated with each trader. Additionally, each tile shows various information associated with each respective dossier to enable an analyst to quickly triage and analyze the dossier. The user may select a tile to view additional detailed information associated the respective dossier, as described below in reference to FIG. 32.

In an embodiment, selection of control 2806 causes the clusters to be grouped according to a "counterparty" tag, while selection of control 2808 causes the clusters to be grouped according to a "source" tag (for example, a clustering strategy, clustering sub-strategy, and/or alert type).

The user interface 2802 additionally includes a user selectable control 2810, "flag list", while the user may select to cause the system to display a list of alerts, as described below in reference to FIG. 33.

As mentioned above, each of the tiles of the display portion 2812 includes various details associated with the respective dossiers. For example, in reference to tile 2814, the following items of information are determined and displayed by the system: a tag value 2818, an information chart 2820, a number of alerts 2822 associated with the dossier, and a number of critical alerts 2824 associated with the dossier. The information chart 2820 of the user interface 2802 is a time-based bar chart showing a number of alerts (associated with the dossier) over a particular period of time, however the information chart is configurable and may display any information associated with the dossier. For example, the analyst may use the dropdown 2826 to change the information chart to any desired chart. The indication of the number of alerts 2822 provides the analyst with information about a number of individual alerts, or clusters, associated with the dossier. Additionally, the indications of the number of critical alerts 2824 provides the analyst with information about an importance of the dossier. In an embodiment, critical alerts include any alerts in the dossier that are high alerts (according to the alert score, as described above). In another embodiment, critical alerts include any alerts in the dossier that are medium alerts (according to the alert score, as described above). Additionally, each of the tiles of the user interface 2802 is colored according to a highest alert score associated with the dossier. For example, dossier 2814 includes eight critical alerts, and is therefore colored red, while dossier 2816 includes no critical alerts, and is therefore colored orange. In an embodiment, any tag values known by the system, but that do not include any clusters/alerts satisfying a current filtering criteria (as described below), may be displayed in the display portion as tiles. As also show, the tiles are arranged with the most critical dossiers appearing at the top of the display.

The example user interface 2802 additionally includes various user-selectable elements for filtering clusters, as mentioned in reference to FIG. 27 above. For example, a list of filter criteria 2830 shows various types of filters that may be applied to the clusters. The types of filters include "status" (as indicated at 2832), types associated with times and/or analysts assigned to clusters/alerts (as indicated at 2834), and types associated with any cluster tags (as indicated at 2836). The user may select one or more of the filter types, which causes the system to display a popup with various specific values by which to filter the clusters. In an embodiment, the "status" filter type refers to the cluster types (or alert types).

Figure 29:
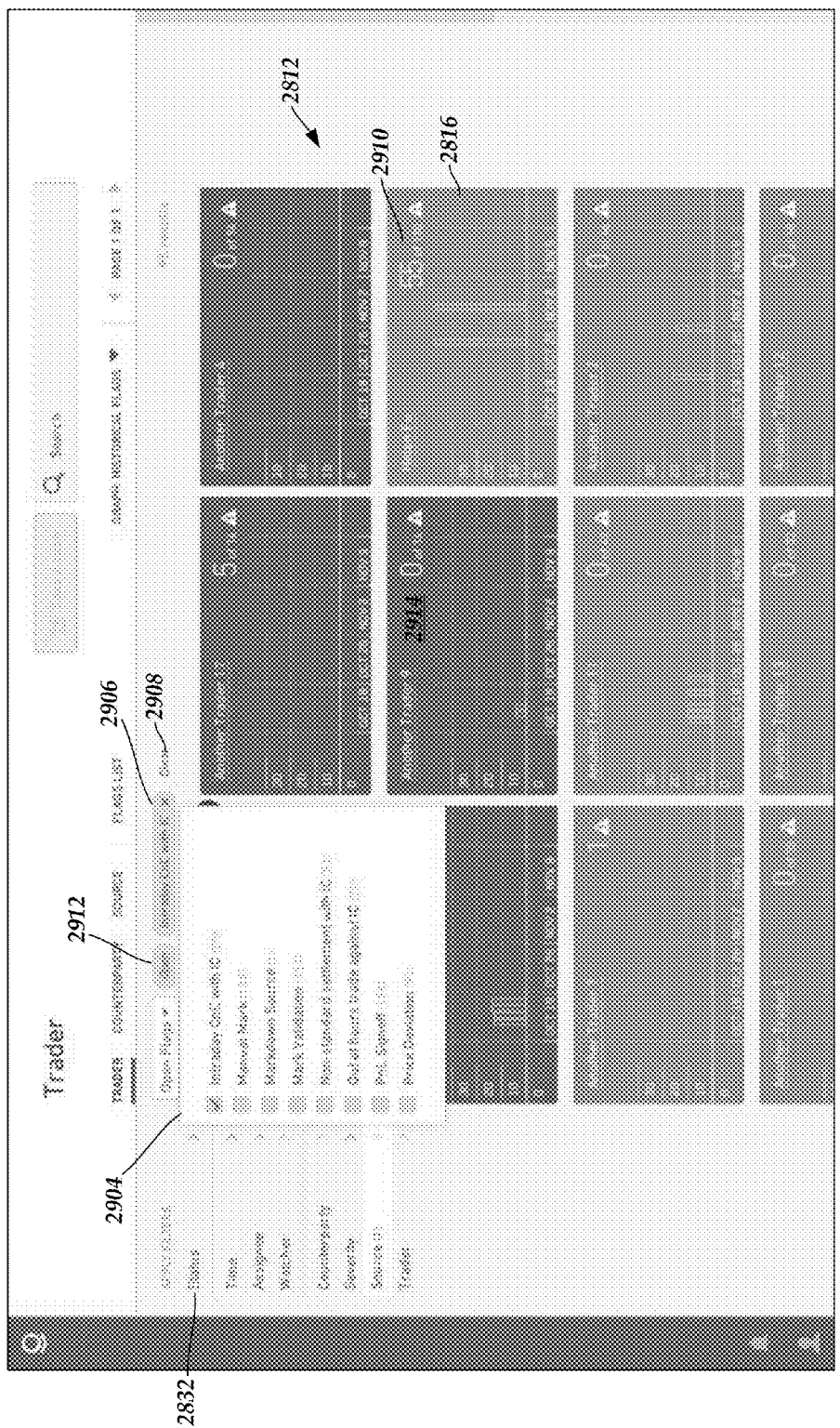

For example, FIG. 29 shows the example user interface 2802 in which the user has selected the "status" filter type 2832. A popup 2904 includes the various values of statuses (or cluster/alert types) associated with the various clusters/alerts, each selectable by the analyst. The popup 2904 also includes, for each of the filter values, an indication, in parentheses, of a number of associated clusters/alerts. As shown the analyst has selected the "Intradate CnC with IC" status value by which to filter the clusters. Accordingly, the system dynamically applies the filter criteria to the clusters, filtering out any clusters that do not meet the criteria, and updates the display of dossiers in the display portion 2812. For example, as shown in the display portion 2812, the number of alerts associated with most of the dossiers has changed in response to the filtering. Tile 2816, for example, now shows 55 associated alerts, rather than 110 as shown in FIG. 28. Tile 2914 shows zero alerts, however (as mentioned above) in an embodiment the tile is still displayed in the display area 2812. Each tile also includes an indication of a total number of alerts in the respective dossiers without any filters applied. For example, tile 2816 indicates "55 of 110" alerts. As also shown in the example user interface of FIG. 29, above the tiles an indication is given of each filter currently applied to the clusters. Accordingly, as shown at indicator 2906, the "Intraday CnC with IC" cluster type filter is applied. Additionally a "state" filter 2912 ("open") is applied to the clusters (cluster states are described in further detail below in reference to FIG. 31). The analyst may select the "clear" button 2908 to clear all filters applied to the clusters.

Figure 30:
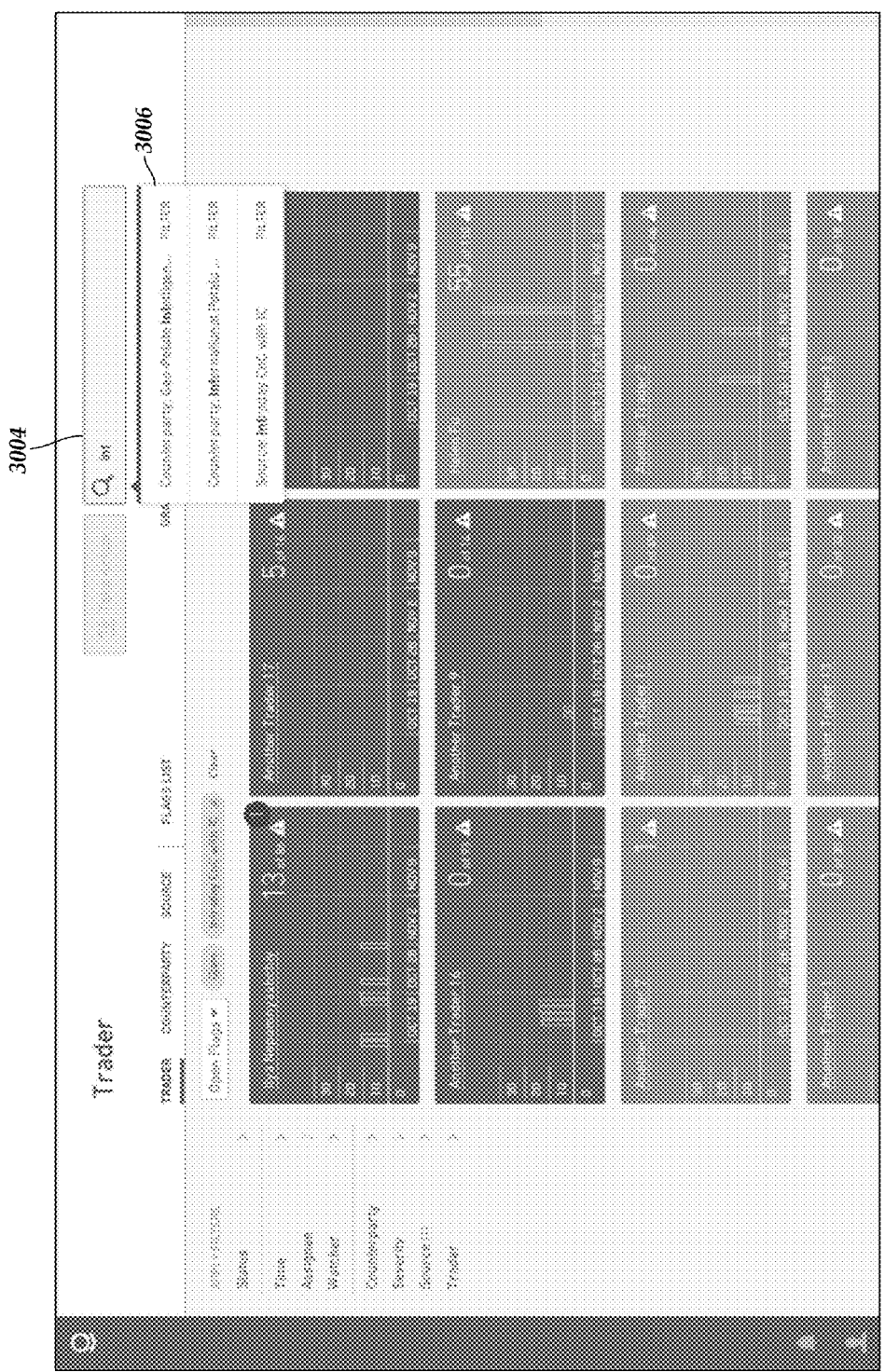

Turning to the example user interface of FIG. 30, another method of applying filtering criteria to the clusters is shown.

In particular, search box 3004 may be used to apply filters to the clusters. The user may type all or part of any applicable filter criteria into the search box 3004, which causes the system to automatically generate a list 2006 of any matching filter criteria. The user may then select to apply the filter to the clusters similar to the application of filters described above.

Returning to FIG. 28, dropdown box 2882 may be used to apply a preselected, or saved, set of filters. As shown, the analyst has selected the "Open Flags" filter set, which includes a filter to any clusters/alerts with the current state of "open". In various embodiments, a saved filter may include multiple filter criteria. In an embodiment, after applying a set of filters to the clusters, the analyst may save the particular set of filters so as to enable efficient application of the set of filters in the future by a single selection from dropdown 2828. In an embodiment, an analyst may specify a default filter set to be applied each time the analyst logs in to the system. For example, a particular analyst may be responsible for overseeing activities of four traders. Accordingly, the analyst may create and save (and optionally set as default) a set of filters to only display clusters/alerts associated with those four traders.

In an embodiment, filters are disjunctively applied (for example, logical OR) across same filter types, and conjunctively applied (for example, logical AND) across different filter types. Thus, for example, if the analyst selects to filter the cluster/alerts to "trader: trader 1", "trader: trader 2", and "severity: high", the filter criteria is applied to the clusters as "trader:(trader 1 OR trader 2) AND severity: high".

Multiple types of filters may be saved together, and the system may include multiple preset sets of filters that are especially and frequently useful to the analyst in a particular investigation. An example preset filter may be titled "Critical Open Flags to Triage", which may include the following filters: state: Open AND alert score: Medium OR Critical).

Figure 31:
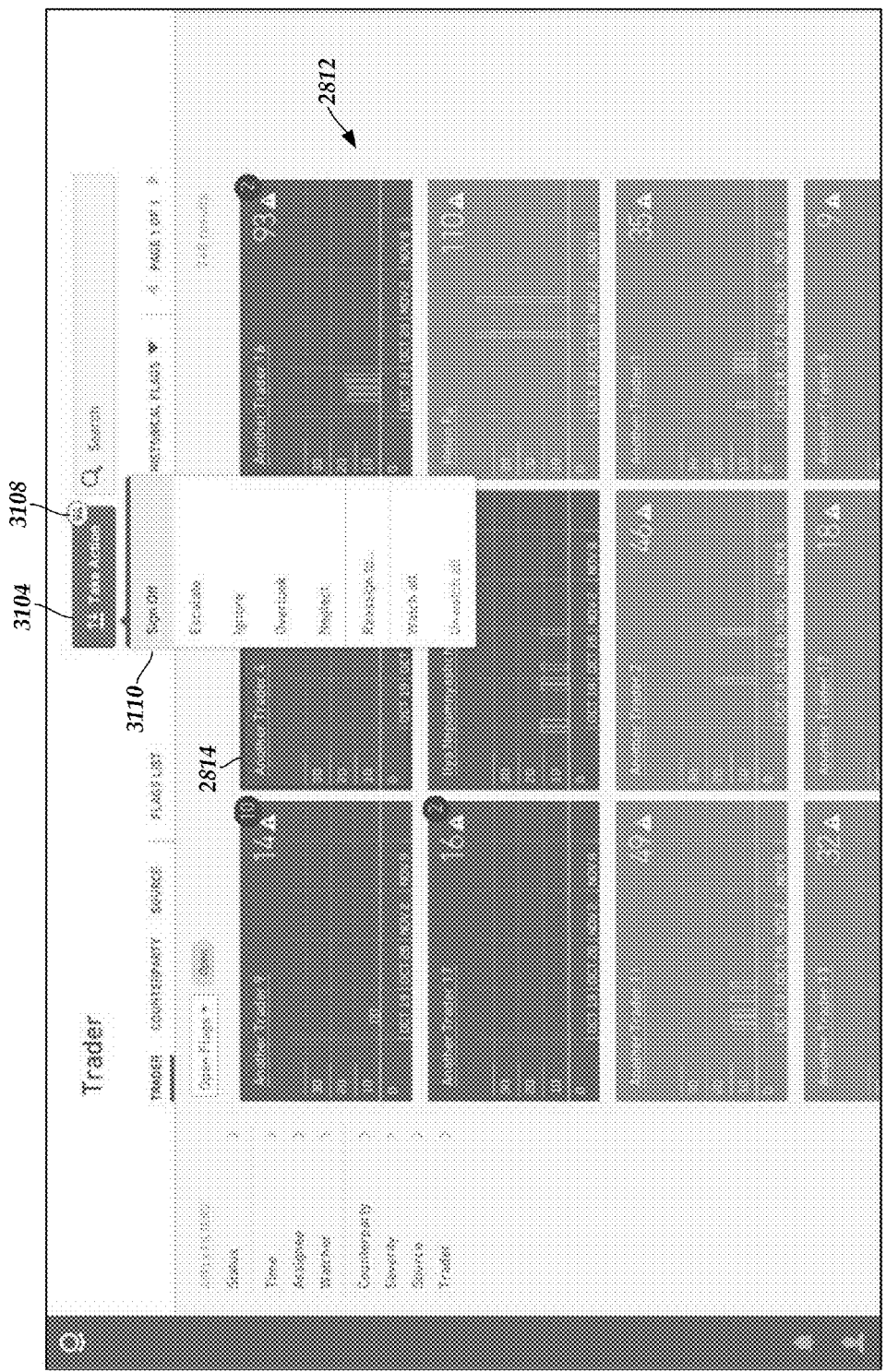

FIG. 31 shows the example user interface of FIG. 28 in which the analyst is applying "states" to the dossiers (and thereby the clusters associated with the dossiers). Advantageously, in various embodiments, the system enables the analyst to apply any "state" to a group of clusters, or multiple groups of clusters, efficiently and simultaneously. States may comprise another tag type that may be applied to clusters, and by which clusters may be filtered. Assigning states to clusters is similar to the process of marking alerts as archived (as described above in reference to FIGS. 18 and 19) but is more flexible and customizable, and may be used by the analyst to assign groups of clusters to particular analysts, mark certain groups of clusters as important or not, watch groups of clusters, and/or the like.

FIG. 31 shows selection of a "Take Action" button 3104. Selection of button 3104 allows the analyst to apply any number of states of one or more selected dossiers (and thereby the clusters associated with the dossiers). For example, the user has selected tile 2814, the "Another Trader 4" dossier, which comprises a group of 94 clusters (as currently filtered). Multiple dossiers may be selected by the analyst, and only those clusters that satisfy any given search criteria and associated with selected dossiers are selected for applying the states. A number of clusters to which the state is being applied is shown at indicator 3108. Examples of states that may be applied include "Sign Off", "Escalate", "Ignore", "Overlook", "Neglect", "Reassign to", "Watch all", and "Unwatch all". The states "Sign Off", "Escalate", "Ignore", "Overlook", and "Neglect" may be used to designate clusters for further review, or to mark clusters as unimportant, according to the various states. In some embodiments, clusters marked as "Sign Off", "Ignore", "Overlook", or "Neglect" may be removed from the user interface, while clusters marked as "Escalate" may be indicated by highlighting in the user interface. The states "Reassign to" may cause the system to provide a popup by which the analyst may assign and/or reassign the clusters to a particular analyst (or multiple analysts) for review. Additionally, upon assigning the clusters, the analyst may include a note that may be provided to the assigned analyst(s) when they are notified of the assignment. The states "Watch all" and "Unwatch all" may be used by the analyst to receive (or stop receiving) notifications of changes to particular dossiers/clusters. Notifications regarding assignments and/or watching are described below in reference to FIG. 34. Advantageously, according to various embodiments, the analyst may easily and efficiently apply states to multiple clusters via the dossier analysis user interface. For example, a particular dossier (including multiple clusters) may be determined to be unimportant (or otherwise not representing risky activity) and may thereby by quickly dismissed by the analyst. In some embodiments, the above-described states "Reassign to", "Watch all", and "Unwatch all" may not be considered states, but rather may be stored and tracked separately from the states and in conjunction with the notifications workflows described below in reference to FIG. 34.

In an embodiment, the tiles of FIG. 28 advantageously each show a similar time-based chart (or other type of chart) having common axes and/or common scales on the axes, enabling efficient comparison of the dossiers by the analyst.

Figure 32:

FIG. 32 illustrates an example dossier analysis user interface of the data analysis system that may be displayed when a particular dossier is selected by the analyst. For example, the analyst may view the user interface of FIG. 32 after selection of the "Another Trader 9" tile of the user interface of FIG. 28. As shown in FIG. 32, and indicated by title 3202, the information provided relates to the "Another Trader 9" dossier. In an embodiment, any filters applied to the clusters in the user interface of FIG. 28 are automatically propagated to the user interface of FIG. 32, as indicated at filters 3210. The filters may be applied to any one or more of charts, alerts, and/or other data shown in the user interface of FIG. 32. In some embodiments different filters may be applied to the different aspects of the user interface of FIG. 32. Additionally, the user may apply and/or remove any filters, and/or apply states, in the user interface of FIG. 32 similar to the user interface of FIG. 28.

The example user interface of FIG. 32 includes various tabs 3204, 3206, and 3208 for viewing information related to the dossier. Currently the "flags" tab 3204 is selected, which displays information associated with the various clusters/alerts of the dossier. For example, a list of alerts 3214 is shown, which are similar to the list of alerts of FIG. 11. The alerts may be sorted in various ways by selection of a sorting element 3216. In an embodiment, the analyst may select one or more of the alerts to apply a state and/or view details via a user interface similar to that of FIG. 12. Additionally, a time-based chart 3212 is shown which is similar or the same as the chart shown in the tiles of the user interface of FIG. 28. In the user interface of FIG. 32, the analyst may select any data to view in the chart 3212 via, for example, the dropdown 3218 and the list of previous charts 3220. In various embodiments, any type of data may be plotted in the chart 3212. For example, in one embodiment a risk score associated with the trader may be plotted over time. The risk score may be determined based on all or some of the data in the dossier. Alternatively, the risk score may be determined based on other data accessed from other data sources. The risk score may be determined based on a risk model. The system may be customized to display any charts of any type, and including any data, that are useful for the analyst in analyzing the dossier.

Tabs 3206 and 3208 may be selected by the analyst to view other information related to the dossier in the user interface. For example, "timeline" may display a more detailed chart, and/or may display a chart with data drawn from another data source outside of the clusters of the dossier. "Related" may display other dossiers and/or clusters/alerts associated with the current dossier, and may provide a direct link to those dossiers/clusters (similar to the links described in reference to FIGS. 21 and 22). For example, if two traders are associated with a cluster (for example, by a tag and/or data item associated with the cluster), and the user is viewing the dossier of one of the traders, the other trader (along with a like to that trader's dossier) may be displayed in the related tab.

In other embodiments, the user interface of FIG. 32 may include more or fewer tabs, each of which may be customized and specific to the type of investigation being performed by the analyst and/or the cluster types associated with the dossier.

FIG. 33 illustrates an example user interface in which the user has selected the "flags list" button of FIG. 28. In this user interface a sortable list of alerts 3304 is shown, not grouped by cluster tags. The user interface of FIG. 33 is similar to that of FIG. 11 described above.

Figure 34:
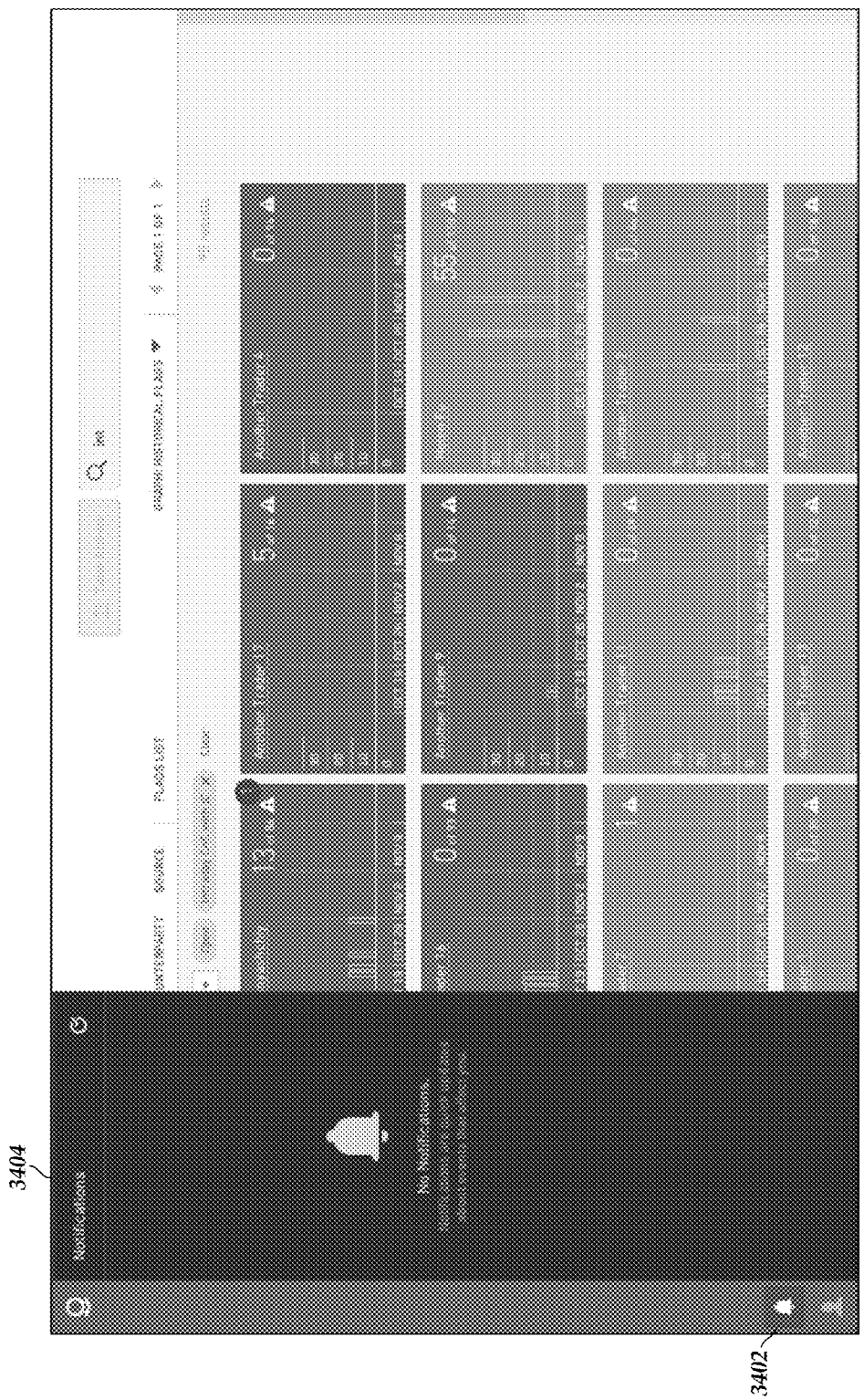

FIG. 34 illustrates an example user interface similar to that of FIG. 28, but in which the user has selected a notifications button 3402. Selection of the notifications button 3402 causes a notifications bar 3404 to be displayed. While no notifications are shown in the user interface of FIG. 34, various notifications may be provided to the analyst via the notifications bar 3404, as described above. For example, any changes to watched dossiers and/or cluster may cause notifications to be displayed in the notifications bar 3404. Similarly, when the analyst is assigned a dossier (and/or one or more clusters/ alerts) the analyst may be notified via the notifications bar 3404. For example, a notification regarding a watched dossier may include "You have a new critical alert #234234 related to Trader 1. (Just now)". In another example, a notification related to an assignment/escalation may include "Analyst 2 has escalated alert #58967 to you. (15 seconds ago)".

Notifications may also provide information to the analyst that is not directly related to any particular dossier or cluster. For example, a notification may be provided regarding unavailability of a data source, such as "Data source 1 will be down for maintenance on Sep. 12, 2014 from 0300-0500PST. (10 minutes ago)".

Advantageously, in various embodiments, the notifications bar 3404 helps the analyst avoid having to triage many alerts and/or dossiers that may not be of particular importance. Rather, the notifications bring particular alerts and/or dossiers to the attention of the analyst that are of particular importance. In some embodiments, any changes and/or comments on watched alerts/dossier may be provided in the notifications bar. Additionally, the analyst may check off alerts to remove them from the notification bar, and/or may click links included in the alerts to go directly to user interfaces displaying, for example, the relevant dossier, alert, and/or other information related to the notification.

Referring again to FIG. 28, in an embodiment, hovering a mouse cursor (or other selection indicator) over one of the tiles may cause a popup to be displayed with information associated with the particular dossier (for example, various items of information shown in the user interface of FIG. 32 and/or related human-readable conclusions).

In an embodiment, tags associated with alerts (in, for example, the alert display of FIG. 33 and/or the alert list 3214 of FIG. 32) may be shown in the user interface. Selection of such tags may cause the dossier associated with that tag to be automatically shown in the user interface.

In an embodiment, the system may enable export of all information related to an alert and/or a dossier to a format (such as a CSV) and/or to a displayable interactive graph comprising node and edges (for example, a graph display similar to the graph of FIG. 3C described above). The interactive graph representation may allow the analyst to review the attributes of the related data items and/or perform queries for additional related data items.

In an embodiment, the dossier analysis user interfaces (for example, the user interface of FIG. 28) may include a button to access a dashboard displaying various items of information related to the analyst. For example, the dashboard may include a display of a number of alerts the analyst has reviewed over time.

e. Permissions

In various embodiments permissions (also referred to as Access Control Lists) may be applied to various aspects of the system to control access of data. In particular, some data in the system may be permissions so as to not be visible or accessible, in whole or in part, to particular persons and/or groups of persons. For example, the system may apply permissions to particular data item attributes, individual data items, data item clusters, groups of clusters, particular user interfaces, types of data, and/or the like. Permissions may further be dependent on an identity of the analyst, a group to which the analyst belongs, a type of investigation, and/or the like.

In operation, the system may implement permissions by analysis of data prior to filtering and tagging and grouping of clusters. For example, when an analyst is not allowed to view data related to a particular data cluster, that data cluster may be removed from the set of data that is filtered, grouped, and presented to the user in the user interfaces of the system.

f. Additional Aspects

In various embodiments, a single master instance of each data item is stored by the system. The master instance of each data item includes all metadata and other information associated with the data item, as well as a unique data item identifier. When generating clusters and groups of clusters, in some embodiments, the master instances of the data items are referenced by their data item identifiers rather than making copies of the data items in each cluster. This advantageously enables memory savings and the data items do not have to be copied multiple times. Additionally, any updates to a master data item may be rapidly propagated to all references of the data item in each cluster, thus reducing processing requirements.

In various embodiments, the system and dossier analysis user interface described above are extensible. Thus, for example, additional types of tags may be added to the system based on new types of investigations, new groupings may be added to the user interface based on the new tags, each user interface may be customized based on the type of investigation, other types of related information may be brought into the dossier information user interfaces, other tabs may be added to the dossier information user interfaces, other states may be added based on changes and updates to workflows, and/or the like. Accordingly, the system need not be redeveloped for each not applications, but may be easily extended and adapted.

Additionally, the system is developed such that data items may be accessed from any type of data base or data store similarly via software code that adapts to particular database formats. Thus new data may be brought into the system quickly and efficiently without redevelopment.

Additional Embodiments

Embodiments of the present disclosure have been described that relate to automatic generation of memory-efficient clustered data structures and, more specifically, to automatic selection of an initial data item of interest, adding of the initial data item to the memory-efficient clustered data structure, determining and adding one or more related data items to the cluster, analyzing the cluster based on one or more rules or criteria, automatically tagging and grouping those clustered data structures, and providing an interactive user interface to an analyst. As described above, in various embodiments, a generated cluster or group of clusters may include far fewer data items as compared to a huge collection of data items that may or may not be related to one another. This may be because, for example, data items included in a cluster may only include those data items that are related to one another and which may be relevant to a particular investigation. Further, data items in a cluster may comprise simple references to a master instance of the data item, further saving memory requirements. Accordingly, in various embodiments, processing of generated clusters may be highly efficient because, for example, a given fraud investigation by an analyst may only require storage in memory of a single group of cluster data structures. Further, a number of data items in a cluster may be several orders of magnitude smaller than in the huge collection of data items that may or may not be related to one another because only data items related to each other are included in the clusters.

Additionally, the automated analysis, tagging, grouping, and scoring of groups of clusters (as mentioned above) may enable highly efficient evaluation of the various data clusters by a human analyst. For example, the interactive user interface us generated so as to enable an analyst to quickly view critical groups of data clusters, and then in response to analyst inputs, view and interact with the generated information (including, for example, re-grouping and/or filtering) associated with the clusters. In response to user inputs the user interface may be updated to display raw data associated with each of the generated groups of clusters if the analyst desires to dive deeper into data associated with a given cluster.

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "continuous" as used herein, is a broad term encompassing its plain an ordinary meaning and, as used in reference to various types of activity (for example, scanning, monitoring, logging, and the like), includes without limitation substantially continuous activity and/or activity that may include periodic or intermittent pauses or breaks, but which accomplish the intended purposes described (for example, continuous scanning may include buffering and/or storage of data that is thereafter processed, for example, in batch and/or the like).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
one or more non-transitory computer readable storage devices configured to store:
a plurality of computer executable instructions including at least a clustering engine;
one or more cluster data sources configured to store a plurality of data items, wherein the plurality of data items include at least one of: emails, electronic chat logs, or electronic trades; and
a plurality of data cluster types, each data cluster type associated with a respective one of a plurality of data clustering strategies and a respective plurality of data cluster tagging rules; and
one or more hardware computer processors in communication with the one or more non-transitory computer readable storage devices and configured to execute the plurality of computer executable instructions in order to:
generate, by the clustering engine, a plurality of data clusters by at least:
designating, for each of at least some of the plurality of data clustering strategies and based on the respective data clustering strategies, one or more data item seeds, wherein the one or more data items seeds are designated from the plurality of data items and accessed from the one or more cluster data sources;
for each of the data items seeds, and based on the respective data clustering strategies:
identifying one or more additional data items related to the data item seed, wherein the one or more additional data items are accessed from the one or more cluster data sources;
combining the data item seed and the one or more additional data items to generate a data cluster; and
associating the data cluster with a data cluster type associated with the data clustering strategy by which the seed was designated and the one or more additional data items were identified;
store the plurality of data clusters in the one or more non-transitory computer readable storage devices;
for each particular data cluster of the plurality of data clusters:
access the particular data cluster from the one or more non-transitory computer readable storage devices;
determine the data cluster type associated with the particular data cluster;
associate one or more tags types with the particular data cluster based on the data cluster tagging rules associated with the determined data cluster type, wherein the one or more tags types include at least one of: trader, trading book, counterparty, or trading desk; and
for each particular tag type of the one or more tags types, associate at least one tag value with the particular tag type, wherein each tag type and each associated tag value is expressed in the format tag type: tag value;
generate user interface data for rendering an interactive user interface on a computing device, the interactive user interface including one or more selectable elements useable by a user for indicating a tag type;
receive an indication of a first tag type via selection of one of the selectable elements by the user;
automatically identify tag types associated with each of the plurality of data clusters that have the first tag type;
automatically generate a plurality of first groups of the plurality of data clusters, wherein each of the first groups is associated with a different common tag value of the first tag type;
automatically update the user interface data such that the interactive user interface further includes a plurality of first tiles, wherein each of the first tiles represents a different one of the first groups, and wherein:
each of the first tiles displays a time-based graph showing events associated with data clusters associated with the respective common tag values of the respective first tiles,
the time-based graphs represent a merger or aggregation of all data items associated with that particular tag value for that respective group of data clusters;
each of the time-based graphs of the first tiles includes at least one common axis and a common scale for the at least one common axis;
the interactive user interface further displays the first tiles in an orthogonal arrangement on the display with multiple tiles arranged in rows and columns on the display;
the orthogonal tiles are separated by thin seams or lines, each tile having an indication of the number of alerts associated with the tag value for that particular tile and an indication of critical alerts for that particular tile;
the tiles are arranged horizontally on the display in order of number of critical alerts;
the first tiles have only one of two colors with tiles of one color being arranged at the top of the display and tiles of a different color being arranged generally at the bottom of the display, the colors representing a tag value having more or less critical alerts; and
each tile is selectable by the user in the interactive user interface, the selection generating a second display of only the selected tile wherein the time-based graph is automatically resized to be displayed horizontally across the entire display while maintaining the common axis and common scale displayed in the previous display;
receive an indication of a second tag type via selection of one of the selectable elements by the user;
automatically identify tag types associated with each of the plurality of data clusters that have the second tag type;
automatically generate a plurality of second groups of the plurality of data clusters, wherein each of the second groups is associated with a different common tag value of the second tag type; and
automatically update the user interface data such that the plurality of first tiles in the interactive user interface are dynamically replaced with a plurality of second tiles, wherein each of the second tiles represents a different one of the second groups, and wherein:

each of the second tiles displays a time-based graph showing events associated with data clusters associated with the respective common tag values of the respective second tiles, and each of the time-based graphs of the second tiles includes at least one common axis and a common scale for the at least one common axis.

2. The computer system of claim 1, wherein associating one or more tag types with the particular data cluster comprises:

determining one or more tag types associated with the data cluster type.

3. The computer system of claim 2, wherein associating one or more tag types with the particular data cluster further comprises:

analyzing the particular data cluster to identify one or more tag values to associate with at least one of the one or more tag types.

4. The computer system of claim 3, wherein associating one or more tag types with the particular data cluster further comprises:

associating a first tag value with the particular data cluster, the first tag value indicating the data cluster type associated with the particular data cluster.

5. The computer system of claim 4, wherein the one or more hardware computer processors are further configured to execute the plurality of computer executable instructions in order to:

determine the one or more selectable elements based on one or more tag types associated with a type of investigation to be performed by the user.

6. The computer system of claim 1, wherein the interactive user interface further includes one or more selectable filter criteria, wherein the one or more hardware computer processors are further configured to execute the plurality of computer executable instructions in order to:

filter the plurality of data clusters based on one or more filter criteria.

7. The computer system of claim 6, wherein the one or more hardware computer processors are further configured to execute the plurality of computer executable instructions in order to:

receive an indication of the one or more filter criteria via a user selection of at least one of the one or more selectable filter criteria.

8. The computer system of claim 6, wherein the one or more selectable filter criteria include at least one of a tag value, a cluster type, or a state.

9. The computer system of claim 6, wherein:

filtering the plurality of data clusters comprises determining a subset of data clusters of the plurality of data clusters satisfying the one or more filter criteria, and generating the plurality of first groups of the plurality of data clusters is based on the subset of data clusters.

10. The computer system of claim 6, wherein filter criteria of the one or more filter criteria of the same type are applied disjunctively when filtering the plurality of data clusters.

11. The computer system of claim 10, wherein filter criteria of the one or more filter criteria of different types are applied conjunctively when filtering the plurality of data clusters.

12. The computer system of claim 1, wherein each of the first tiles includes an indication of:

a tag value associated with a first group associated with the respective first tile.

13. The computer system of claim 12, wherein each of the first tiles further includes an indication of:

a number of critical data clusters in the first group associated with the respective first tile.

14. The computer system of claim 1, wherein the one or more hardware computer processors are further configured to execute the plurality of computer executable instructions in order to:

receive a selection of one of the plurality of first tiles; and update the user interface data such that the interactive user interface includes:

an indication of at least one data cluster represented by the one of the plurality of first tiles; and a resized time-based graph of data associated with the data clusters represented by the one of the plurality of first tiles, wherein the resized time-based graph is displayed horizontally across the entire display while maintaining the common axis and common scale displayed in the previous display.

15. The computer system of claim 1, wherein the interactive user interface further includes one or more selectable assignable states, wherein the one or more hardware computer processors are further configured to execute the plurality of computer executable instructions in order to:

receive an indication of one of the assignable states via a user selection of one of the one or more selectable assignable states;

associate one or more groups of data clusters with the indicated one of the assignable states.

16. The computer system of claim 1, wherein each of the first tiles displays an indication of a number of data clusters associated with the respective common tag values of the respective first tiles, and wherein each of the second tiles displays an indication of a number of data clusters associated with the respective common tag values of the respective second tiles.

\* \* \* \* \*